(12) United States Patent
Kawamura et al.

(10) Patent No.: US 11,758,890 B2
(45) Date of Patent: Sep. 19, 2023

(54) FISHING ROD INCLUDING ROD BODY HAVING FITTING MOUNTED THEREON

(71) Applicant: GLOBERIDE, Inc., Tokyo (JP)

(72) Inventors: Takuji Kawamura, Tokyo (JP); Nobuhiro Izaki, Tokyo (JP); Takahiko Tomioka, Tokyo (JP); Hirokazu Yamamoto, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/729,401

(22) Filed: Apr. 26, 2022

(65) Prior Publication Data

US 2022/0256826 A1   Aug. 18, 2022

Related U.S. Application Data

(62) Division of application No. 17/255,361, filed as application No. PCT/JP2019/025875 on Jun. 28, 2019.

(30) Foreign Application Priority Data

Jun. 28, 2018 (JP) ................................. 2018-123721
Jun. 29, 2018 (JP) ................................. 2018-124305
(Continued)

(51) Int. Cl.
*A01K 87/06* (2006.01)
*A01K 87/04* (2006.01)

(52) U.S. Cl.
CPC .............. *A01K 87/06* (2013.01); *A01K 87/04* (2013.01)

(58) Field of Classification Search
CPC ...... A01K 87/04; A01K 87/002; A01K 89/00; A01K 91/00; A01K 97/10; A01K 87/00; A01K 87/06; A01K 87/02
(Continued)

(56) References Cited

U.S. PATENT DOCUMENTS 1,231,150 A * 6/1917 Gere ...................... A01K 87/00
  43/18.1 R
3,629,029 A * 12/1971 Holahan ................ A01K 87/00
  156/193

(Continued)

FOREIGN PATENT DOCUMENTS

EP     0816123 A2 *  1/1998
EP     3036992 A1 *  6/2016  ............. A01K 87/00
(Continued)

OTHER PUBLICATIONS

Extended European Search Report for related European Application No. 22157476.7; action dated Jun. 14, 2022; (10 pages).
(Continued)

*Primary Examiner* — Darren W Ark
*Assistant Examiner* — Katelyn T Truong
(74) *Attorney, Agent, or Firm* — K&L Gates LLP

(57) ABSTRACT

A fishing rod according to one embodiment includes a rod body extending in a front-and-back direction along a central axis, a fitting having a mounting part, where the mounting part is mounted on an outer peripheral surface of the rod body at a first position determined in a circumferential direction around the central axis, and a fiber-reinforced resin layer surrounding the rod body so as to cover the mounting part. The fiber-reinforced resin layer has a first portion covering the rod body along an entire length thereof in the circumferential direction around the central axis and a second portion extending in the axial direction backward from an axially back end of the first portion and extending in the circumferential direction less than 180° clockwise from the first position and also less than 180° anti-clockwise from the first position.

16 Claims, 23 Drawing Sheets

(30) Foreign Application Priority Data

Jun. 29, 2018 (JP) .................... 2018-125134
Jul. 18, 2018 (JP) .................... 2018-134632

(58) Field of Classification Search
USPC ............... 43/18.1 R, 18.5, 22, 24
See application file for complete search history.

(56) References Cited

U.S. PATENT DOCUMENTS

| | | | | |
|---|---|---|---|---|
| 4,178,713 A * | 12/1979 | Higuchi | ................ | A01K 87/00 |
| | | | | 428/36.1 |
| 5,245,779 A * | 9/1993 | Suzue | ................ | D02G 3/444 |
| | | | | 428/377 |
| 5,665,441 A | 9/1997 | Suzue et al. | | |
| 2012/0174467 A1* | 7/2012 | Iwanari | ................ | A01K 87/00 |
| | | | | 43/18.1 R |
| 2014/0173967 A1* | 6/2014 | Iwata | ................ | A01K 87/08 |
| | | | | 43/18.1 R |
| 2016/0183505 A1* | 6/2016 | Noda | ................ | B29C 70/202 |
| | | | | 43/18.1 R |
| 2018/0249693 A1* | 9/2018 | Ayoub | ................ | A01K 87/04 |
| 2019/0223419 A1 | 7/2019 | Kawamura et al. | | |
| 2021/0127654 A1 | 5/2021 | Kawamura et al. | | |

FOREIGN PATENT DOCUMENTS

| | | | |
|---|---|---|---|
| IT | MI950324 U1 | | 11/1996 |
| JP | 2005229955 A | | 9/2005 |
| JP | 2008011816 A | * | 1/2008 |
| JP | 2009178132 A | * | 8/2009 |
| KR | 20160079712 A | * | 7/2016 |
| WO | 2018042856 A1 | | 3/2018 |
| WO | WO2018042856 A1 | | 3/2018 |
| WO | 2018061345 A1 | | 4/2018 |

OTHER PUBLICATIONS

Second Chinese Office Action in connection with Chinese Application No. 201980054341.8; action dated Jun. 28, 2022; (14 pages).
Office Action in connection with Chinese Application No. 202210242508.7; action dated Dec. 5, 2022; (14 pages).
Office Action in connection with Chinese Application No. 202210242506.8; action dated Dec. 19, 2022; (15 pages).
Office Action in connection with related Chinese Patent Application No. 202210242522.7; action dated Jan. 19, 2023; (16 pages).
Extended European Search Report for related European Application No. 22157528.5; action dated Jun. 8, 2022; (9 pages).
Extended European Search Report for related European Application No. 22157509.5; action dated Jun. 8, 2022; (9 pages).
Chinese Rejection Decision in connection with Chinese Patent Application No. 201980054341.8; action dated Jan. 3, 2023; (10 pages).
Second Chinese Office Action dated Apr. 22, 2023, Chinese Application No. 202210242506.8—14 Pages.
Second Chinese Office Action from corresponding Chinese Patent Application No. 202210242522.7, dated Jun. 9, 2023, 13 pages.
Second Korean Office Action in connection with Korean Patent Application No. 10-2021-7002583; action dated Jul. 26, 2023; (8 pages).

* cited by examiner

FISHING ROD INCLUDING ROD BODY HAVING FITTING MOUNTED THEREON

CROSS-REFERENCE TO RELATED APPLICATIONS

This application is a Divisional Application of U.S. Ser. No. 17/255,361, filed Dec. 22, 2020, which is the U.S. National Phase Application of PCT/JP2019/025875, filed Jun. 28, 2019, which claims the benefit of priority from Japanese Patent Application Serial No. 2018-123721, filed Jun. 28, 2018, Japanese Patent Application Serial No. 2018-125134, filed Jun. 29, 2018, Japanese Patent Application Serial No. 2018-124305, filed Jun. 29, 2018, and Japanese Patent Application Serial No. 2018-134632, filed Jul. 18, 2018. The contents of all of these applications are herein incorporated by reference in their entireties.

TECHNICAL FIELD

The present invention relates to a fishing rod including a rod body having a fitting mounted thereon.

BACKGROUND

There have been known fishing rods having fittings such as line guides and a reel seat mounted on a rod body. The fittings are conventionally mounted on the rod body with a thread or a resin sheet.

Fishing rods having fittings mounted on a rod body with a resin sheet are disclosed in, e.g., the Japanese Utility Model Application Publication No. Hei 2-26474 (Patent Literature 1), International Publication No. WO2018/042856 (Patent Literature 2) and International Publication No. WO 2018/061345 (Patent Literature 3). The resin sheet disclosed in these patent literatures is a prepreg sheet obtained by impregnating reinforcement fibers with a matrix resin containing a thermosetting resin. To mount the fittings, a prepreg sheet is wrapped around the rod body and mounting parts of the fittings and the matrix resin of the prepreg sheet wrapped around the rod body is cured. In this way, the fittings can be fixed onto the rod body. As noted, the fittings can be mounted on the rod body via the mounting parts with a fiber-reinforced resin layer, which is made by curing the prepreg sheet.

On the fiber-reinforced resin layer made to mount the fittings, a coating layer made of a resin material is provided to improve decorativeness and weather resistance. When the fishing rod is used, the rod body may place stress acting on the line guides and reel seat. The stress may concentrate in portions of the coating layer, and such portions may break.

According to the mounting structure disclosed in Patent Literature 1, a prepreg sheet cut in a shape of a trapezoid is wrapped around the rod body and the foot of the line guide and the prepreg sheet wrapped around the rod body is cured. In this way, the line guide is fixed onto the rod body. Patent Literature 1 discloses that the fiber-reinforced resin layer obtained by curing the trapezoidal-shaped prepreg sheet has a smooth curved surface on the outer peripheral surface of the rod body and that this can prevent the stress concentrations from damaging the coating layer.

RELEVANT REFERENCES

List of Relevant Patent Literature

Patent Literature 1: Japanese Utility Model Application Publication No. Hei 2-026474
Patent Literature 2: International Publication No. WO 2018/042856
Patent Literature 3: International Publication No. WO 2018/061345
Patent Literature 4: Japanese Patent Application Publication No. 2008-263841
Patent Literature 5: Japanese Patent Application Publication No. 2004-194563

SUMMARY

In the curved fiber-reinforced resin layer made from the trapezoidal prepreg sheet, its thickness in the radial direction of the rod body is small at the tip end of the foot of the line guide, which is one of the fittings. This means that the curved fiber-reinforced resin layer does not achieve a sufficiently strong fixing force near the tip end of the foot. When the rod body bends during the usage of the fishing rod, this encourages the tip end of the foot of the line guide to move upward away from the surface of the rod body. Thus, the coating layer may be damaged near the tip end of the foot if the mounting structure disclosed in Patent Literature 1 is employed.

On the other hand, if the fiber-reinforced resin layer is made from a rectangular prepreg sheet, it has a substantially uniform thickness in the radial direction at any axial position and thus exerts a considerable influence on the bending of the rod body. The material, radius, thickness and other parameters of the rod body are carefully designed so that the rod body can realize a desired bending profile. To reduce the deviation of the real bending profile from the desired bending profile, it is desired to improve the mounting structure of the line guide such that the mounting structure exerts a less influence on the bending of the rod body.

One of the objects of the present invention is to rigidly fix fittings onto a rod body using a fiber-reinforced resin layer and also to reduce the influence exerted by the fiber-reinforced resin layer on the bending of the rod body. Other objects of the present invention will be apparent with reference to the entire description in this specification.

According to one embodiment, a fishing rod includes a rod body extending in a front-and-back direction along a central axis, a fitting having a mounting part, where the mounting part is mounted on an outer peripheral surface of the rod body at a first position determined in a circumferential direction around the central axis, and a fiber-reinforced resin layer surrounding the rod body so as to cover the mounting part. The fiber-reinforced resin layer has a first portion covering the rod body along the entire length thereof in the circumferential direction around the central axis and a second portion extending in the axial direction backward from an axially back end of the first portion and extending in the circumferential direction from the first position less than 180° clockwise and also less than 180° anti-clockwise.

In one embodiment, the first portion is configured such that a length La thereof in the axial direction satisfies a relation of $Ld/2 \leq La$ where Ld denotes a length of the mounting part in the axial direction.

In one embodiment, when seen from a side, the second portion is configured such that a back end thereof has a backward convex shape between the first position and a second position rotated 90° clockwise from the first position and has a frontward convex shape between the second position and a third position rotated 180° clockwise from the first position.

In one embodiment, the fiber-reinforced resin layer is formed by curing a prepreg sheet wound around the rod body.

In one embodiment, the fiber-reinforced resin layer is formed by curing a first prepreg sheet wound around the rod body and a second prepreg sheet externally wound around the first prepreg sheet.

In one embodiment, in the circumferential direction, the first prepreg sheet extends 90° clockwise from the first position and also extends 90° anti-clockwise from the first position.

In one embodiment, the fiber-reinforced resin layer includes a first fiber-reinforced resin layer obtained by curing the first prepreg sheet and a second fiber-reinforced resin layer obtained by curing the second prepreg sheet.

In one embodiment, the fiber-reinforced resin layer contains reinforcement fibers arranged at an angle of less than 90° with respect to the axial direction.

In one embodiment, the fitting is a fishing line guide.

In one embodiment, the fitting is a reel seat.

Advantageous Effects

One embodiment of the present invention can rigidly fix fittings onto a rod body using a fiber-reinforced resin layer and also reduce the influence exerted by the fiber-reinforced resin layer on the bending of the rod body.

DESCRIPTION OF THE PREFERRED EMBODIMENTS

First Embodiment

Figure 1:
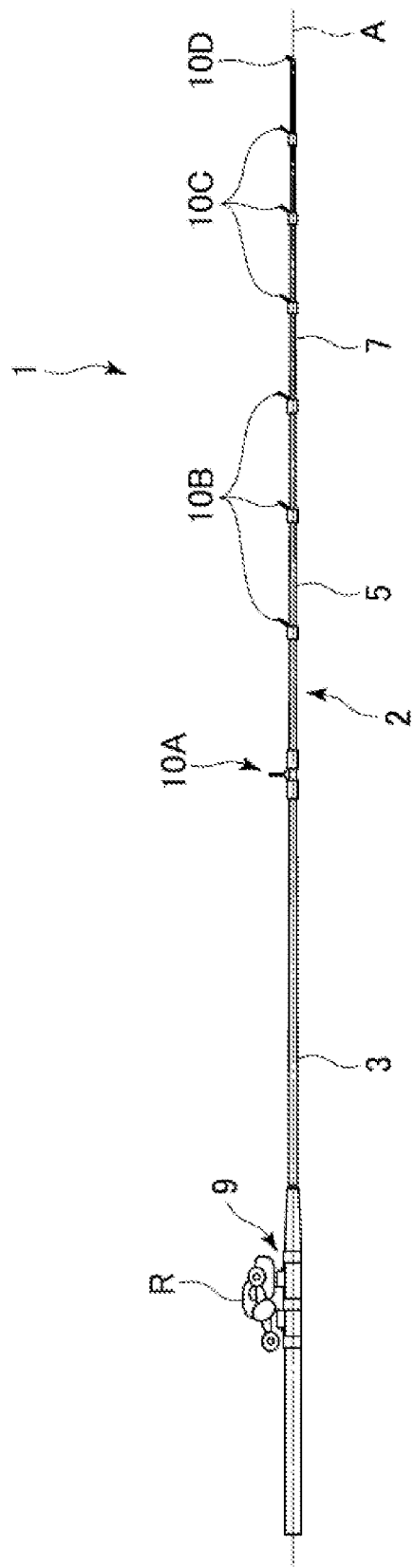
FIG. 1 shows a fishing rod according to a first embodiment of the present invention.

A first embodiment of the present invention will be hereinafter described with reference to the accompanying drawings. In the drawings, constituent elements common to different views are denoted by the same reference signs. For convenience of explanation, the drawings are not necessarily drawn to scale.

FIG. 1 shows a fishing rod according to a first embodiment of the present invention. As shown, a fishing rod 1 according to the first embodiment of the present invention includes an elongated rod body 2 extending along a central axis, a reel R mounted on the rod body 2 via a reel seat 9, and fishing line guides 10 mounted on the rod body 2. In the embodiment shown, the reel seat 9 and the fishing line guides 10 are fittings mounted on the outer peripheral surface of the rod body.

The rod body 2 is made up of, for example, a butt rod 3, an intermediate rod 5, and a tip rod 7 connected together. For example, these rods are jointed together by ordinary jointing. The butt rod 3, the intermediate rod 5, and the tip rod 7 may also be jointed together by telescopic jointing, inverse ordinary jointing, spigot jointing, or any other known jointing methods. Alternatively, the rod body 2 may be made of a single rod.

The butt rod 3, the intermediate rod 5, and the tip rod 7 are formed of, for example, a tube made of a fiber reinforced resin. The tube made of a fiber reinforced resin can be formed by preparing a fiber reinforced resin prepreg (a prepreg sheet) made of reinforcement fibers impregnated with a matrix resin, winding the prepreg sheet on a core, and heating and curing the prepreg sheet. The reinforcement fibers included in the prepreg sheet may be, for example, carbon fibers, glass fibers, or any other known reinforcement fibers. The matrix resin included in the prepreg sheet may be a thermosetting resin such as epoxy resin. After the prepreg sheet is cured, the core is removed. The outer peripheral surface of the tube may be polished as necessary. Each of the rods may be formed solid.

In the embodiment shown, the butt rod 3, the intermediate rod 5, and the tip rod 7 are provided with a plurality of fishing line guides 10 (the fishing line guides 10A to 10D) for guiding a fishing line released from the reel R mounted to the reel seat 9. More specifically, the butt rod 3 is provided with a single fishing line guide 10A, the intermediate rod 5 is provided with three fishing line guides 10B, and the tip rod 7 is provided with three fishing line guides 10C. The top guide 10D is provided at a distal end of the tip rod 7. The rod body 2 may have any number of fishing line guides 10 mounted thereon. In the illustrated example, the rod body 2 has eight fishing line guides including the top guide 10D mounted thereon, but the rod body 2 may have nine or more, or seven or less fishing line guides mounted thereon.

In the embodiment shown, the reel seat 9 is mounted on the outer peripheral surface of the butt rod 3. The reel seat 9 is any reel seat as long as it allows the reel R to be mounted thereto.

Figure 2:
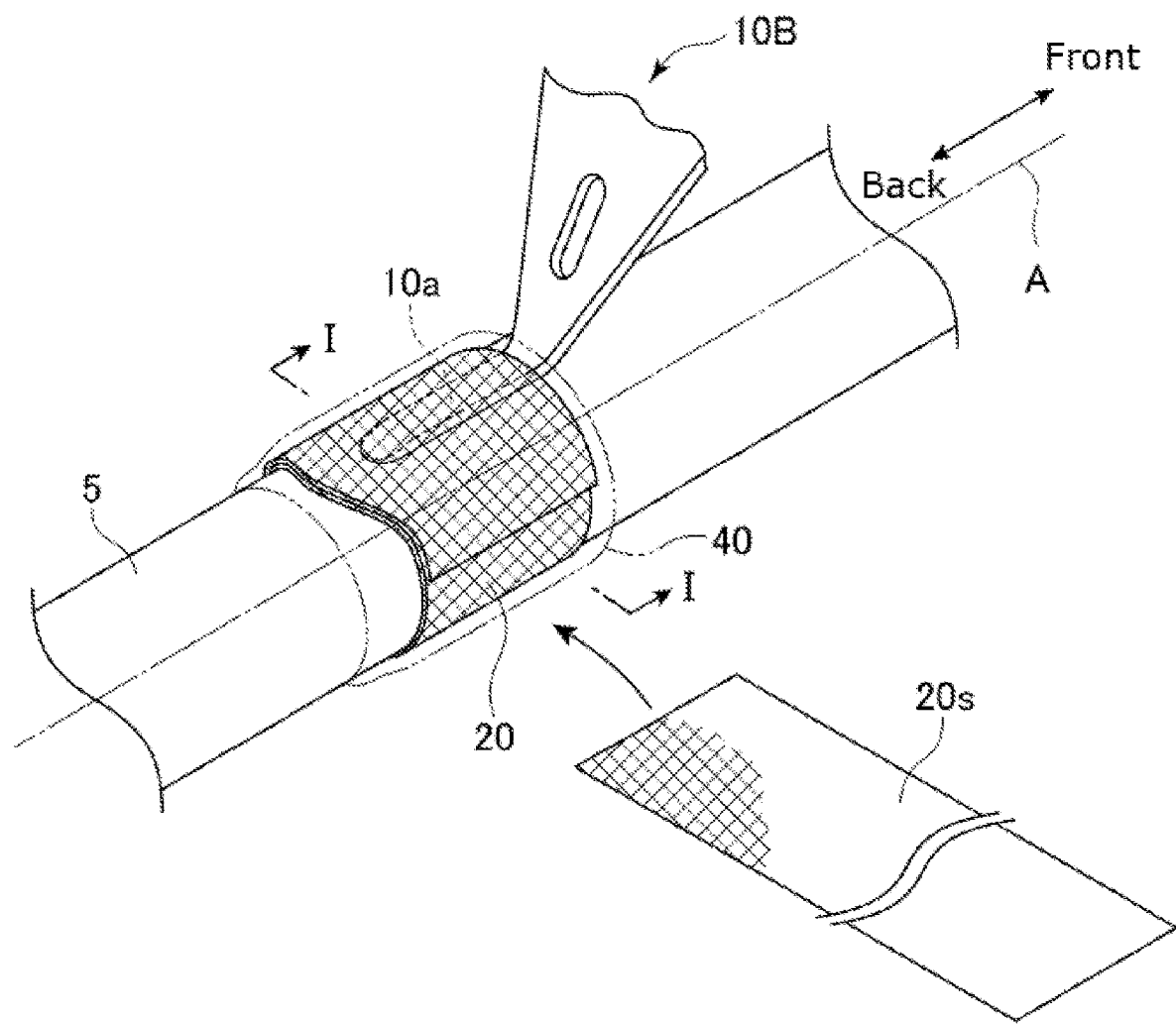
FIG. 2 is an enlarged perspective view schematically illustrating a region near a fishing line guide of the fishing rod shown in FIG. 1.
Figure 3:
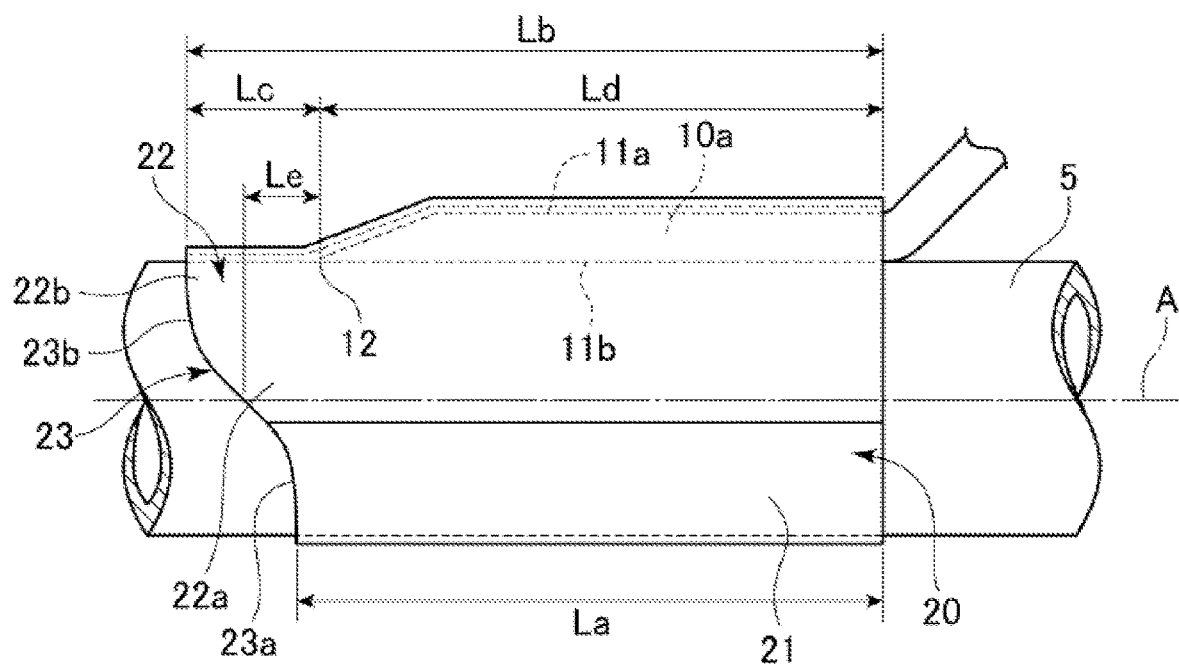
FIG. 3 is an enlarged right side view schematically illustrating the region near the fishing line guide of the fishing rod shown in FIG. 1.
Figure 4:
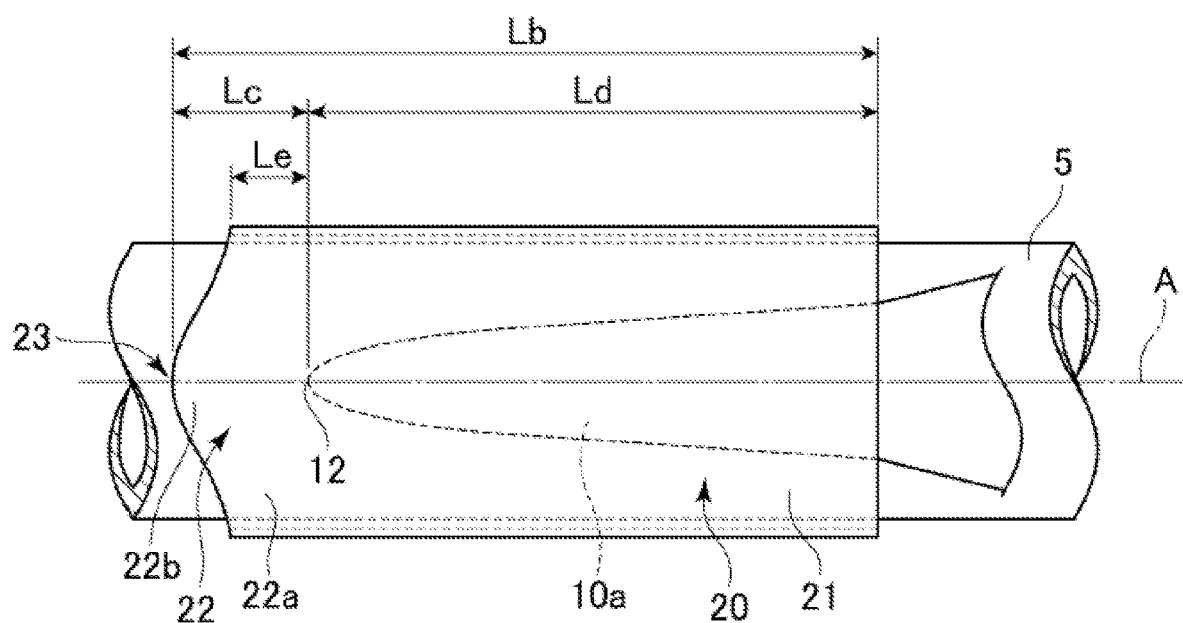
FIG. 4 is an enlarged plan view schematically illustrating the region near the fishing line guide of the fishing rod shown in FIG. 1.
Figure 5:
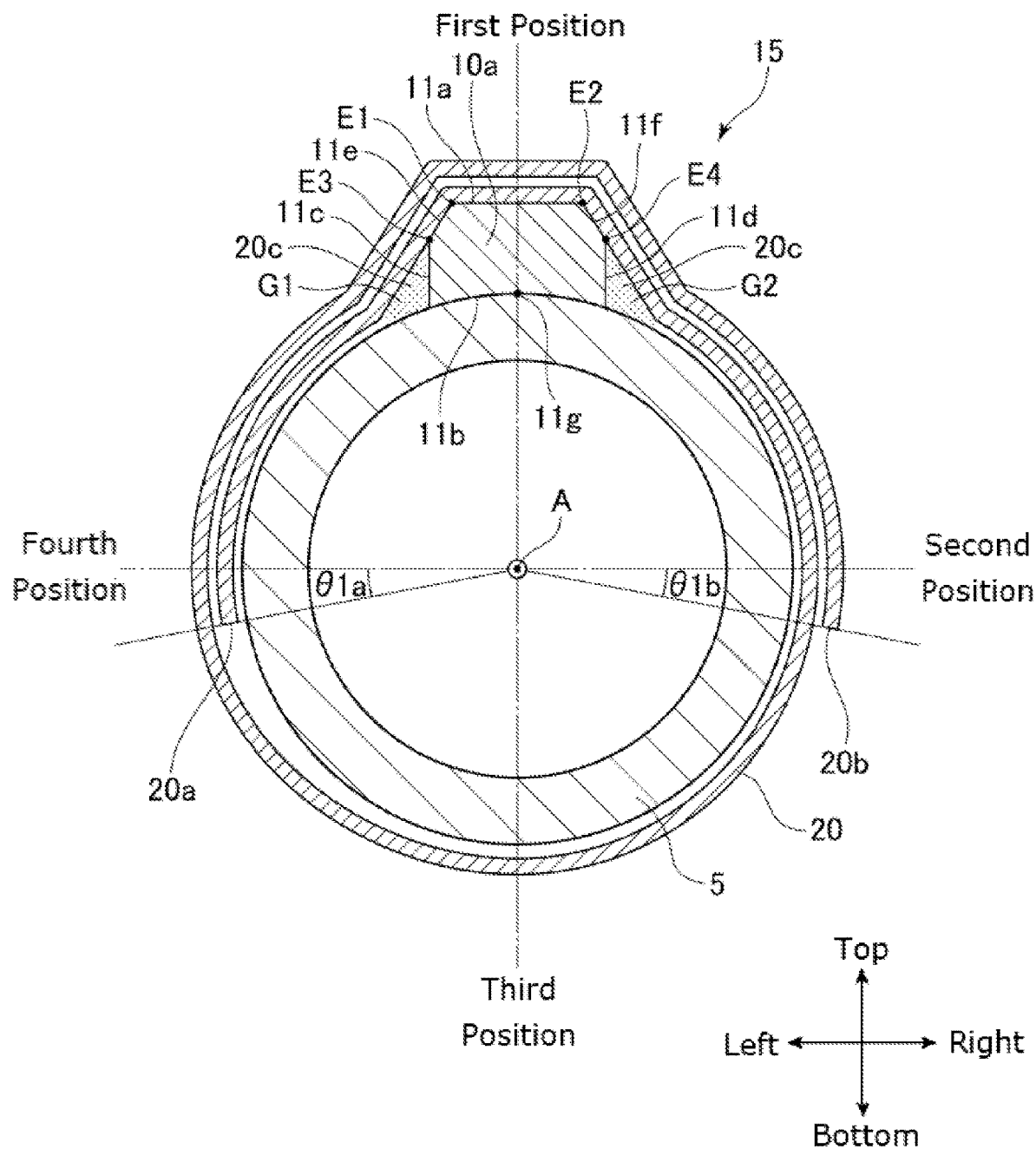
FIG. 5 is a sectional view showing a section obtained by cutting the fishing rod shown in FIG. 2 along a line I-I.

Next, with further reference to FIGS. 2 to 5, a description is given of the structure and manner of mounting of the fishing line guide 10B onto the intermediate rod 5. FIG. 2 is a perspective view to illustrate the manner of mounting the fishing line guide 10B onto the intermediate rod 5, FIG. 3 is an enlarged right side view schematically illustrating the region near the fishing line guide 10B of the fishing rod 1, FIG. 4 is an enlarged plan view schematically illustrating the region near the fishing line guide 10B of the fishing rod 1, and FIG. 5 is a cross-sectional view schematically illustrating a cross-section obtained by cutting the fishing rod 1 along the line I-I in FIG. 2. The front-and-back direction of the fishing rod 1 (the intermediate rod 5) and the fishing line guide 10B refers to the front-and-back direction in FIG. 2. This means that the tip side of the intermediate rod 5 faces the front side, and the base side of the intermediate rod 5 faces the back side. The top-and-bottom and left-and-right directions of the fishing rod 1 (the intermediate rod 5) and the fishing line guide 10B respectively refer to the top-and-bottom and left-and-right directions in FIG. 5.

As shown in these drawings, the fishing line guide 10B has a foot 10a extending in the direction along the central axis A of the intermediate rod 5 (in the axial direction) and ending at a tip end 12 and is mounted on the outer peripheral surface of the intermediate rod 5 via the foot 10a. In the illustrated embodiment, the foot 10a has a length Ld in the axial direction along the central axis A. Since the tip end 12 is the back-side end of the foot 10a, the tip end 12 of the foot 10a may be herein referred to as the back end 12. The foot 10a of the fishing line guide 10B is an example of the mounting part of the fitting.

The fishing line guide 10B is mounted on the outer peripheral surface of the intermediate rod 5 such that the foot 10a is positioned at a first position determined in the circumferential direction around the central axis A. For example, the fishing line guide 10B is mounted on the outer peripheral surface of the rod 5 such that a center portion 11g of the foot 10a, which is the circumferentially central portion, is positioned at the first position determined in the circumferential direction. Since the fishing line guide 10B is mounted on the intermediate rod 5 at the first position, the "first position" described above may be herein referred to as the "mounting position" of the fishing line guide 10B. In one embodiment, the mounting position (first position) of the fishing line guide 10B on the intermediate rod 5 is positioned immediately above the central axis A.

As used herein, a second position refers to the position rotated 90° clockwise from the first position in the circumferential direction around the central axis A, a third position refers to the position rotated 180° clockwise (or anti-clockwise) from the first position, and a fourth position refers to the position rotated 90° anti-clockwise from the first position. In other words, when the fishing rod 1 is axially seen from the back side, the second, third and fourth positions may respectively refer to the positions rotated clockwise by 90°, 180° and 270° with respect to the first position in the circumferential direction around the central axis A.

When seen in the cross-section, the foot 10a of the fishing line guide 10B has a top surface 11a, a bottom surface 11b opposing the top surface 11a, and side surfaces 11c and 11d connecting together the top and bottom surfaces 11a and 11b. The fishing line guide 10B is mounted on the intermediate rod 5 such that the bottom surface 11b of the foot 10a is in contact with the outer peripheral surface of the intermediate rod 5. The bottom surface 11b of the foot 10a is partially or entirely in contact with the outer peripheral surface of the intermediate rod 5. In the illustrated embodiment, since the curvature of the bottom surface 11b is substantially equal to the curvature of the outer peripheral surface of the intermediate rod 5, the bottom surface 11b is almost entirely in contact with the outer peripheral surface of the intermediate rod 5. If the curvature of the bottom surface 11b is different from the curvature of the outer peripheral surface of the intermediate rod 5, the bottom surface 11b is only partially in contact with the outer peripheral surface of the intermediate rod 5. Since the bottom surface 11b of the foot 10a is in contact with the outer peripheral surface of the intermediate rod 5, a filling member, such as disclosed in, for example, Japanese Utility Model Application Publication No. Hei 2-026474 is not provided between the foot 10a and the intermediate rod 5. If the curvature of the bottom surface 11b is different from the curvature of the outer peripheral surface of the intermediate rod 5, however, it should be noted that a resin may be interposed between the bottom surface 11b and the outer peripheral surface of the intermediate rod 5 due to the resin flowing from a prepreg sheet, described below.

The foot 10a is beveled at the portion where the top surface 11a is connected to the side surface 11c and at the portion where the top surface 11a is connected to the side surface 11d. In the illustrated embodiment, beveled surfaces 11e and 11f are formed at the left and right edges of the top surface 11a of the foot 10a. The beveled surface 11e is the surface connecting together the top and side surfaces 11a and 11d. The beveled surface 11f is the surface connecting together the top and side surfaces 11a and 11d. The top surface 11a is connected at the left edge E1 thereof to the beveled surface 11e and connected at the right edge E2 thereof to the beveled surface 11f. As illustrated in FIG. 3, the left edge E1 of the top surface 11a is one of the edges of the top surface 11a opposing each other in the circumferential direction around the central axis A, and the right edge E2 of the top surface 11a is the other of the edges of the top surface 11a opposing each other in the circumferential direction. The left edge E1 of the top surface 11a is an example of a first edge, and the right edge E2 of the top surface 11a is an example of a second edge. The side surface 11c is connected at the top edge E3 thereof to the beveled surface 11e and the side surface 11d is connected at the top edge E4 thereof to the beveled surface 11e.

In one aspect, at least one of the beveled surfaces 11e and 11f may form a part of the top surface 11a. Stated differently, the top surface 11a may refer to the region including the beveled surfaces 11e and 11f. In this case, the top edge E3 of the side surface 11c is treated as the left edge (first edge) of the top surface 11a, and the top edge E4 of the side surface 11d is treated as the right edge (second edge) of the top surface 11a.

On the outer side of the foot 10a of the fishing line guide 10B, there are provided a fiber-reinforced resin layer 20 and a coating layer 40. As used herein, the terms "outer side" and "inner side" refer to "the outer side" and "the inner side" in the radial direction of the intermediate rod 5, respectively, unless otherwise construed from the context.

The fiber-reinforced resin layer 20 surrounds the intermediate rod 5 such that the fiber-reinforced resin layer 20 covers the foot 10a along its entire length in the axial direction along the central axis A. In one embodiment, the number of windings of the fiber-reinforced resin layer 20 is designed to be one or more plies for reliably fixing the fishing line guide 10B and less than two plies for reducing the weight.

In one embodiment, the fiber-reinforced resin layer 20 is provided such that its one end 20a is positioned no less than 90° and less than 180° anti-clockwise from the mounting position of the fishing line guide 10B in the circumferential direction around the central axis A as shown in FIG. 5. In the illustrated embodiment, the end 20a of the fiber-reinforced resin layer 20 is positioned $90°+\theta1a$ ($0 \leq \theta1a < 90°$) anti-clockwise in the circumferential direction from the mounting position of the fishing line guide 10B (i.e., from the center portion 11g).

In one embodiment, the fiber-reinforced resin layer 20 is arranged such that the other end 20b is on the other side of the end 20a with respect to the mounting position (the center portion 11g) of the fishing line guide 10B in the circumferential direction around the central axis A. In one embodiment, the other end 20b of the fiber-reinforced resin layer 20 is positioned no less than 90° and less than 180° away clockwise from the mounting position of the fishing line guide 10B. In the illustrated embodiment, the other end 20b of the fiber-reinforced resin layer 20 is positioned $90°+\theta1b$ ($0 \leq \theta1b < 90°$) away clockwise in the circumferential direction from the mounting position. The angle $\theta1b$ may be either equal to or different from the angle $\theta1a$. In the illustrated embodiment, the angle $\theta1a$ is equal to the angle $\theta1b$. Accordingly, the other end 20b of the fiber-reinforced resin layer 20 is symmetrically arranged to the end 20a with respect to the mounting position of the fishing line guide 10B (the center portion 11g) in the circumferential direction around the central axis A. When the ends 20a and 20b of the fiber-reinforced resin layer 20 are symmetrically arranged with respect to the mounting position of the fishing line guide 10B in the circumferential direction around the central axis A as described above, the center of gravity of the intermediate rod 5 can avoid being shifted to the left or right off the central axis A.

As described above, the end 20a of the fiber-reinforced resin layer 20 is positioned $90°+\theta1a$ anti-clockwise from the mounting position of the fishing line guide 10B, and the other end 20b is positioned $90°+\theta1b$ away clockwise from the mounting position. In this way, the number of windings of the fiber-reinforced resin layer 20 can be 1.5 plies or more and less than 2.0 plies.

When the fishing rod 1 is used, the fishing line applies, to the fishing line guide 10B, a force that is directed to swing the fishing line guide 10B around the central axis A of the rod body. This force results in the left and right edges of the bottom surface 11b of the foot 10a moving upward away from the outer peripheral surface of the intermediate rod 5. If the end 20a of the fiber-reinforced resin layer 20 is positioned $90°+\theta1a$ anti-clockwise from the mounting position of the fishing line guide 10B and the other end 20b is positioned $90°+\theta1b$ away clockwise from the mounting position, the portions of the fiber-reinforced resin layer 20 near the ends 20a and 20b function as hooks when the force applied by the fishing line causes the foot 10a to move away upward, so that the left and right edges of the foot 10a can be prevented from moving away upward.

As clearly shown in FIGS. 3 and 4, the fiber-reinforced resin layer 20 has a first portion 21 covering the intermediate rod 5 along the entire length thereof in the circumferential direction around the central axis A and a second portion 22 extending from the back end of the first portion 21 backward in the axial direction A. The second portion 22 extends, in the circumferential direction around the central axis A from the mounting position of the fishing line guide 10B, less than 180° clockwise and also less than 180° anti-clockwise. This means that the second portion 22 covers only a part of the intermediate rod 5 in the circumferential direction.

In one embodiment, the first portion 21 of the fiber-reinforced resin layer 20 has a length La in the axial direction along the central axis A. In one embodiment, the first portion 21 is configured such that its axial length La satisfies the relation $Ld/2 \leq La$ where Ld denotes the axial length of the foot 10a.

In one embodiment, the second portion 22 of the fiber-reinforced resin layer 20 has a base end portion 22a connected to the back end of the first portion 21 and a tip end portion 22b extending backward from the back end of the base end portion 22a. In one embodiment, the second portion 22 has a curved back end surface 23. The back end surface 23 of the second portion 22 is divided into a back end surface 23a of the base end portion 22a and a back end surface 23b of the tip end portion 22b.

In one embodiment, the base end portion 22a extends, in the circumferential direction around the central axis A from the mounting position of the fishing line guide 10B (the first position), less than 180° clockwise and also less than 180° anti-clockwise. In other words, the base end portion 22a extends, in the circumferential direction around the central axis A, from the first position clockwise toward the third position and ends at a predetermined position between the first position and the third position and also extends from the first position anti-clockwise toward the third position and ends at a predetermined position between the first position and the third position. The length of the base end portion 22a in the circumferential direction varies among respective positions determined in the axial direction. For example, as most clearly shown in the right side view of FIG. 3, at the position near the first portion 21 in the axial direction along the central axis A (the front end of the base end portion 22a), the base end portion 22a extends to the vicinity of the third position. On the other hand, at the position distant from the first portion 21 (the back end of the base end portion 22a), the base end portion 22a extends slightly beyond the second position. When seen from the left side, at the position distant from the first portion 21 (the back end of the base end portion 22a), the base end portion 22a extends slightly beyond the fourth position. In one embodiment, when seen from the side, the back end surface 23a of the base end portion 22a is a frontward convex curved surface, as shown in FIG. 3. The back end surface 23a extends from the second position to the third position in the circumferential direction. Therefore, the back end surface 23 has a frontward convex shape between the second position and the third position in the circumferential direction.

In one embodiment, the tip end portion 22b extends, in the circumferential direction around the central axis A, from the first position clockwise less than 90° and also anti-clockwise less than 90°. In other words, the tip end portion 22b extends, in the circumferential direction around the central axis A, from the first position toward the second position clockwise and ends at a predetermined position between the first position and the second position and also from the first position toward the second position anti-clockwise and ends at a predetermined position between the first position and the second position. The length of the tip end portion 22b in the circumferential direction varies among respective positions determined in the axial direction. For example, as most clearly shown in the right side view of FIG. 3, at the position near the base end portion 22a in the axial direction along the central axis A (the front end of the tip end portion 22b), the tip end portion 22b extends to the vicinity of the second position. On the other hand, at the position distant from the base end portion 22a (the back end of the tip end portion 22b), the tip end portion 22b extends only slightly in the circumferential direction. When seen from the left side, at the position near the base end portion 22a (the front end of the tip end portion 22b), the tip end portion 22b extends to the vicinity of the fourth position. On the other hand, at the position distant from the base end portion 22a (the back end of the tip end portion 22b), the tip end portion 22b extends only slightly in the circumferential direction. In one embodiment, when seen from the side, the back end surface 23b of the tip end portion 22b is a backward convex curved surface, as shown in FIG. 3. The back end surface 23b extends from the first position to the second position in the circumferential direction. Therefore, the back end surface 23 has a backward convex shape between the first position and the second position in the circumferential direction.

In one embodiment, Le denotes the length between the tip end 12 of the foot 10a and the back end of the base end portion 22a and its value is determined such that the relation d/2<a≤Ld+Le is satisfied. In one embodiment, the length Le can take any value within the range of 0 mm≤Le≤6 mm. In another embodiment, the length Le can take any value within the range of 1 mm≤Le≤4 mm. The fact that the numerical range of Le includes 0 mm means that the present embodiment can be realized without the base end portion 22a. Stated differently, in one embodiment, the base end portion 22a can be omitted. If such is the case, the tip end portion 22b is connected to the first portion 21 without the base bed portion 22a being provided therebetween.

In one embodiment, Lc denotes the length between the tip end 12 of the foot 10a and the back end of the tip end portion 22b (i.e., the back end of the fiber-reinforced resin layer 20) and can take any value within the range of 1 mm≤Lc≤7 mm. In one embodiment, the length Lc can take any value within the range of 2 mm≤Lc≤5 mm. In addition, Lb denotes the length of the fiber-reinforced resin layer 20 in the axial direction along the central axis A and is determined such that the relation Lb=Lc+Ld is satisfied.

As described above, the fishing line guide 10B is mounted on the outer peripheral surface of the intermediate rod 5 via the foot 10a with the use of the fiber-reinforced resin layer 20. FIG. 5 arranges the constituent components such that a gap is provided between the outer peripheral surface of the intermediate rod 5 and the fiber-reinforced resin layer 20 for the sake of intelligibility. In fact, however, the fiber-reinforced resin layer 20 is in close contact with the outer peripheral surface of the intermediate rod 5.

The coating layer 40 is a coating film made of a resin provided on the outer side of the fiber-reinforced resin layer 20 so as to cover the fiber-reinforced resin layer 20. As shown, the coating layer 40 may be provided to coat the entire fiber-reinforced resin layer 20. In FIGS. 3 to 5, the coating layer 40 is not shown for convenience of description.

The coating layer 40 is formed of various resin materials such as epoxy, urethane, acrylic, or UV-curable resins (e.g., urethane acrylate, acrylic resin acrylate, epoxy acrylate). The materials of the coating layer 40 are not limited to those named herein but are various. The coating layer 40 may be either transparent or colored. The coating layer 40 may be configured such that its length in the axial direction along the central axis A is constant at any position determined in the circumferential direction, as shown in FIG. 2. The back end surface of the coating layer 40 may be curved following the back end surface of the fiber-reinforced resin layer 20.

As shown in FIG. 5, the side surface 11c of the foot 10a, the outer peripheral surface of the intermediate rod 5 and the inner peripheral surface of the fiber-reinforced resin layer 20 bound a gap G1. Similarly, the side surface 11d of the foot 10a, the outer peripheral surface of the intermediate rod 5 and the inner peripheral surface of the fiber-reinforced resin layer 20 bound a gap G2. When a prepreg sheet 20s, described below, is heated, the matrix resin contained in the prepreg sheet 20s becomes flowable and flows into the gaps G1 and G2. Accordingly, the gaps G1 and G2 are at least partially filled with a resin 20c, originating from the matrix resin contained in the prepreg sheet 20s.

The following describes, for example, a method of how to mount the fishing line guide 10B onto the intermediate rod 5. The process of mounting the fishing line guide 10B on the intermediate rod 5 begins with preparing the rod 5, the fishing line guide 10B and the prepreg sheet 20s.

As described above, the rod 5 is made by heating and curing a prepreg sheet wound on a core.

The fishing line guide 10B may be any fixed guide. The fishing line guide 10B may be either a single-foot guide as shown or a double-foot guide.

The prepreg sheet 20s is a prepreg sheet made from reinforcement fibers impregnated with a matrix resin. The reinforcement fibers contained in the prepreg sheet 20s are, for example, carbon fibers, glass fibers, or liquid crystal polyester fibers. The matrix resin is, for example, a thermosetting resin. A thermosetting resin cures irreversibly by chemical reaction upon heating. Thermosetting resins that can be used as the matrix resin making the prepreg sheet 20s include, for example, urea resins, melamine resins, phenolic resins, epoxy resins, unsaturated polyester resins, alkyd resins, and urethane resins. The prepreg sheet 20s has a thickness of, for example, 20 μm to 300 μm. The prepreg sheet 20s may be a commercially available sheet that can be used suitably.

The resin content of the matrix resin in the prepreg sheet 20s is, for example, 20 wt % to 50 wt %, relative to 100 wt % of the total mass of the reinforcement fibers and matrix resin in the prepreg sheet 20s.

The reinforcement fibers contained in the prepreg sheet 20s may be arranged regularly at an angle with respect to the axial direction along the central axis A of the rod body 2. For example, the reinforcement fibers contained in the prepreg sheet 20s may be arranged regularly at 45° with respect to the axial direction along the central axis A of the rod body 2. The reinforcement fibers contained in the prepreg sheet 20s may be plain-woven. The reinforcement fibers contained in one sheet 20s may be a non-woven fabric.

The matrix resin contained in the prepreg sheet 20s contains a thermosetting resin as the main component. This resin composition may contain a known additive. When the resin composition contains the thermosetting resin and the additive, the proportion of the mass of the thermosetting resin relative to 100% of the entire mass of the resin composition is, for example, 50% or more, 60% or more, 70% or more, 80% or more, or 90% or more.

As shown in FIG. 2, to mount the fishing line guide 10B on the rod 5, the foot 10a of the fishing line guide 10B is placed on the outer peripheral surface of the intermediate rod 5. Subsequently, one end of the prepreg sheet 20s is placed on the outer peripheral surface of the intermediate rod 5 so that the prepreg sheet 20s is wound in a predetermined number of plies so as to surround the outer peripheral surface of the intermediate rod 5 and the foot 10a. In one embodiment, the winding of the prepreg sheet 20s starts at the position 90°+θ1a anti-clockwise from the mounting position of the fishing line guide 10B (the center portion 11g) and ends at the position 90°+θ1b away clockwise from the mounting position, as shown in FIG. 3. These winding start and end positions are varied as appropriate. The number of windings of the prepreg sheet 20s is not limited to that expressly mentioned herein. The prepreg sheet 20s is wound in any number of plies. For example, the prepreg sheet 20s may be wound in two or more plies.

While the prepreg sheet 20s is wound, tension is applied backward in the axial direction to its portion wound on the first position. This tension applied backward in the axial direction deforms the prepreg sheet 20s such that it protrudes backward near the first position determined in the circumferential direction. The portion of the prepreg sheet 20s that is deformed to protrude backward serves as the second portion 22 of the fiber-reinforced resin layer 20 after curing.

The above series of steps allow the foot 10a to be covered by the prepreg sheet 20s along with the rod 5. Once the prepreg sheet 20s is wound around the intermediate rod 5, a void space corresponding to the gap G1 is created on the left side of the foot 10a, and a void space corresponding to the gap G2 is created on the right side of the foot 10a.

Following this, a winding, where the prepreg sheet 20s is wound around the rod 5, is heated. This causes the matrix resin contained in the prepreg sheet 20s to become flowable and then cured, so that the fiber-reinforced resin layer 20 is formed. This fiber-reinforced resin layer 20 fixes the fishing line guide 10B to the rod 5.

After heated for a predetermined period of time, the winding is taken out of the heating furnace and cooled at a room temperature for a predetermined period of time. After the winding is cooled enough, a coating layer may be formed so as to cover the fiber-reinforced resin layer 20 formed on the winding for the purposes of improving weather resistance or decorativeness.

The above step of heating the winding may be carried out with a known heating furnace. For example, the winding may be placed for a predetermined period of time in a heating furnace maintained at a predetermined temperature, so that the winding is heated enough to cure the matrix resin contained in the prepreg sheet 20s. The temperature of the heating furnace is, for example, 70 to 170° C., 80 to 160° C., 85 to 150° C., or 90 to 120° C., but the heating can be carried out at a temperature other than these ranges in accordance with the curing temperature of the matrix resin. The duration of the heating of the winding in the heating furnace is, for example, 5 minutes to 3 hours, 15 minutes to 2.5 hours, or 30 minutes to 2 hours, but the winding may be heated for a duration other than these ranges. During the heating of the winding, a securing tape may be wound around the winding so as to prevent movement of the prepreg sheet 20s wound around the intermediate rod 5.

While the above winding is heated, the matrix resin contained in the prepreg sheet 20s becomes flowable and flows into the gaps G1 and G2. As a result, the gaps G1 and G2 are at least partially filled with a resin 20c, which flows therein from the prepreg sheet 20s. The resin 20c filling the gaps G1 and G2 allows the fishing line guide 10B to be more rigidly fixed onto the intermediate rod 5.

Next, with reference to FIGS. 6 to 9, a description is given of a fishing rod according to another embodiment of the present invention. The embodiment shown in FIGS. 6 to 9 is different from the embodiment shown in FIG. 2 in that the fishing line guide 10B is fixed onto the intermediate rod 5 by a first fiber-reinforced resin layer 120 and a second fiber-reinforced resin layer 130, instead of the fiber-reinforced resin layer 20.

In the embodiment shown in FIGS. 6 to 9, on the outer side of the foot 10a of the fishing line guide 10B, there are provided a first fiber-reinforced resin layer 120, a second fiber-reinforced resin layer 130 and a coating layer 40.

The first fiber-reinforced resin layer 120 surrounds the intermediate rod 5 such that the first fiber-reinforced resin layer 120 covers the foot 10a along its entire length in the axial direction along the central axis A. The first fiber-reinforced resin layer 120 has a length Lb in the axial direction, like the fiber-reinforced resin layer 20.

Figure 7:
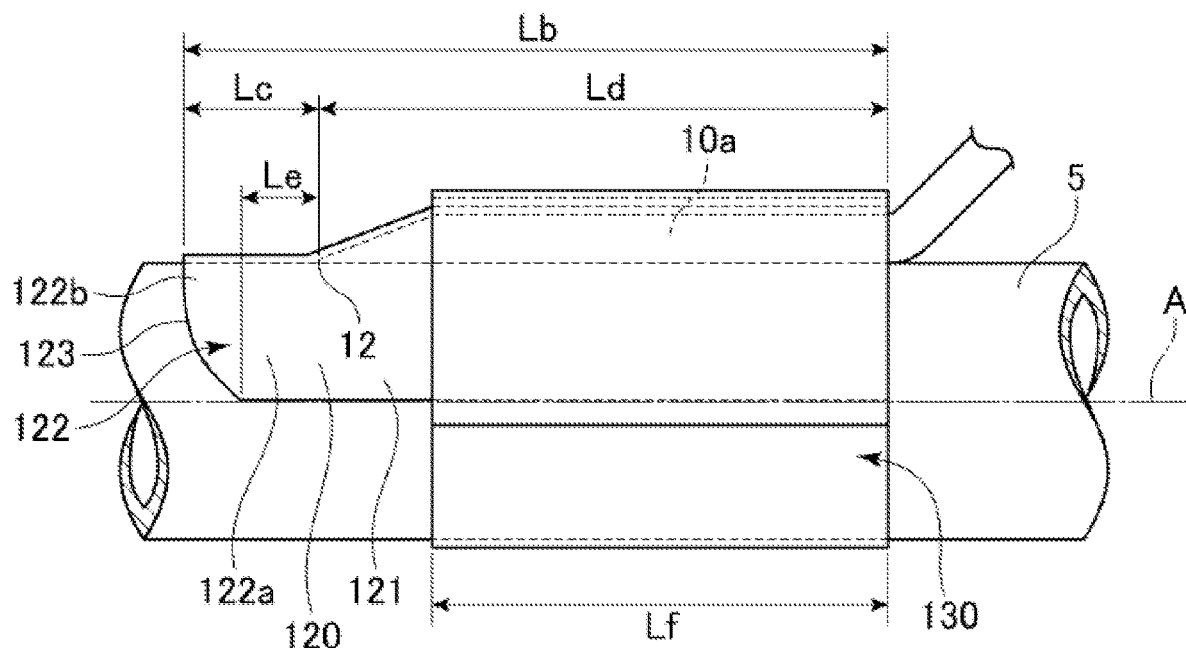
FIG. 7 is an enlarged right side view schematically illustrating the region near the fishing line guide of the fishing rod shown in FIG. 6.
Figure 8:
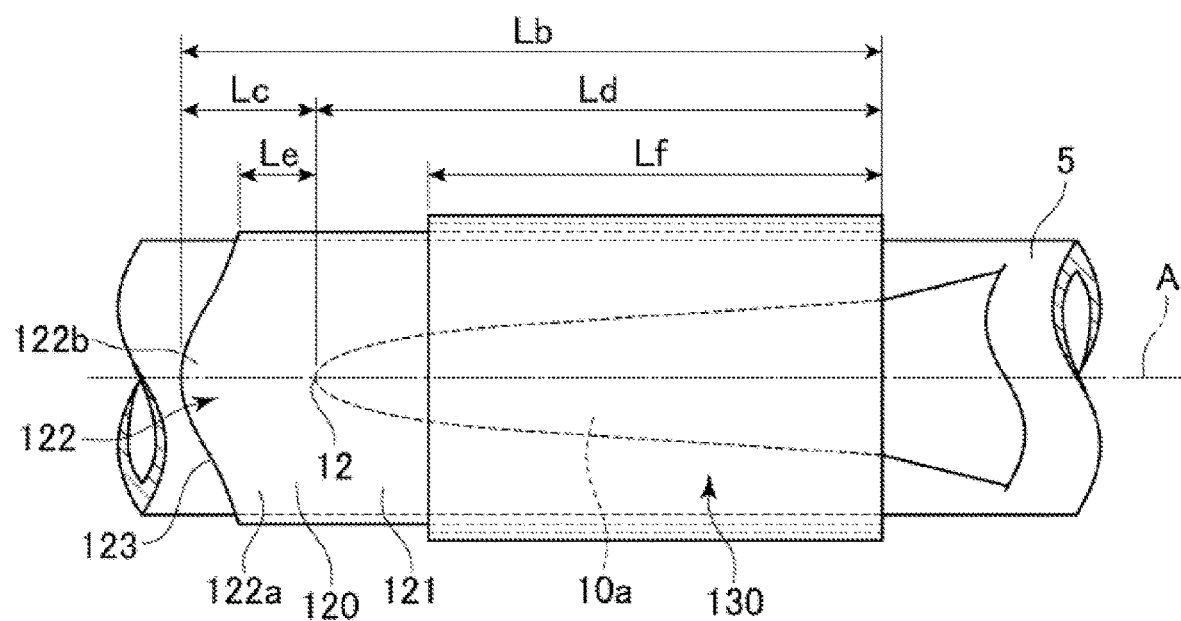
FIG. 8 is an enlarged plan view schematically illustrating the region near the fishing line guide of the fishing rod shown in FIG. 6.

As clearly shown in FIGS. 7 and 8, the first fiber-reinforced resin layer 120 has a first portion 121 extending and positioned in the axial direction to overlap the foot 10a and a second portion 122 extending from the back end of the first portion 121 backward in the axial direction A.

Figure 9:
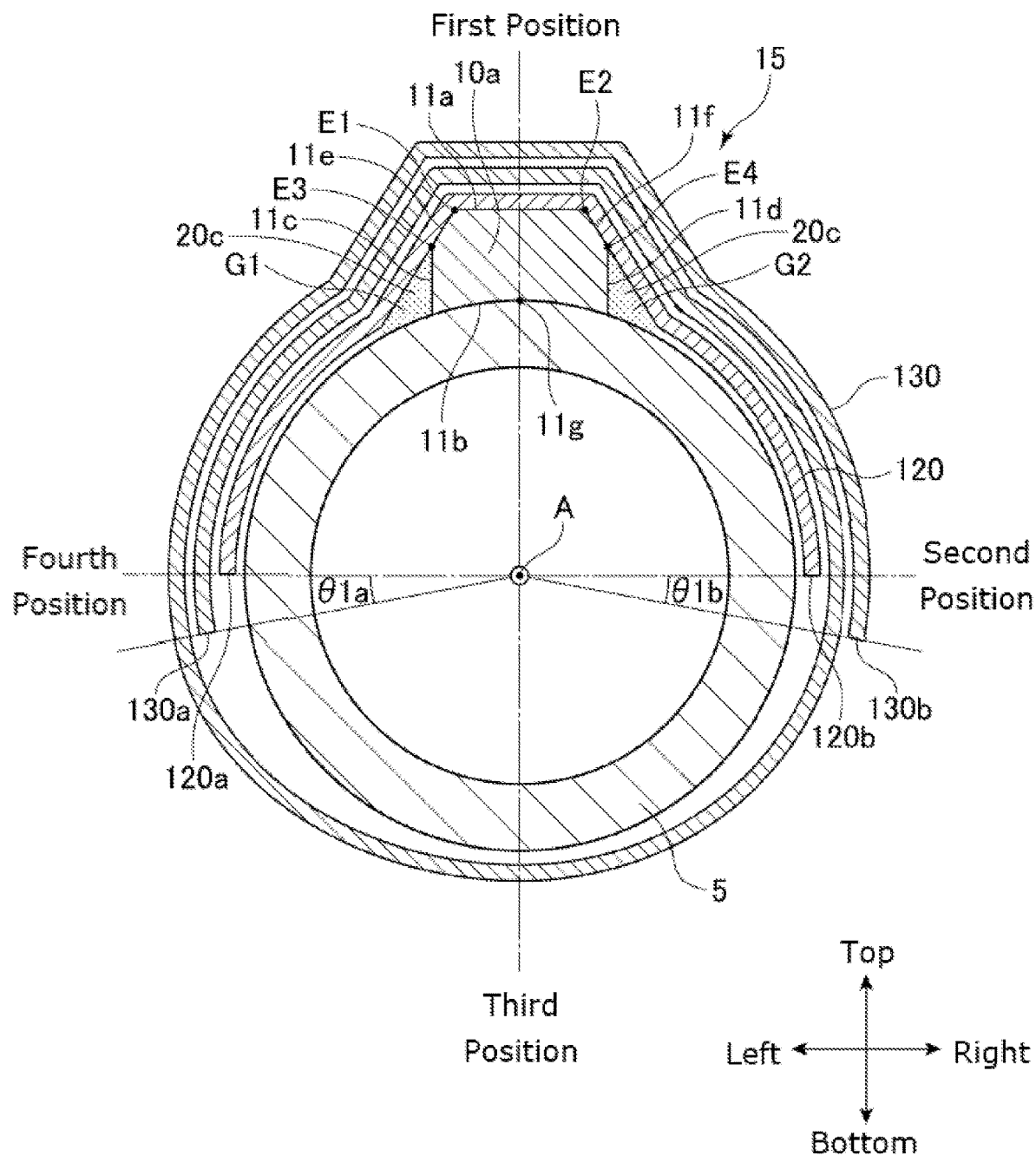
FIG. 9 is a sectional view showing a section obtained by cutting the fishing rod shown in FIG. 6 along a line II-II.

In one embodiment, the first portion 121 of the first fiber-reinforced resin layer 120 extends, in the circumferential direction around the central axis A, clockwise from the first position (the mounting position of the fishing line guide 10B) to the second position and anti-clockwise from the first position to the fourth position. Accordingly, as shown in FIG. 9, one end 120a of the first portion 121 of the first fiber-reinforced resin layer 120 is positioned 90° anti-clockwise from the first position, and the other end 120b is positioned 90° away clockwise from the first position.

In one embodiment, the second portion 122 of the fiber-reinforced resin layer 120 has a base end portion 122a connected to the back end of the first portion 121 and a tip end portion 122b extending backward from the back end of the base end portion 122a. Like the first portion 121, the base end portion 122a extends, in the circumferential direction around the central axis A, clockwise from the first position (the mounting position of the fishing line guide 10B) to the second position and anti-clockwise from the first position to the fourth position.

The tip end portion 122b extends, in the circumferential direction around the central axis A, clockwise from the first position less than 90° and also anti-clockwise from the first position less than 90°. The length of the tip end portion 122b in the circumferential direction varies among respective positions determined in the axial direction. For example, as best seen in the right side view of FIG. 7, at the position near the base end portion 122a in the axial direction along the central axis A (the front end of the tip end portion 122b), the tip end portion 122b extends to the vicinity of the second position. On the other hand, at the position distant from the base end portion 122a (the back end of the tip end portion 122b), the tip end portion 122b extends only slightly in the circumferential direction. When seen from the left side, at the position near the base end portion 122a (the front end of the tip end portion 122b), the tip end portion 122b extends to the vicinity of the fourth position. On the other hand, at the position distant from the base end portion 122a (the back end of the tip end portion 122b), the tip end portion 122b extends only slightly in the circumferential direction. In one embodiment, when seen from the side, the back end surface 123 of the tip end portion 122b is a backward convex curved surface, as shown in FIG. 7.

In one embodiment, Lb denotes the length of the first fiber-reinforced resin layer 120 in the axial direction along the central axis A, Lc denotes the length between the tip end 12 of the foot 10a and the back end of the tip end portion 122b, Ld denotes the length of the foot 10a in the axial direction along the central axis A, and Le denotes the length between the tip end 12 of the foot 10a and the back end of the base end portion 122a. The lengths Lb to Le identified in FIGS. 6 to 9 may be respectively equal to the lengths Lb to Le identified in FIGS. 2 to 5.

On the outer side of the first fiber-reinforced resin layer 120, a second fiber-reinforced resin layer 130 is provided. The second fiber-reinforced resin layer 130 has a length Lf in the axial direction. The second fiber-reinforced resin layer 130 may be provided such that its front end is at the same position as the front-side end of the foot 10a. In one embodiment, the second fiber-reinforced resin layer 130 extends in the axial direction without overlapping the tip end 12 of the foot 10a. In this case, the tip end 12 of the foot 10a is covered by the first fiber-reinforced resin layer 120 but not by the second fiber-reinforced resin layer 130. In one embodiment, the second fiber-reinforced resin layer 130 is configured such that its axial length Lf satisfies the relation Ld/2≤Lf<Ld where Ld denotes the axial length of the foot 10a.

In one embodiment, the number of windings of the second fiber-reinforced resin layer 130 is designed to be one or more plies for reliably fixing the fishing line guide 10B and less than two plies for reducing the weight. In one embodiment, the second fiber-reinforced resin layer 130 is provided such that its one end 130a is positioned no less than 90° and less than 180° anti-clockwise from the mounting position of the fishing line guide 10B in the circumferential direction around the central axis A as shown in FIG. 9. In the illustrated embodiment, the end 130a of the second fiber-reinforced resin layer 130 is positioned 90°+θ1a (0≤θ1a<90°) anti-clockwise in the circumferential direction from the mounting position of the fishing line guide 10B (i.e., from the center portion 11g). In one embodiment, the second fiber-reinforced resin layer 130 is arranged such that the other end 130b is on the other side of the end 130a with respect to the mounting position (the center portion 11g) of the fishing line guide 10B in the circumferential direction around the central axis A. In one embodiment, the other end 130b of the second fiber-reinforced resin layer 130 is positioned no less than 90° and less than 180° away clockwise from the mounting position of the fishing line guide 10B. In the illustrated embodiment, the other end 130b of the second fiber-reinforced resin layer 130 is positioned 90°+θ1b (0≤θ1b<90°) away clockwise in the circumferential direction from the mounting position. The angle θ1b may be either equal to or different from the angle θ1a.

Figure 6:
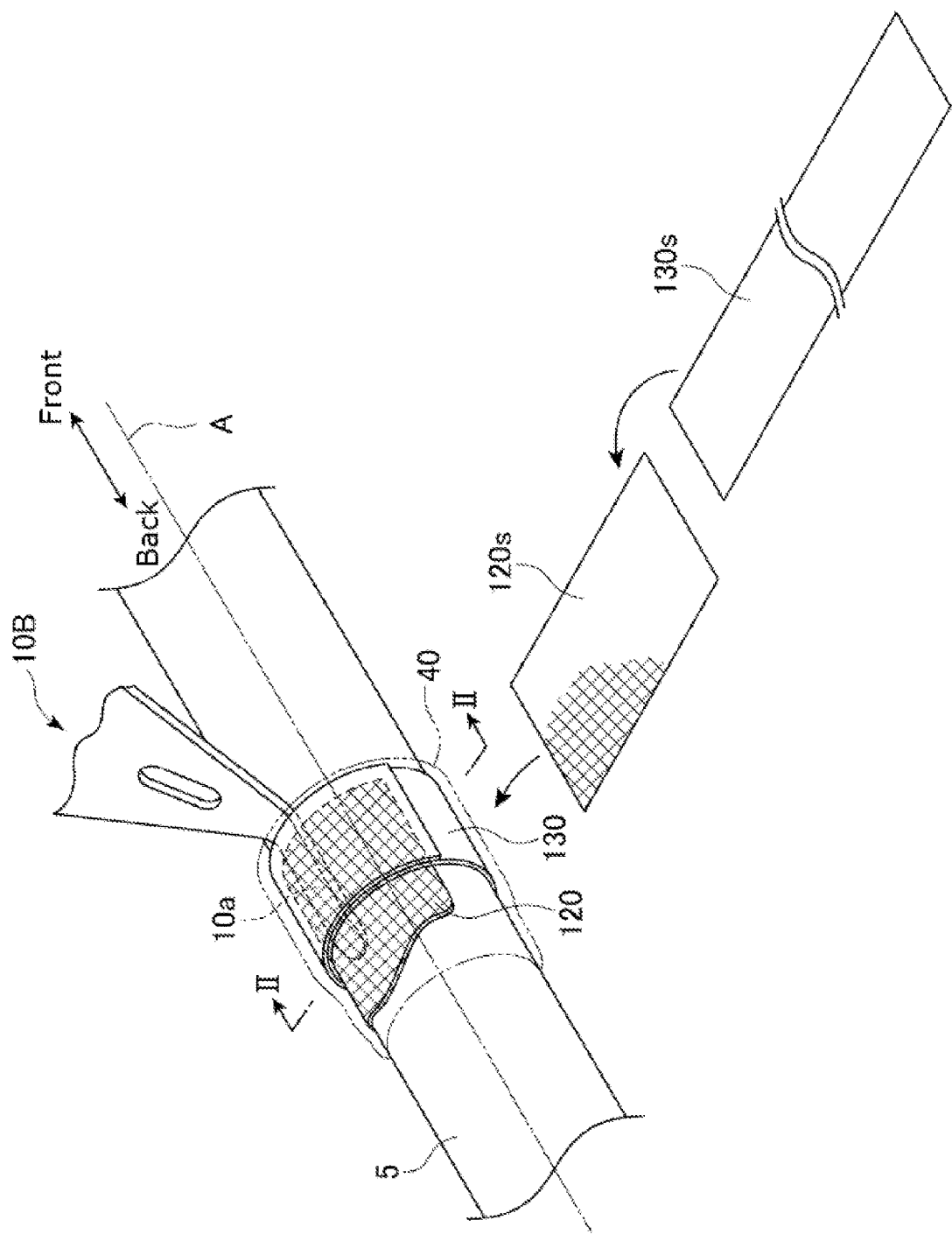
FIG. 6 is an enlarged perspective view schematically illustrating a region near a fishing line guide of a fishing rod according to a modification example of the first embodiment.

When the first and second fiber-reinforced resin layers 120 and 130 are used to mount the fishing line guide 10B on the intermediate rod 5, the rod 5, the fishing line guide 10B and prepreg sheets 120s and 130s are prepared as shown in FIG. 6. The prepreg sheets 120s and 130s may be made in a similar manner as the prepreg sheet 20s. The prepreg sheet 130s is configured such that its axial length is equal to the axial length Lf of the first fiber-reinforced resin layer 130.

As shown in FIG. 6, in order to mount the fishing line guide 10B on the rod 5, the foot 10a of the fishing line guide 10B is placed on the outer peripheral surface of the intermediate rod 5. Subsequently, one end of the prepreg sheet 120s is placed on the outer peripheral surface of the intermediate rod 5, and the prepreg sheet 120s is wound in 0.5 plies around the outer peripheral surface of the intermediate rod 5 such that the prepreg sheet 120s covers the foot 10a and the outer peripheral surface of the intermediate rod 5. These winding start and end positions are varied as appropriate. While the prepreg sheet 120s is wound, tension is applied backward in the axial direction to its portion wound on the first position. This tension applied backward in the axial direction deforms the prepreg sheet 120s such that it protrudes backward near the first position determined in the circumferential direction. The portion of the prepreg sheet 120s that is deformed to protrude backward serves as the tip end portion 122b of the second portion 122 of the first fiber-reinforced resin layer 120 after curing.

Subsequently, on the outer side of the prepreg sheet 120s, the prepreg sheet 130s is wound in a predetermined number of plies. In one embodiment, the winding of the prepreg sheet 130s starts at the position 90°+θ1a anti-clockwise from the mounting position of the fishing line guide 10B (the center portion 11g) and ends at the position 90°+θ1b away clockwise from the mounting position, as shown in FIG. 9. These winding start and end positions are varied as appropriate.

Following this, a winding, where the prepreg sheets 120s and 130s are wound around the rod 5, is heated. This causes the matrix resin contained in the prepreg sheets 120s and 130s to become flowable and then cured, so that the first and second fiber-reinforced resin layers 120 and 130 are formed. These first and second fiber-reinforced resin layers 120 and 130 fix the fishing line guide 10B to the rod 5.

In one embodiment described above, the fiber-reinforced resin layer 20 is divided into the first portion 21 covering the intermediate rod 5 along the entire length thereof in the circumferential direction around the central axis A and the second portion 22 extending from the first position where the foot 10a of the fishing line guide 10B is provided, in the circumferential direction, clockwise less than 180° and also extending anti-clockwise less than 180°. Stated differently, while the first portion 21, which covers the intermediate rod 5 along its entire length in the circumferential direction, can rigidly fix the fishing line guide 10B onto the intermediate rod 5, the second portion 22 only covers a part of the intermediate rod 5 in the circumferential direction. With such configurations, at a position determined in the axial direction and overlapping the second portion 22, the intermediate rod 5 is partially not covered by the fiber-reinforced resin layer 20 in the circumferential direction. This can accordingly reduce the influence to be made on the bending of the intermediate rod 5 by the fiber-reinforced resin layer used to mount the fishing line guide 10B onto the intermediate rod 5.

According to one embodiment described above, the back end surface 23a of the base end portion 22a of the second portion 22 is a frontward convex curved surface. This can increase the area of the outer peripheral surface of the intermediate rod 5 that is not covered by the second portion 22. This can accordingly further reduce the influence to be made on the bending of the intermediate rod 5 by the fiber-reinforced resin layer used to mount the fishing line guide 10B onto the intermediate rod 5.

According to one embodiment described above, the back end surface 23b of the tip end portion 22b of the second portion 22 is a backward convex curved surface. This allows the tip end portion 22b to cover a large part of the region in the vicinity of the first position, where the foot 10a of the fishing line guide 10B is positioned, in the circumferential direction around the central axis A. This can contribute to more rigidly mount the fishing line guide 10B onto the intermediate rod 5.

According to one embodiment described above, the fiber-reinforced resin layer 20 has a thickness equal to two layers of the prepreg sheet 20s in the regions facing the gaps G1 and G2 in the circumferential direction, as shown in FIG. 3. Similarly, the second fiber-reinforced resin layer 130 has a thickness equal to two layers of the second sheet 30s in the regions facing the gaps G1 and G2 in the circumferential direction. This can reduce pin holes or voids, which may be created by the matrix resin flowing into the gaps G1 and G2 from the prepreg sheet 20s.

According to one embodiment described above, the fiber-reinforced resin layer 120 has a thickness equal to one layer of the prepreg sheet 120s in the regions facing the gaps G1 and G2 in the circumferential direction and the fiber-reinforced resin layer 130 has a thickness equal to two layers of the prepreg sheet 130s in the regions facing the gaps G1 and G2 in the circumferential direction, as shown in FIG. 9. This can further reduce pin holes or voids, which may be created by the matrix resin flowing into the gaps G1 and G2 from the prepreg sheets 120s and 130s.

In the above-described embodiments, L1 may denote a tangent line drawn from the top edge E3 of the side surface 11c of the foot 10a toward the outer peripheral surface of the intermediate rod 5. Likewise, L2 may denote a tangent line drawn from the top edge E4 of the side surface 11d of the foot 10a toward the outer peripheral surface of the intermediate rod 5.

According to one embodiment described above, the adhesive force between the outer peripheral surface of the intermediate rod 5 and a portion of the fiber-reinforced resin layer 20 near the one end 20a (the portion in the region rotated anti-clockwise from a point of tangency P1 in the circumferential direction) and a portion near the other end 20b (the portion in the region rotated clockwise from a point of tangency P2 in the circumferential direction) can prevent the left and right edges of the bottom surface 11b of the foot 10a from moving away upward.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

In addition to the fishing line guides 10, the reel seat 9 can also be mounted on the associated rod in the same manner as described for the fishing line guides 10B. For example, the reel seat 9 can be mounted on the butt rod 3 via the fiber-reinforced resin layer 20 and the second fiber-reinforced resin layer 130.

Second Embodiment

Next, a second embodiment of the present invention will be described. The second embodiment of the present invention is made in light of the following technical context and problems.

There are known fishing rods having fittings such as line guides and a reel seat mounted on a rod body. The fittings are conventionally mounted on the rod body with a thread or a resin sheet.

Fishing rods having fittings mounted on a rod body with a thread are disclosed in, e.g., Japanese Patent Application Publication No. 2008-263841 (Patent Literature 4) and Japanese Patent Application Publication No. 2004-194563 (Patent Literature 5).

Conventional fishing rods having fittings mounted on the rod body with a thread encounter the following problem. If the fishing line or reel applies a force to the fittings, the thread may easily become loose.

Fishing rods having fittings mounted on a rod body with a resin sheet are disclosed in, e.g., the Japanese Utility Model Application Publication No. Hei 2-26474 (Patent Literature 1), International Publication No. WO2018/042856 (Patent Literature 2) and International Publication No. WO 2018/061345 (Patent Literature 3). The resin sheet disclosed in these patent literatures is a prepreg sheet obtained by impregnating reinforcement fibers with a matrix resin containing a thermosetting resin.

The prepreg sheet is wound around the rod body so as to cover the mounting parts of the fittings, and gaps are thus created between (i) the prepreg sheet and (ii) the mounting parts and the outer peripheral surface of the rod body. When the prepreg sheet is used to mount the fittings onto the rod body, the matrix resin becomes more flowable and resultantly flows into these gaps upon heating. For this reason, the matrix resin is easily lost from the regions of the prepreg sheet facing these gaps. If the matrix resin cures with part of it being lost, visible pin holes and voids may be disadvantageously created in the regions of the cured prepreg sheet that face the gaps. Since the appearance quality is one of the important evaluation points for the fishing rod products, it is desired to completely or partially prevent defective appearance caused by pin holes and voids.

Once flowable, the resin not only flows inwardly toward the rod body (for example, into the above-mentioned gaps) but also may flow outwardly to the regions in front of and behind the fittings along the outer peripheral surface of the rod body. The resin flowing to the regions in front of and behind the fittings is another one of the causes of the compromised appearance quality.

One of the objects of the second embodiment of the present invention is to reduce the degradation in the appearance quality of the layer made from the prepreg sheet used to fix the fittings onto the rod body. Other objects of the second embodiment of the present invention will be apparent with reference to the entire description in this specification.

A fishing rod according to one embodiment includes an elongated rod body extending along a central axis, a fitting mounted on the rod body, a first fiber-reinforced resin layer surrounding the rod body, and a second fiber-reinforced resin layer provided on an outer side of the first fiber-reinforced resin layer. The fitting has a mounting part and is mounted on the rod body such that the mounting part is in contact with an outer peripheral surface of the rod body. The first fiber-reinforced resin layer surrounds the rod body so as to cover the mounting part. The first fiber-reinforced resin layer is made from a first prepreg sheet made of first reinforcement fibers impregnated with a first matrix resin, and the second fiber-reinforced resin layer is made from a second prepreg sheet made of second reinforcement fibers impregnated with a second matrix resin. Wettability of the first reinforcement fibers with the second matrix resin is higher than wettability of the second reinforcement fibers with the second matrix resin.

In one embodiment, the first reinforcement fibers are organic fibers. The organic fibers may be one selected from the group consisting of polyester fibers, aramid fibers, and aromatic polyamide fibers.

In one embodiment, the second reinforcement fibers are carbon or glass fibers.

In one embodiment, at least one of a main component of the first matrix resin and a main component of the second matrix resin is an epoxy resin.

In one embodiment, the mounting part has a bottom surface in contact with the outer peripheral surface of the rod body and a top surface facing the bottom surface, the top surface of the mounting part has a first edge, which is one of edges thereof in a circumferential direction around the central axis, and one end of the first fiber-reinforced resin layer is, in the circumferential direction, on the other side of the mounting part with respect to a point of tangency between the outer peripheral surface of the rod body and a tangent line drawn toward the outer peripheral surface of the rod body from the first edge.

In one embodiment, the one end of the first fiber-reinforced resin layer is, in the circumferential direction, positioned no less than 90° and less than 180° anti-clockwise from the mounting part.

In one embodiment, the top surface of the mounting part has a second edge, which is opposite to the first edge in the circumferential direction, and the other end of the first fiber-reinforced resin layer is, in the circumferential direction, on the other side of the mounting part with respect to a point of tangency between the outer peripheral surface of the rod body and a tangent line drawn toward the outer peripheral surface of the rod body from the second edge.

In one embodiment, the other end of the first fiber-reinforced resin layer is, in the circumferential direction, positioned no less than 90° and less than 180° away clockwise from the mounting part.

In one embodiment, the first fiber-reinforced resin layer is wound in one or more plies around the rod body.

In one embodiment, the fitting is a fishing line guide. In one embodiment, the fitting is a reel seat.

The second embodiment of the present invention can reduce the degradation in the appearance quality of the layer made from the prepreg sheet used to fix the fittings onto the rod body.

The second embodiment of the present invention will be hereinafter described with reference to the accompanying drawings. In the drawings, constituent elements common to different views are denoted by the same reference signs. It should be noted that, for convenience of explanation, the drawings are not necessarily drawn to scale.

Figure 10:
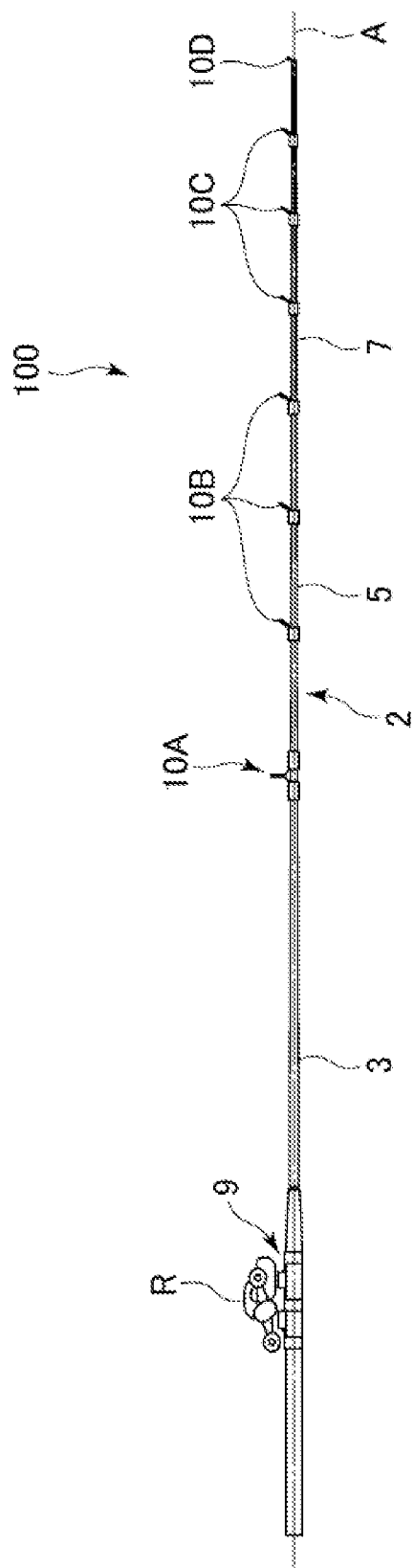
FIG. 10 shows a fishing rod according to a second embodiment of the present invention.

FIG. 10 shows a fishing rod according to the second embodiment of the present invention. As shown, a fishing rod 100 according to the second embodiment of the present invention includes an elongated rod body 2 extending along a central axis, a reel R mounted on the rod body 2 via a reel seat 9, and fishing line guides 10 mounted on the rod body 2. In the embodiment shown, the reel seat 9 and the fishing line guides 10 are fittings mounted on the outer peripheral surface of the rod body.

The rod body 2 is made up of, for example, a butt rod 3, an intermediate rod 5, and a tip rod 7 connected together. For example, these rods are jointed together by ordinary jointing. The butt rod 3, the intermediate rod 5, and the tip rod 7 may also be jointed together by telescopic jointing, inverse ordinary jointing, spigot jointing, or any other known jointing methods. Alternatively, the rod body 2 may be made of a single rod.

The butt rod 3, the intermediate rod 5, and the tip rod 7 are formed of, for example, a tube made of a fiber reinforced resin. The tube made of a fiber reinforced resin can be formed by preparing a fiber reinforced resin prepreg (a prepreg sheet) made of reinforcement fibers impregnated with a matrix resin, winding the prepreg sheet on a core, and heating and curing the prepreg sheet. The reinforcement fibers included in the prepreg sheet may be, for example, carbon fibers, glass fibers, or any other known reinforcement fibers. The matrix resin included in the prepreg sheet may be a thermosetting resin such as epoxy resin. After the prepreg sheet is cured, the core is removed. The outer peripheral surface of the tube may be polished as necessary. Each of the rods may be formed solid.

In the embodiment shown, the butt rod 3, the intermediate rod 5, and the tip rod 7 are provided with a plurality of fishing line guides 10 (the fishing line guides 10A to 10D) for guiding a fishing line released from the reel R mounted to the reel seat 9. More specifically, the butt rod 3 is provided with a single fishing line guide 10A, the intermediate rod 5 is provided with three fishing line guides 10B, and the tip rod 7 is provided with three fishing line guides 10C. The top guide 10D is provided at a distal end of the tip rod 7. The rod body 2 may have any number of fishing line guides 10 mounted thereon. In the illustrated example, the rod body 2 has eight fishing line guides including the top guide 10D mounted thereon, but the rod body 2 may have nine or more, or seven or less fishing line guides mounted thereon.

In the embodiment shown, the reel seat 9 is mounted on the outer peripheral surface of the butt rod 3. The reel seat 9 is any reel seat as long as it allows the reel R to be mounted thereto.

Figure 11:
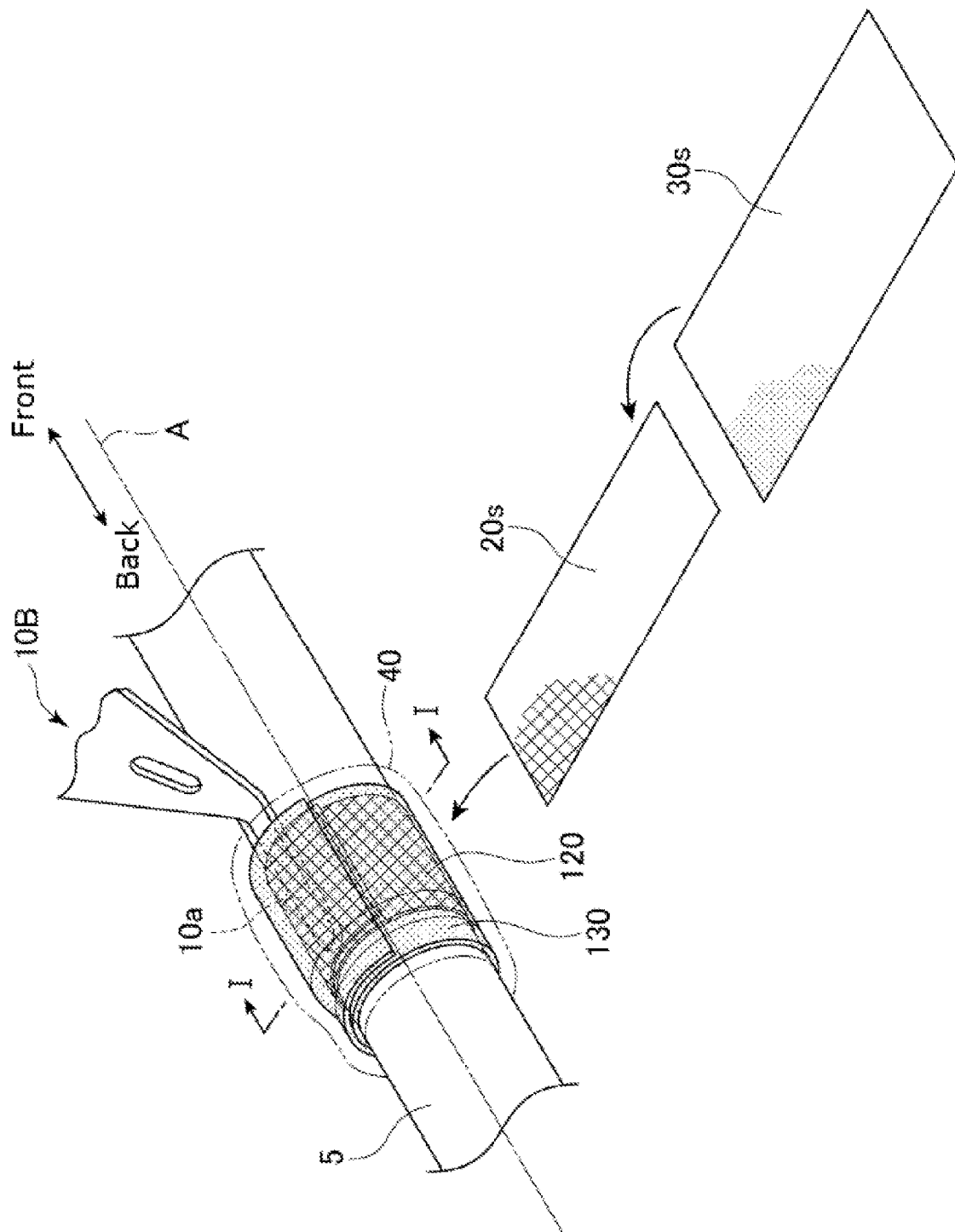
FIG. 11 is an enlarged schematic view illustrating a region near a fishing line guide of the fishing rod shown in FIG. 10.
Figure 12:
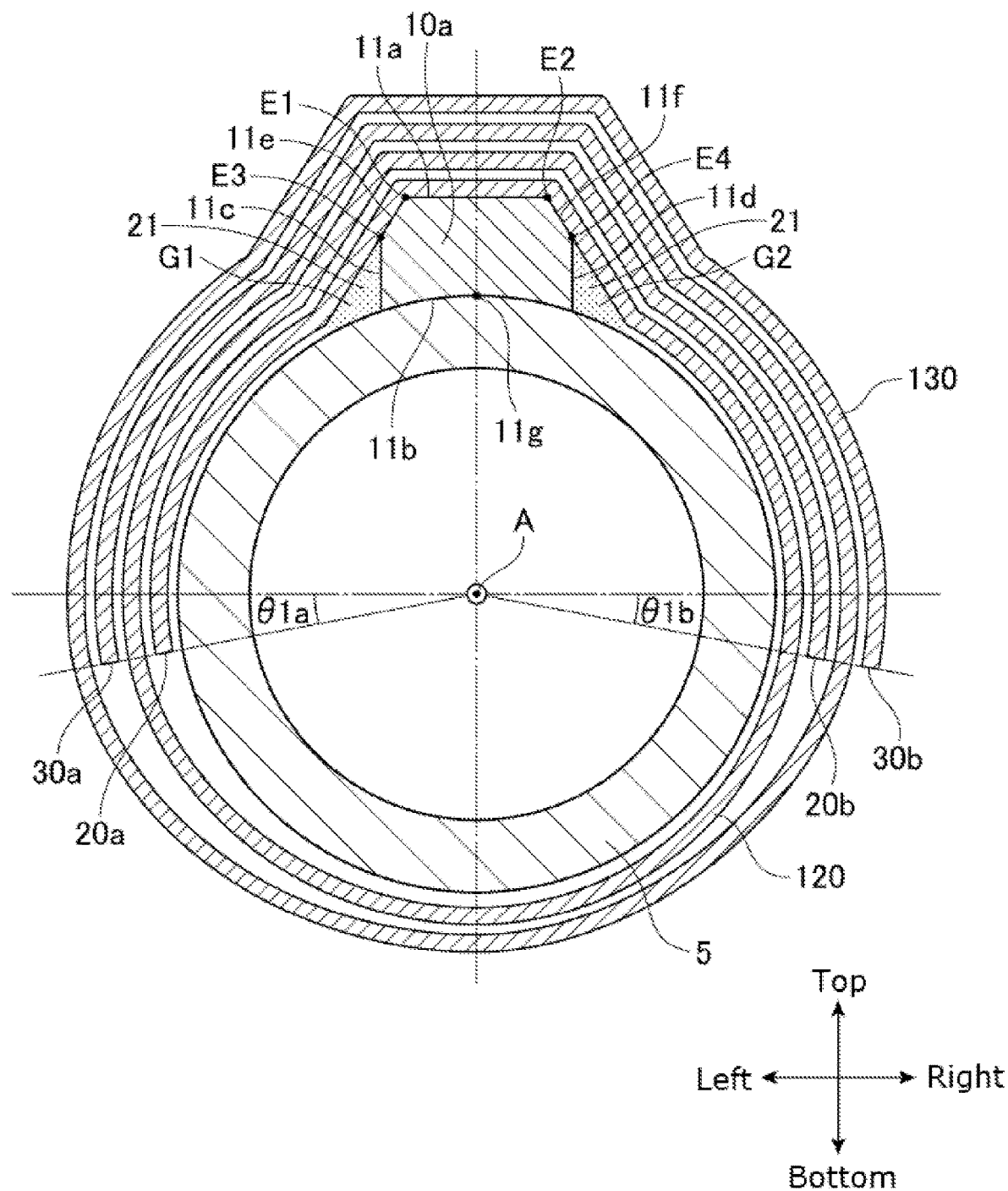
FIG. 12 is a sectional view obtained along a line I-I in FIG. 11.

Next, with further reference to FIGS. 11 and 12, a description is given of the structure and manner of mounting of the fishing line guide 10B onto the intermediate rod 5. FIG. 11 is a perspective view to illustrate the manner of mounting of the fishing line guide 10B onto the intermediate rod 5, and FIG. 12 is a schematic cross-sectional view along the line I-I in FIG. 11. The top-and-bottom and left-and-right directions of the rod 5 and the fishing line guide 10B respectively refer to the top-and-bottom and left-and-right directions in FIG. 12.

As shown in these drawings, the fishing line guide 10B has a foot 10a extending along the axis of the intermediate rod 5 and is mounted on the outer peripheral surface of the intermediate rod 5 via the foot 10a. The foot 10a of the fishing line guide 10B is an example of the mounting part of the fitting. When seen in the cross-section, the foot 10a of the fishing line guide 10B has a top surface 11a, a bottom surface 11b opposing the top surface 11a, and side surfaces 11c and 11d connecting together the top and bottom surfaces 11a and 11b. The fishing line guide 10B is mounted on the intermediate rod 5 such that the bottom surface 11b of the foot 10a is in contact with the outer peripheral surface of the intermediate rod 5. The bottom surface 11b of the foot 10a is partially or entirely in contact with the outer peripheral surface of the intermediate rod 5. In the illustrated embodiment, since the curvature of the bottom surface 11b is substantially equal to the curvature of the outer peripheral surface of the intermediate rod 5, the bottom surface 11b is almost entirely in contact with the outer peripheral surface of the intermediate rod 5. If the curvature of the bottom surface 11b is different from the curvature of the outer peripheral surface of the intermediate rod 5, the bottom surface 11b is only partially in contact with the outer peripheral surface of the intermediate rod 5. Since the bottom surface 11b of the foot 10a is in contact with the outer peripheral surface of the intermediate rod 5, a filling member, such as disclosed in, for example, Japanese Utility Model Application Publication No. Hei 2-026474 is not provided between the foot 10a and the intermediate rod 5. If the curvature of the bottom surface 11b is different from the curvature of the outer peripheral surface of the intermediate rod 5, however, it should be noted that a resin may be interposed between the bottom surface 11b and the outer peripheral surface of the intermediate rod 5 due to the resin flowing from a prepreg sheet, described below.

The foot 10a is beveled at the portion where the top surface 11a is connected to the side surface 11c and at the portion where the top surface 11a is connected to the side surface 11c. In the illustrated embodiment, beveled surfaces 11e and 11f are formed at the left and right edges of the top surface 11a of the foot 10a. The beveled surface 11e is the surface connecting together the top and side surfaces 11a and 11c. The beveled surface 11f is the surface connecting together the top and side surfaces 11a and 11d. The top surface 11a is connected at the left edge E1 thereof to the beveled surface 11e and connected at the right edge E2 thereof to the beveled surface 11f. As illustrated in FIG. 12, the left edge E1 of the top surface 11a is one of the edges of the top surface 11a facing each other in the circumferential direction around the central axis A, and the right edge E2 of the top surface 11a is the other of the edges of the top surface 11a facing each other in the circumferential direction. The left edge E1 of the top surface 11a is an example of a first edge, and the right edge E2 of the top surface 11a is an example of a second edge. The side surface 11c is connected at the top edge E3 thereof to the beveled surface 11e and the side surface 11d is connected at the top edge E4 thereof to the beveled surface 11e.

In one aspect, at least one of the beveled surfaces 11e and 11f may form a part of the top surface 11a. Stated differently, the top surface 11a may refer to the region including the beveled surfaces 11e and 11f. In this case, the top edge E3 of the side surface 11c is treated as the left edge (first edge) of the top surface 11a, and the top edge E4 of the side surface 11d is treated as the right edge (second edge) of the top surface 11a.

On the outer side of the foot 10a of the fishing line guide 10B, there are provided a first fiber-reinforced resin layer 120, a second fiber-reinforced resin layer 130 and a coating layer 40. The terms "outer side" and "inner side" refer to "the outer side" and "the inner side" in the radial direction of the intermediate rod 5, respectively, unless otherwise construed from the context.

The first fiber-reinforced resin layer 120 surrounds the intermediate rod 5 such that the first fiber-reinforced resin layer 120 covers the foot 10a. In one embodiment, the number of windings of the first fiber-reinforced resin layer 120 is designed to be one or more plies for reliably fixing the fishing line guide 10B and less than two plies for reducing the weight. On the outer side of the first fiber-reinforced resin layer 120, the second fiber-reinforced resin layer 130 is provided. In one embodiment, the number of windings of the second fiber-reinforced resin layer 130 is designed to be no less than one ply and less than two plies.

In one embodiment, the first fiber-reinforced resin layer 120 is provided such that its one end 20a is positioned no less than 90° and less than 180° anti-clockwise from the fishing line guide 10B (for example, the center portion 11g of the foot 10a of the fishing line guide 10B that is centrally positioned in the circumferential direction) in the circumferential direction around the central axis A, as shown in FIG. 12. In the illustrated embodiment, the end 20a of the first fiber-reinforced resin layer 120 is positioned 90°+θ1a (0≤θ1a<90°) anti-clockwise in the circumferential direction from the center portion 11g.

In one embodiment, the other end 20b of the first fiber-reinforced resin layer 120 is on the other side of the end 20a with respect to the center portion 11g of the fishing line guide 10B in the circumferential direction around the central axis A. In one embodiment, the other end 20b of the first fiber-reinforced resin layer 120 is positioned no less than 90° and less than 180° away clockwise from the center portion 11g of the fishing line guide 10B. In the illustrated embodiment, the other end 20b of the first fiber-reinforced resin layer 120 is positioned 90°+θ1b (0≤θ1b<90°) away clockwise in the circumferential direction from the center portion 11g. The angle θ1b may be either equal to or different from the angle θ1a. In the illustrated embodiment, the angle θ1a is equal to the angle θ1b. Accordingly, the other end 20b of the first fiber-reinforced resin layer 120 is symmetrically arranged to the end 20a with respect to the center portion 11g of the fishing line guide 10B in the circumferential direction around the central axis A. When the ends 20a and 20b of the first fiber-reinforced resin layer 120 are symmetrically arranged with respect to the center portion 11g of the fishing line guide 10B in the circumferential direction around the central axis A as described above, the center of gravity of the intermediate rod 5 can avoid being shifted to the left or right off the central axis A.

As described above, the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g. With such arrangements, the number of windings of the first fiber-reinforced resin layer 120 can be 1.5 plies or more and less than 2.0 plies.

When the fishing rod 100 is used, the fishing line applies, to the fishing line guide 10B, a force that is directed to swing the fishing line guide 10B around the central axis A of the rod body. This force results in the left and right edges of the bottom surface 11b of the foot 10a moving upward away from the outer peripheral surface of the intermediate rod 5. If the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g, the portions of the first fiber-reinforced resin layer 120 near the ends 20a and 20b function as hooks when the force applied by the fishing line causes the foot 10a to move away upward, so that the left and right edges of the foot 10a can be prevented from moving away upward.

In one embodiment, the second fiber-reinforced resin layer 130 is arranged on the outer side of the first fiber-reinforced resin layer 120 such that its one end 30a is positioned 90°+θ1a (0≤θ1a<90°) anti-clockwise in the circumferential direction from the center portion 11g and the other end 30b is positioned 90°+θ1b away clockwise from the center portion 11g. As described above, in the circumferential direction around the central axis A, the end 20a of the first fiber-reinforced resin layer 120 is at the same position as the end 30a of the second fiber-reinforced resin layer 130 in the illustrated embodiment, but the end 20a of the first fiber-reinforced resin layer 120 may be differently positioned from the end 30a of the second fiber-reinforced resin layer 130. Likewise, the other end 20b of the first fiber-reinforced resin layer 120 is at the same position as the other end 30b of the second fiber-reinforced resin layer 130 in the illustrated embodiment, but the other end 20b of the first fiber-reinforced resin layer 120 may be differently positioned in the circumferential direction from the other end 30b of the second fiber-reinforced resin layer 130.

As described above, the fishing line guide 10B is mounted on the outer peripheral surface of the intermediate rod 5 via the foot 10a with the use of the first and second fiber-reinforced resin layers 120 and 130. FIG. 12 arranges the constituent components such that gaps are provided between the outer peripheral surface of the intermediate rod 5 and the first fiber-reinforced resin layer 120 and between the first fiber-reinforced resin layer 120 and the second fiber-reinforced resin layer 130 for the sake of intelligibility. In fact, however, the first fiber-reinforced resin layer 120 is in close contact with the outer peripheral surface of the intermediate rod 5, and the first and second fiber-reinforced resin layers 120 and 130 are also in close contact with each other.

The coating layer 40 is a coating film made of a resin provided on the outer side of the second fiber-reinforced resin layer 130 so as to cover the second fixing layer 30. As shown, the coating layer 40 may be provided to coat the entire second fixing layer 30. In FIG. 12, the coating layer 40 is not shown for convenience of description.

The coating layer 40 may be formed of various resin materials such as epoxy, urethane, acrylic, or UV-curable resins (e.g., urethane acrylate, acrylic resin acrylate, epoxy acrylate). The materials of the coating layer 40 are not limited to those named herein but are various. The coating layer 40 may be either transparent or colored.

As shown in FIG. 12, the side surface 11c of the foot 10a, the outer peripheral surface of the intermediate rod 5 and the inner peripheral surface of the first fiber-reinforced resin layer 120 bound a gap G1. Similarly, the side surface 11d of the foot 10a, the outer peripheral surface of the intermediate rod 5 and the inner peripheral surface of the first fiber-reinforced resin layer 120 bound a gap G2. When a first sheet 20s, described below, is heated, the matrix resin contained in the first sheet 20s becomes flowable and flows into the gaps G1 and G2. Accordingly, the gaps G1 and G2 are at least partially filled with a resin 21, originating from the matrix resin contained in the first sheet 20s.

The following describes, for example, a method of how to mount the fishing line guide 10B onto the intermediate rod 5. The process of mounting the fishing line guide 10B on the intermediate rod 5 begins with preparing the rod 5, the fishing line guide 10B, the first sheet 20s, and a second sheet 30s.

As described above, the rod 5 is made by heating and curing a prepreg sheet wound on a core.

The fishing line guide 10B may be any fixed guide. The fishing line guide 10B may be either a single-foot guide as shown or a double-foot guide.

The first sheet 20s is a prepreg sheet made from reinforcement fibers impregnated with a matrix resin. The reinforcement fibers contained in the first sheet 20s are example first reinforcement fibers, and the matrix resin contained in the first sheet 20s is an example first matrix resin.

The reinforcement fibers contained in the first sheet 20s are organic fibers. The organic fibers are, for example, fibers of one or more types selected from the group consisting of polyolefin, polyamide, polyacrylonitrile, and polyester. The matrix resin is, for example, a thermosetting resin. A thermosetting resin cures irreversibly by chemical reaction upon heating. Thermosetting resins that can be used as the matrix resin making the first sheet 20s include, for example, urea resins, melamine resins, phenolic resins, epoxy resins, unsaturated polyester resins, alkyd resins, and urethane resins. The first sheet 20s has a thickness of, for example, 20 μm to 300 μm. The first sheet 20s may be a commercially available sheet that can be used suitably.

The resin content of the matrix resin in the first sheet 20s is, for example, 40 wt % to 85 wt %, relative to 100 wt % of the total mass of the reinforcement fibers and matrix resin in the first sheet 20s.

The reinforcement fibers contained in the first sheet 20s may be arranged regularly at an angle with respect to the axial direction along the central axis A of the rod body 2. For example, the reinforcement fibers contained in the first sheet 20s may be arranged regularly at 45° with respect to the axial direction along the central axis A of the rod body 2. The reinforcement fibers contained in the first sheet 20s may be plain-woven. The reinforcement fibers contained in the first sheet 20s may be a non-woven fabric.

The second sheet 30s is, for example, a prepreg sheet made from reinforcement fibers impregnated with a matrix resin. The reinforcement fibers contained in the second sheet 30s are example second reinforcement fibers, and the matrix resin contained in the second sheet 30s is an example second matrix resin.

The reinforcement fibers contained in the second sheet 30s may include, for example, carbon or glass fibers. The matrix resin contained in the second sheet 30s includes, for example, urea resins, melamine resins, phenolic resins, epoxy resins, unsaturated polyester resins, alkyd resins, and urethane resins.

In one embodiment, the matrix resin contained in the second sheet 30s is more wettable with the reinforcement fibers in the first sheet 20s than with the reinforcement fibers in the second sheet 30s. Stated differently, the wettability of the reinforcement fibers contained in the first sheet 20s with the matrix resin contained in the second sheet 30s is higher than the wettability of the reinforcement fibers contained in the second sheet 30s with the matrix resin contained in the second sheet 30s. When the matrix resin contained in the second sheet 30s is an epoxy resin, the reinforcement fibers contained in the first sheet 20s are one or more types of organic fibers selected from the group consisting of polyolefin, polyamide, polyacrylonitrile, and polyester, and the reinforcement fibers contained in the second sheet 30s are carbon or glass fibers. In this way, higher wettability can be achieved between the organic fibers contained in the first sheet 20s and the epoxy resin than between the carbon or glass fibers contained in the second sheet 30s and the epoxy resin.

In an embodiment of the present invention, the matrix resin contained in the first sheet 20s may have a higher curing temperature than the matrix resin contained in the second sheet 30s. For example, when an epoxy resin that cures at 80° C. is used as the matrix resin contained in the second sheet 30s, an epoxy resin that cures at 120° C. may be used as the matrix resin in the first sheet 20s. The second sheet 30s may have a thickness of, for example, 20 μm to 300 μm. The second sheet 30s may be a commercially available sheet that can be used suitably.

The resin content of the matrix resin in the second sheet 30s is, for example, 20 wt % to 50 wt %, or 30 mass % to 40 mass %, relative to 100 wt % of the total mass of the reinforcement fibers and matrix resin in the second sheet 30s.

The reinforcement fibers contained in the second sheet 30s may be arranged regularly at an angle with respect to the axial direction along the central axis A of the rod body 2. For example, the reinforcement fibers contained in the second sheet 30s may be arranged regularly at 45° with respect to the axial direction along the central axis A of the rod body 2. The reinforcement fibers contained in the second sheet 30s may be plain-woven. The reinforcement fibers contained in the second sheet 30s may be a non-woven fabric.

The matrix resin contained in the first or second sheet 20s or 30s is a composition principally made of a thermosetting resin. This resin composition may contain a known additive. When the resin composition contains a thermosetting resin and an additive, the proportion of the mass of the thermosetting resin relative to 100% of the entire mass of the resin composition is, for example, 50% b or more, 60% or more, 70% or more, 80% or more, or 90% or more.

As shown in FIG. 11, to mount the fishing line guide 10B on the rod 5, the foot 10a of the fishing line guide 10B is placed on the outer peripheral surface of the intermediate rod 5. Subsequently, one of the ends of the first sheet 20s is placed on the outer peripheral surface of the intermediate rod 5 so that the first sheet 20s is wound in a predetermined number of plies so as to surround the outer peripheral surface of the intermediate rod 5. In one embodiment, the winding of the first sheet 20s starts at the position 90°+θ1a anti-clockwise from the center portion 11g and ends at the position 90°+θ1b away clockwise from the center portion 11g, as shown in FIG. 12. These winding start and end positions are varied as appropriate. Thus, the foot 10a is covered by the first sheet 20s along with the rod 5. Once the first sheet 20s is wound around the intermediate rod 5, a void space corresponding to the gap G1 is created on the left side of the foot 10a, and a void space corresponding to the gap G2 is created on the right side of the foot 10a.

Next, the second sheet 30s is wound externally on the first sheet 20S, which has been wound on the rod 5, so that a winding is obtained. The second sheet 30s is wound around the rod 5 in a predetermined number of plies so as to cover the first sheet 20s. As shown in FIG. 12, the winding of the second sheet 30s starts at the position 90°+θ1a anti-clockwise from the center portion 11g and ends at the position 90°+θ1b away clockwise from the center portion 11g.

The numbers of windings of the first and second sheets 20s and 30s are not limited to those expressly mentioned herein. The first sheet 20s and the second sheet 30s may be wound in any number of plies. For example, the first sheet 20s and the second sheet 30s may be each wound in two or more plies.

Next, the winding, where the first sheet 20s and the second sheet 30s are wound around the rod 5, is heated. As a result, the matrix resin contained in the first sheet 20s becomes flowable and then cures, so that the first fiber-reinforced resin layer 120 is formed, and the matrix resin contained in the second sheet 30s becomes flowable and then cures, so that the second fiber-reinforced resin layer 130 is formed. These first and second fiber-reinforced resin layers 120 and 130 fix the fishing line guide 10B to the rod 5.

After heated for a predetermined period of time, the winding is taken out of the heating furnace and cooled at a room temperature for a predetermined period of time. After the winding is cooled enough, a coating layer may be formed so as to cover the second fiber-reinforced resin layer 130 formed on the winding for the purposes of improving weather resistance or decorativeness.

The above step of heating the winding may be carried out with a known heating furnace. For example, the winding may be placed for a predetermined period of time in a heating furnace maintained at a predetermined temperature, so that the winding is heated enough to cure the matrix resins contained in the first and second sheets 20s and 30s. The temperature of the heating furnace is, for example, 70 to 170° C., 80 to 160° C., 85 to 150° C., or 90 to 120° C., but the heating may be performed at a temperature other than these ranges in accordance with the curing temperatures of the matrix resins. The duration of the heating of the winding in the heating furnace is, for example, 5 minutes to 3 hours, 15 minutes to 2.5 hours, or 30 minutes to 2 hours, but the winding may be heated for a different duration than these ranges. During the heating of the winding, a securing tape may be wound around the winding so as to prevent movement of the first and second sheets 20s and 30s wound around the intermediate rod 5.

When the curing temperature of the matrix resin contained in the first sheet 30s is lower than that of the matrix resin contained in the second sheet 30s, the matrix resin of the first sheet 20s on the inner side is cured first, and then the matrix resin of the second sheet 30s on the outer side having the higher curing temperature is cured.

While the above winding is heated, the matrix resin contained in the first sheet 20s becomes flowable and flows into the gaps G1 and G2. As a result, the gaps G1 and G2 are at least partially filled with a resin 21, which flows therein from the first sheet 20s. The resin 21 filling the gaps G1 and G2 allows the fishing line guide 10B to be more rigidly fixed onto the intermediate rod 5.

As a result of the matrix resin flowing from the first sheet 20s into the gaps G1 and G2, partial regions of the first sheet 20s (specifically, the regions facing the gaps G1 and G2 in the circumferential direction around the central axis A) experience a reduction or depletion of the matrix resin. Since the second sheet 30s is provided on the outer side of the first sheet 20s, the matrix resin in the second sheet 30s flows into the regions of the first sheet 20s where the matrix resin is lost. In one embodiment described above, the wettability of the reinforcement fibers contained in the first sheet 20s with the matrix resin contained in the second sheet 30s is higher than the wettability of the reinforcement fibers contained in the second sheet 30s with the matrix resin contained in the second sheet 30s. Accordingly, the matrix resin in the second sheet 30s is likely to wet and spread along the reinforcement fibers in the first sheet 20s. For this reason, if the first sheet 20s has a region short of the matrix resin, the matrix resin in the second sheet 30s, which has become more flowable due to the heating, is likely to flow into the first sheet 20s, rather than flowing outside the second sheet 30s. As a result, although void spaces may be crated in the first sheet 20s by the matrix resin flowing into the gaps G1 and G2, they are at least partially filled with the matrix resin flowing therein from the second sheet 30s. In this way, the matrix resin in the second sheet 30s can be prevented from flowing out to the regions in front of and behind the foot 10a of the fishing line guide 10B during the heating, and pin holes and voids can be reduced that may contribute to degradation in appearance quality.

If the curing temperature of the matrix resin contained in the first sheet 20s is higher than that of the second sheet 30s, the matrix resin of the first sheet 20s has not yet become flowable when the matrix resin of the second sheet 30s melts and becomes flowable. Therefore, the matrix resin contained in the second sheet 30s progressively cures without flowing into the gaps G1 and G2. After this, the matrix resin contained in the first sheet 20s having the higher curing temperature melts and the melted resin flows into the gaps G1 and G2. As described above, if the curing temperature of the matrix resin contained in the first sheet 20s is higher than that of the matrix resin contained in the second sheet 30s, the matrix resin of the first sheet 20s having the higher curing temperature has not yet become flowable when the matrix resin of the second sheet 30s has become flowable. In this way, the matrix resin of the second sheet 30s is unlikely to flow into the void spaces in the first sheet 20s, which can reduce degradation of appearance quality.

According to one embodiment, the first fiber-reinforced resin layer 120 has a thickness equal to two layers of the first sheet 20s in the regions facing the gaps G1 and G2 in the circumferential direction, as shown in FIG. 12. Similarly, the second fiber-reinforced resin layer 130 has a thickness equal to two layers of the second sheet 30s in the regions facing the gaps G1 and G2 in the circumferential direction. This can further reduce pin holes or voids, which may be created by the matrix resin flowing into the gaps G1 and G2 from the first sheet 20s.

Figure 13:
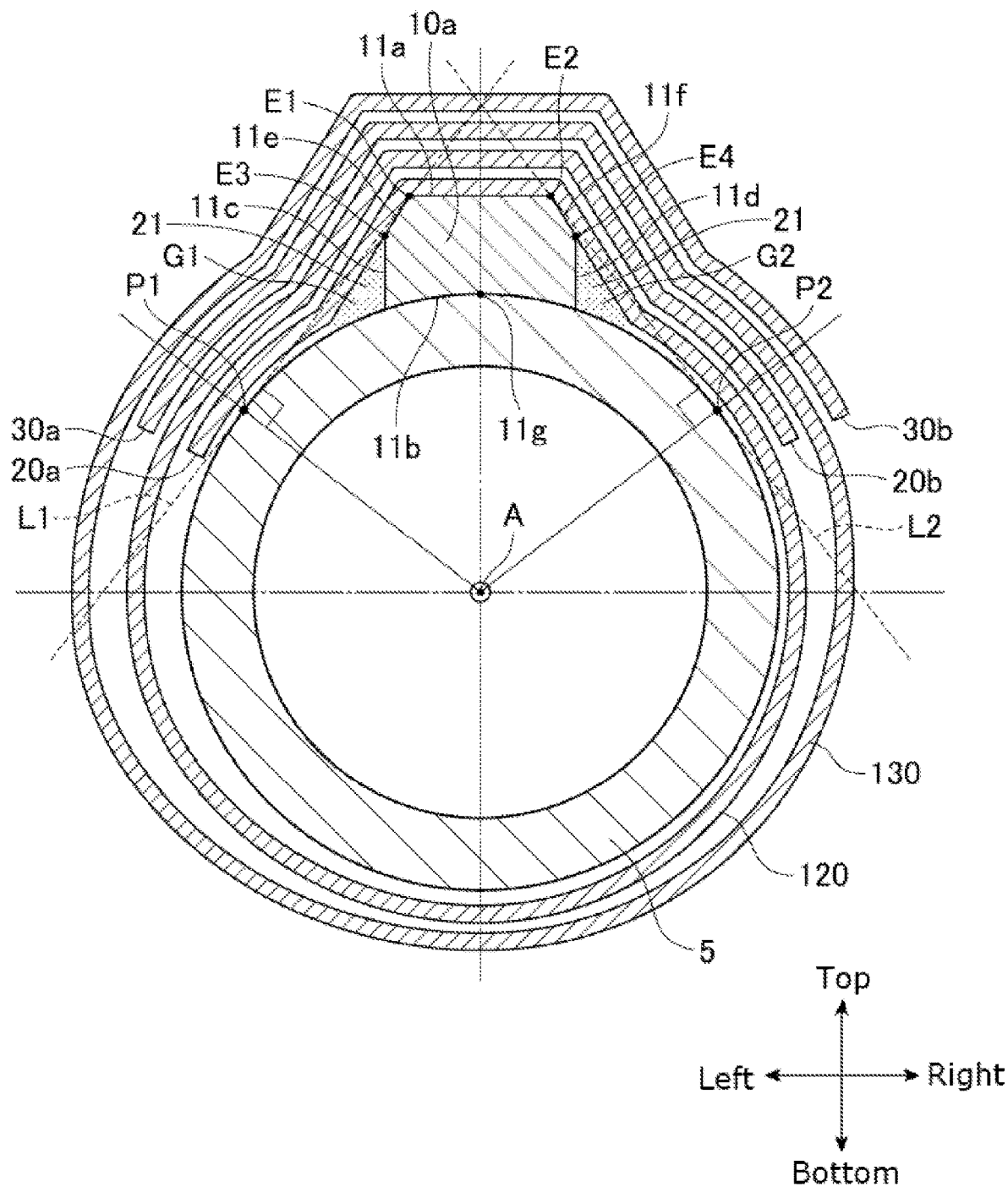
FIG. 13 is a sectional view illustrating a region near a fishing line guide of a fishing rod according to a modification example of the second embodiment.

Next, with reference to FIG. 13, a description is given of a fishing rod according to a modification example of the second embodiment of the present invention. The embodiment shown in FIG. 13 is different from the embodiment shown in FIG. 12 in that the respective ends of the first and second fiber-reinforced resin layers 120 and 130 are differently positioned.

In the embodiment shown in FIG. 13, the first fiber-reinforced resin layer 120 is provided such that its one end 20a is, in the circumferential direction around the central axis A, on the other side of the foot 10a with respect to a point of tangency P1 between the outer peripheral surface of the intermediate rod 5 and a tangent line L1 drawn from the left edge E1 of the top surface 11a toward the outer peripheral surface of the intermediate rod 5. In the illustrated embodiment, the end 20a of the first fiber-reinforced resin layer 120 is rotated approximately 5° anti-clockwise in the circumferential direction around the central axis A from the point of tangency P1. The first fiber-reinforced resin layer 120 is provided such that its one end 20a is rotated anti-clockwise from the point of tangency P1 in the circumferential direction around the central axis A (as long as positioned less than 180° anti-clockwise from the center portion 11g of the fishing line guide 10B).

In one embodiment, the first fiber-reinforced resin layer 120 is provided such that its other end 20b is, in the circumferential direction around the central axis A, on the other side of the foot 10a with respect to a point of tangency P2 between the outer peripheral surface of the intermediate rod 5 and a tangent line L2 drawn from the right edge E2 of the top surface 11a toward the outer peripheral surface of the intermediate rod 5. In the illustrated embodiment, the other end 20b of the first fiber-reinforced resin layer 120 is rotated approximately 5° clockwise in the circumferential direction around the central axis A from the point of tangency P2. The first fiber-reinforced resin layer 120 is provided such that its other end 20b is rotated clockwise from the point of tangency P2 in the circumferential direction around the central axis A (as long as positioned less than 180° clockwise from the center portion 11g of the fishing line guide 10B).

In the illustrated embodiment, the second fiber-reinforced resin layer 130 is provided such that its one end 30a and other end 30b are similarly positioned as the end 20a and other end 20b of the first fiber-reinforced resin layer 120, in the circumferential direction around the central axis A. The end 30a of the second fiber-reinforced resin layer 130 may be at the same or different position as/from the end 20a of the first fiber-reinforced resin layer 120 in the circumferential direction. The other end 30b of the second fiber-reinforced resin layer 130 may be at the same or different position as/from the other end 20b of the first fiber-reinforced resin layer 120 in the circumferential direction. In one embodiment, the second fiber-reinforced resin layer 130 is provided such that its one end 30a is rotated anti-clockwise from the point of tangency P1 in the circumferential direction around the central axis A (as long as positioned less than 180° anti-clockwise from the center portion 11g of the fishing line guide 10B). In one embodiment, the second fiber-reinforced resin layer 130 is provided such that its other end 30b is rotated clockwise from the point of tangency P2 in the circumferential direction around the central axis A (as long as positioned less than 180° clockwise from the center portion 11g of the fishing line guide 10B).

In the above-described embodiment, L1 may denote a tangent line drawn from the top edge E3 of the side surface 11c of the foot 10a toward the outer peripheral surface of the intermediate rod 5. Likewise, L2 may denote a tangent line drawn from the top edge E4 of the side surface 11d of the foot 10a toward the outer peripheral surface of the intermediate rod 5.

According to the embodiment shown in FIG. 13, the adhesive force between the outer peripheral surface of the intermediate rod 5 and a portion of the first fiber-reinforced resin layer 120 near the one end 20a (the portion in the region rotated anti-clockwise from the point of tangency P1 in the circumferential direction) and a portion near the other end 20b (the portion in the region rotated clockwise from the point of tangency P2 in the circumferential direction) can prevent the left and right edges of the bottom surface 11b of the foot 10a from moving away upward.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

In addition to the fishing line guides 10, the reel seat 9 can also be mounted on the associated rod in the same manner as described for the fishing line guides 10B. For example, the reel seat 9 can be mounted on the butt rod 3 via the first and second fiber-reinforced resin layers 120 and 130.

Third Embodiment

Next, a third embodiment of the present invention will be described. The third embodiment of the present invention is made in light of the following technical context and problems.

There have been known fishing rods having fittings such as line guides and a reel seat mounted on a rod body. The fittings are conventionally mounted on the rod body with a thread or a resin sheet.

Fishing rods having fittings mounted on the rod body with a thread are disclosed in, e.g., Japanese Patent Application Publication No. 2008-263841 (Patent Literature 4) and Japanese Patent Application Publication No. 2004-194563 (Patent Literature 5).

Conventional fishing rods having fittings mounted on the rod body with a thread encounter the following problem. If the fishing line or reel applies a force on the fittings, the thread may easily become loose.

Fishing rods having fittings mounted on a rod body with a resin sheet are disclosed in, e.g., the Japanese Utility Model Application Publication No. Hei 2-26474 (Patent Literature 1), International Publication No. WO2018/042856 (Patent Literature 2) and International Publication No. WO2018/061345 (Patent Literature 3). The resin sheet disclosed in these patent literatures is a prepreg sheet obtained by impregnating reinforcement fibers with a matrix resin containing a thermosetting resin. To mount the fittings, the prepreg sheet is wrapped around the rod body and mounting parts of the fittings and the matrix resin of the prepreg sheet wrapped around the rod body is cured. In this way, the fittings can be fixed onto the rod body. As noted, the fittings can be mounted on the rod body via the mounting parts using a fiber-reinforced resin layer, which is made by curing the prepreg sheet.

When a fishing rod is used, the rod body may be greatly bended or twisted. Therefore, it is desired to rigidly fix the fittings onto the rod body using a fiber-reinforced resin layer in order to prevent the fittings from being detached from the rod body.

One of the objects of the third embodiment of the present invention is to provide a fishing rod having fittings more rigidly fixed onto a rod body. Other objects of the present invention will be apparent with reference to the entire description in this specification.

A fishing rod according to one embodiment includes a rod body extending along a central axis, a fitting having a mounting part, where the fitting being mounted on the rod body such that the mounting part is in contact with an outer peripheral surface of the rod body, a first fiber-reinforced resin layer surrounding the rod body so as to cover the mounting part, and a second fiber-reinforced resin layer provided on an outer side of the first fiber-reinforced resin layer. The first fiber-reinforced resin layer is made from a first prepreg sheet made of first reinforcement fibers impregnated with a first matrix resin, and the second fiber-reinforced resin layer is made from a second prepreg sheet made of second reinforcement fibers impregnated with a second matrix resin. In this embodiment, a content of the first matrix resin in the first prepreg sheet is higher than a content of the second matrix resin in the second prepreg sheet.

In the fishing rod according to one embodiment, the mounting part has a bottom surface in contact with the outer peripheral surface of the rod body, and a void space between the bottom surface of the mounting part and the outer peripheral surface of the rod body is filled with the first matrix resin flowing therein from the first prepreg sheet.

In the fishing rod according to one embodiment, the mounting part has a top surface opposing the bottom surface, and the top surface has a depression formed therein depressed toward the central axis of the rod body, and the depression is filled with the first matrix resin flowing therein from the first prepreg sheet.

In the fishing rod according to one embodiment, the mounting part has a first side surface connecting the bottom surface and the top surface and a second side surface opposing the first side surface and connecting the bottom surface and the top surface, and a first void space partly bounded by the first side surface and a second void space partly bounded by the second side surface are filled with the first matrix resin flowing therein from the first prepreg sheet.

In the fishing rod according to one embodiment, a resin content of the first matrix resin in the first prepreg sheet is from 40 wt % to 85 wt %.

In the fishing rod according to one embodiment, the first reinforcement fibers are organic fibers. In the fishing rod according to one embodiment, the first reinforcement fibers are one selected from the group consisting of polyester fibers, aramid fibers, and aromatic polyamide fibers.

In the fishing rod according to one embodiment, the second reinforcement fibers are carbon or glass fibers.

In the fishing rod according to one embodiment, one of ends of the first fiber-reinforced resin layer is, in a circumferential direction around the central axis, positioned no less than 90° and less than 180° anti-clockwise from the mounting part.

In the fishing rod according to one embodiment, the other end of the first fiber-reinforced resin layer is, in the circumferential direction, positioned no less than 90° and less than 180° clockwise from the mounting part.

In the fishing rod according to one embodiment, the first fiber-reinforced resin layer is wound in one or more plies around the rod body.

In one embodiment, the fitting is a fishing line guide. In one embodiment, the fitting is a reel seat.

According to the third embodiment of the present invention, a fishing rod having fittings more rigidly fixed onto a rod body can be provided.

The third embodiment of the present invention will be hereinafter described with reference to the accompanying drawings. In the drawings, constituent elements common to different views are denoted by the same reference signs. It should be noted that, for convenience of explanation, the drawings are not necessarily drawn to scale.

Figure 14:
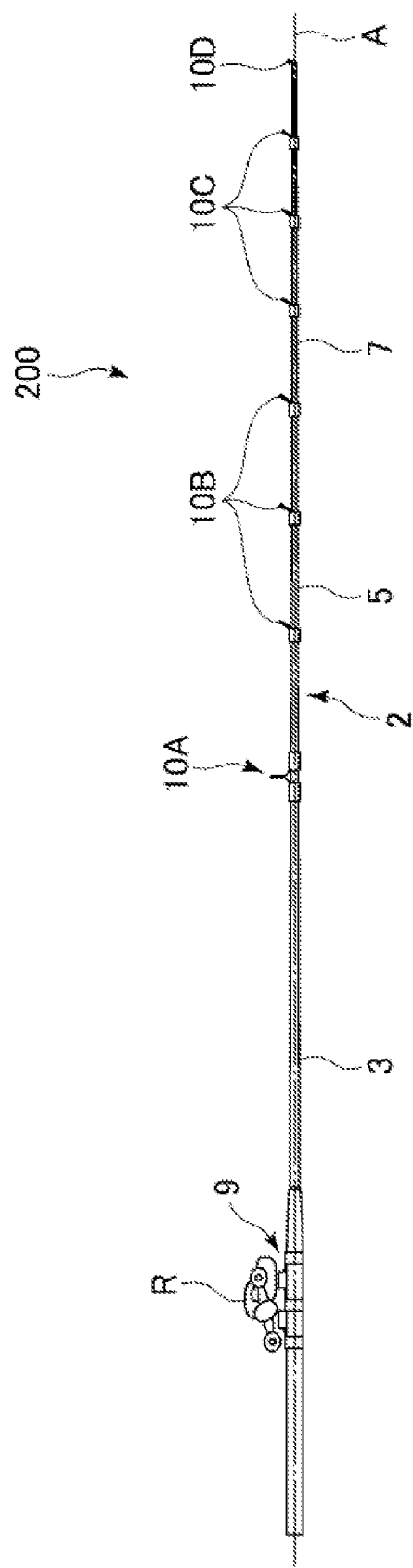
FIG. 14 shows a fishing rod according to a third embodiment of the present invention.

FIG. 14 shows the fishing rod according to the third embodiment of the present invention. As shown, a fishing rod 200 according to the third embodiment of the present invention includes an elongated rod body 2 extending along a central axis, a reel R mounted on the rod body 2 via a reel seat 9, and fishing line guides 10 mounted on the rod body 2. In the embodiment shown, the reel seat 9 and the fishing line guides 10 are fittings mounted on the outer peripheral surface of the rod body.

The rod body 2 is made up of, for example, a butt rod 3, an intermediate rod 5, and a tip rod 7 connected together. For example, these rods are jointed together by ordinary jointing. The butt rod 3, the intermediate rod 5, and the tip rod 7 may also be jointed together by telescopic jointing, inverse ordinary jointing, spigot jointing, or any other known jointing methods. Alternatively, the rod body 2 may be made of a single rod.

The butt rod 3, the intermediate rod 5, and the tip rod 7 are formed of, for example, a tube made of a fiber reinforced resin. The tube made of a fiber reinforced resin can be formed by preparing a fiber reinforced resin prepreg (a prepreg sheet) made of reinforcement fibers impregnated with a matrix resin, winding the prepreg sheet on a core, and heating and curing the prepreg sheet. The reinforcement fibers included in the prepreg sheet may be, for example, carbon fibers, glass fibers, or any other known reinforcement fibers. The matrix resin included in the prepreg sheet may be a thermosetting resin such as epoxy resin. After the prepreg sheet is cured, the core is removed. The outer surface of the tube may be polished as necessary. Each of the rods may be formed solid.

In the embodiment shown, the butt rod 3, the intermediate rod 5, and the tip rod 7 are provided with a plurality of fishing line guides 10 (the fishing line guides 10A to 10D) for guiding a fishing line released from the reel R mounted to the reel seat 9. More specifically, the butt rod 3 is provided with a single fishing line guide 10A, the intermediate rod 5 is provided with three fishing line guides 10B, and the tip rod 7 is provided with three fishing line guides 10C. The top guide 10D is provided at a distal end of the tip rod 7. The rod body 2 may have any number of fishing line guides 10 mounted thereon. In the illustrated example, the rod body 2 has eight fishing line guides including the top guide 10D mounted thereon, but the rod body 2 may have nine or more, or seven or less fishing line guides mounted thereon.

In the embodiment shown, the reel seat 9 is mounted on the outer peripheral surface of the butt rod 3. The reel seat 9 is any reel seat as long as it allows the reel R to be mounted thereto.

Figure 15:
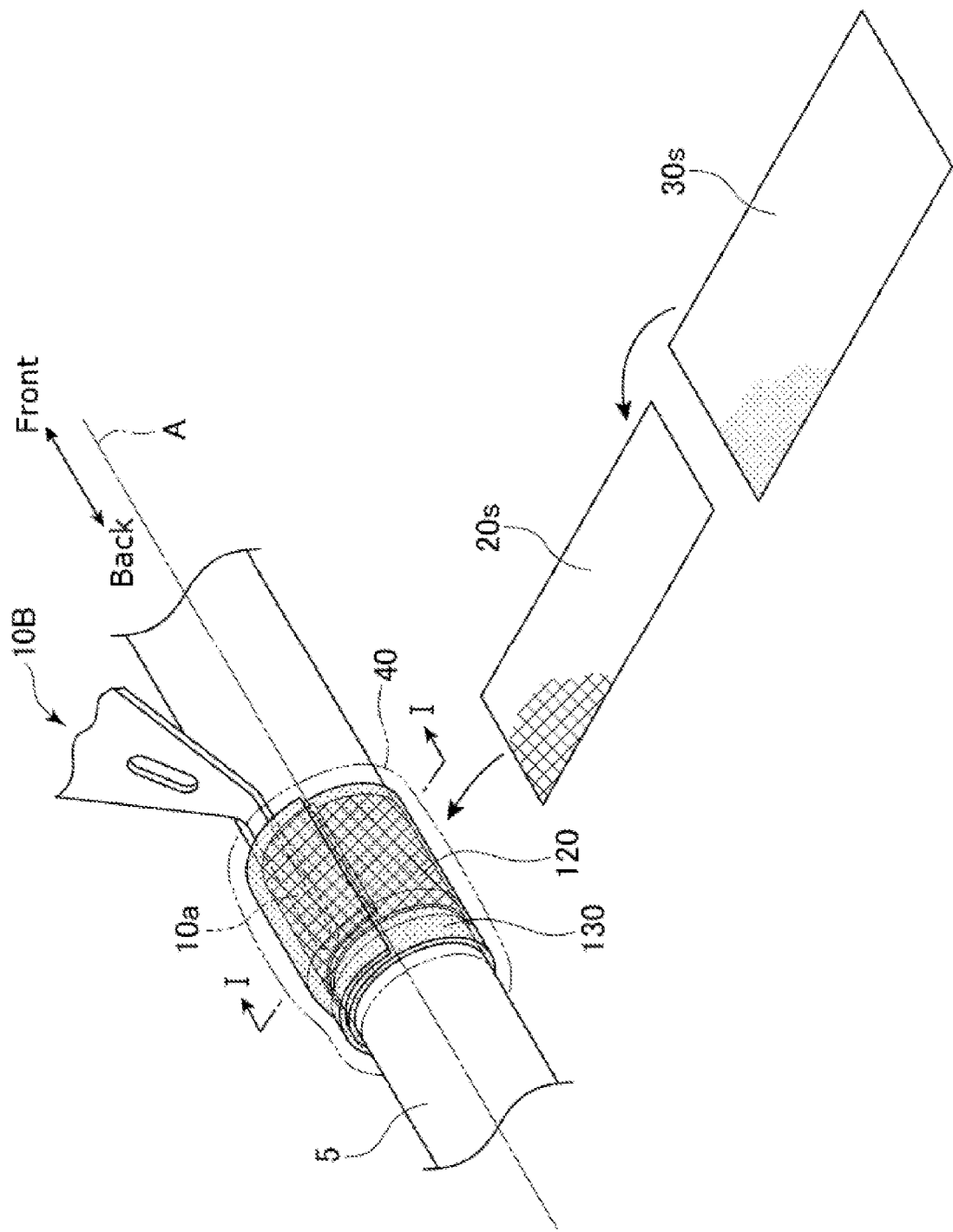
FIG. 15 is an enlarged schematic view illustrating a region near a fishing line guide of the fishing rod shown in FIG. 14.
Figure 16:
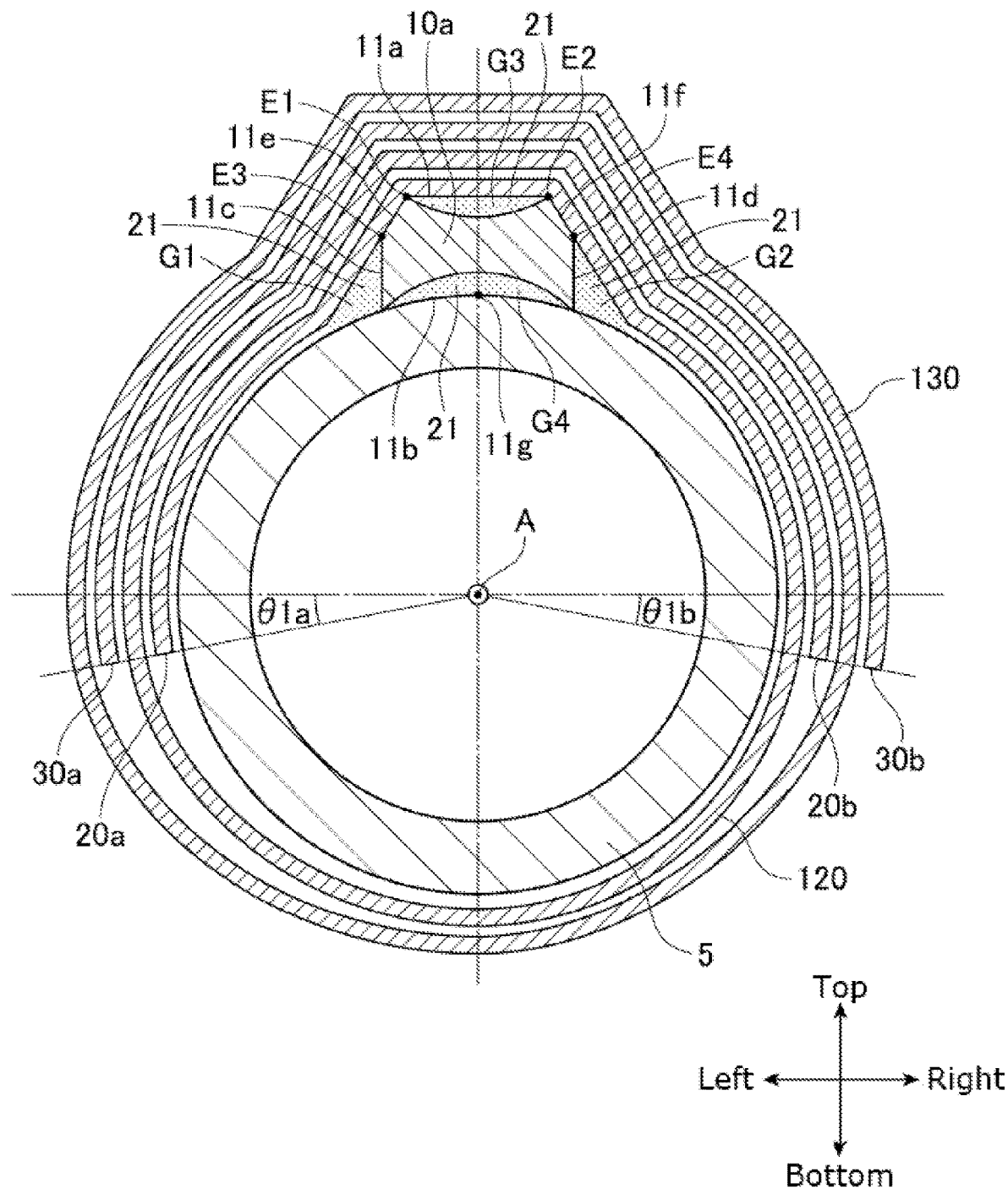
FIG. 16 is a sectional view obtained along a line I-I in FIG. 15.

Next, with further reference to FIGS. 15 and 16, a description is given of the structure and manner of mounting of the fishing line guide 10B onto the intermediate rod 5. FIG. 15 is a perspective view to illustrate the manner of how to mount the fishing line guide 10B onto the intermediate rod 5, and FIG. 16 is a schematic cross-sectional view along the line I-I in FIG. 15. The top-and-bottom and left-and-right directions of the rod 5 and the fishing line guide 10B respectively refer to the top-and-bottom and left-and-right directions in FIG. 16.

As shown in these drawings, the fishing line guide 10B has a foot 10a extending along the axis of the intermediate rod 5 and is mounted on the outer peripheral surface of the intermediate rod 5 via the foot 10a. The foot 10a of the fishing line guide 10B is an example of the mounting part of the fitting. When seen in the cross-section, the foot 10a of the fishing line guide 10B has a top surface 11a, a bottom surface 11b opposing the top surface 11a, and side surfaces 11c and 11d connecting together the top and bottom surfaces 11a and 11b.

As shown, the side surface 11c of the foot 10a, the outer peripheral surface of the intermediate rod 5 and the inner peripheral surface of a first fiber-reinforced resin layer 120, described below, bound a gap G1. Similarly, the side surface 11d of the foot 10a, the outer peripheral surface of the intermediate rod 5 and the inner peripheral surface of the first fiber-reinforced resin layer 120 bound a gap G2.

The top surface 11a of the foot 10a is depressed toward the central axis A. Therefore, the top surface 11a of the foot 10a and the inner peripheral surface of the first fiber-reinforced resin layer 120 bound a gap G3.

As shown, the foot 10a is configured such that its bottom surface 11b has a different curvature from the outer peripheral surface of the intermediate rod 5. Therefore, the bottom surface 11b of the foot 10a and the outer peripheral surface of the intermediate rod 5 bound a gap G4.

When a first sheet 20s, described below, is heated, the matrix resin contained in the first sheet 20s becomes flowable and flows into the gaps G1, G2 G3 and G4. Accordingly, the gaps G1 to G4 are at least partially filled with a reinforcement resin 21, originating from the matrix resin contained in the first sheet 20s. The reinforcement resin 21 is obtained by heating the first sheet 20s to cause the matrix resin contained in the first sheet 20s to become flowable, allowing the flowable resin to flow into the gaps G1 to G4 and then curing the resin in the gaps G1 to G4. The reinforcement resin 21 preferably fills 70% or more of the volume of each of the gaps G1 to G4. The reinforcement resin 21 may contain the components of the matrix resin in the second sheet 30s.

The fishing line guide 10B is mounted on the intermediate rod 5 such that the bottom surface 11b of the foot 10a is in contact with the outer peripheral surface of the intermediate rod 5. The bottom surface 11b of the foot 10a is partially in contact with the outer peripheral surface of the intermediate rod 5.

The foot 10a is beveled at the portion where the top surface 11a is connected to the side surface 11c and at the portion where the top surface 11a is connected to the side surface 11c. In the illustrated embodiment, beveled surfaces 11e and 11f are formed at the left and right edges of the top surface 10a of the foot 10a. The beveled surface 11e is the surface connecting together the top and side surfaces 11a and 11c. The beveled surface 11f is the surface connecting together the top and side surfaces 11a and 11d. The top surface 11a is connected at the left edge E1 thereof to the beveled surface 11e and at the right edge E2 thereof to the beveled surface 11f. As illustrated in FIG. 16, the left edge E1 of the top surface 11a is one of the edges of the top surface 11a opposing each other in the circumferential direction around the central axis A, and the right edge E2 of the top surface 11a is the other of the edges of the top surface 11a opposing each other in the circumferential direction. The left edge E1 of the top surface 11a is an example of a first edge, and the right edge E2 of the top surface 11a is an example of a second edge. The side surface 11c is connected at the top edge E3 thereof to the beveled surface 11e and the side surface 11d is connected at the top edge E4 thereof to the beveled surface 11e.

In one aspect, at least one of the beveled surfaces 11e and 11f may form a part of the top surface 11a. Stated differently, the top surface 11a may refer to the region including the beveled surfaces 11e and 11f. In this case, the top edge E3 of the side surface 11c is treated as the left edge (first edge) of the top surface 11a, and the top edge E4 of the side surface 11d is treated as the right edge (second edge) of the top surface 11a.

On the outer side of the foot 10a of the fishing line guide 10B, there are provided a first fiber-reinforced resin layer 120, a second fiber-reinforced resin layer 130 and a coating layer 40. As used herein, the terms "outer side" and "inner side" refer to "the outer side" and "the inner side" in the radial direction of the intermediate rod 5, respectively, unless otherwise construed from the context.

The first fiber-reinforced resin layer 120 surrounds the intermediate rod 5 such that the first fiber-reinforced resin layer 120 covers the foot 10a. In one embodiment, the number of windings of the first fiber-reinforced resin layer 120 is designed to be one or more plies for reliably fixing the fishing line guide 10B and less than two plies for reducing the weight. On the outer side of the first fiber-reinforced resin layer 120, a second fiber-reinforced resin layer 130 is provided. In one embodiment, the number of windings of the second fiber-reinforced resin layer 130 is designed to be no less than one ply and less than two plies.

In one embodiment, the first fiber-reinforced resin layer 120 is provided such that its one end 20a is positioned no less than 90° and less than 180° anti-clockwise from the fishing line guide 10B (for example, the center portion 11g of the foot 10a of the fishing line guide 10B that is centrally positioned in the circumferential direction) in the circumferential direction around the central axis A, as shown in FIG. 16. In the illustrated embodiment, the end 20a of the first fiber-reinforced resin layer 120 is positioned 90°+θ1a (0≤θ1a<90°) anti-clockwise in the circumferential direction from the center portion 11g.

In one embodiment, the other end 20b of the first fiber-reinforced resin layer 120 is positioned opposite to the end 20a with respect to the center portion 11g of the fishing line guide 10B in the circumferential direction around the central axis A. In one embodiment, the other end 20b of the first fiber-reinforced resin layer 120 is positioned no less than 90° and less than 180° away clockwise from the center portion 11g of the fishing line guide 10B. In the illustrated embodiment, the other end 20b of the first fiber-reinforced resin layer 120 is positioned 90°+θ1b (0≤θ1b<90°) clockwise in the circumferential direction from the center portion 11g. The angle θ1b may be either equal to or different from the angle θ1a. In the illustrated embodiment, the angle θ1a is equal to the angle θ1b. Accordingly, the other end 20b of the first fiber-reinforced resin layer 120 is symmetrically arranged to the end 20a with respect to the center portion 11g of the fishing line guide 10B in the circumferential direction around the central axis A. When the ends 20a and 20b of the first fiber-reinforced resin layer 120 are symmetrically arranged with respect to the center portion 11g of the fishing line guide 10B in the circumferential direction around the central axis A as described above, the center of gravity of the intermediate rod 5 can avoid being shifted to the left or right off the central axis A.

As described above, the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g. With such arrangements, the number of windings of the first fiber-reinforced resin layer 120 can be 1.5 plies or more and less than 2.0 plies.

When the fishing rod 200 is used, the fishing line applies, to the fishing line guide 10B, a force that is directed to swing the fishing line guide 10B around the central axis A of the rod body. This force results in the left and right edges of the bottom surface 11b of the foot 10a moving upward away from the outer peripheral surface of the intermediate rod 5. If the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g, the portions of the first fiber-reinforced resin layer 20 near the ends 20a and 20b function as hooks when the force applied by the fishing line causes the foot 10a to move away upward, so that the left and right edges of the foot 10a can be prevented from moving away upward.

In one embodiment, the second fiber-reinforced resin layer 130 is arranged outside the first fiber-reinforced resin layer 120 such that its one end 30a is positioned 90°+θ1a (0≤θ1a<90°) anti-clockwise in the circumferential direction from the center portion 11g and the other end 30b is positioned 90°+θ1b away clockwise from the center portion 11g. As described above, in the circumferential direction around the central axis A, the end 20a of the first fiber-reinforced resin layer 120 is at the same position as the end 30a of the second fiber-reinforced resin layer 130 in the illustrated embodiment, but the end 20a of the first fiber-reinforced resin layer 120 may be differently positioned from the end 30a of the second fiber-reinforced resin layer 130. Likewise, the other end 20b of the first fiber-reinforced resin layer 120 is at the same position as the other end 30b of the second fiber-reinforced resin layer 130 in the illustrated embodiment, but the other end 20b of the first fiber-reinforced resin layer 120 may be differently positioned in the circumferential direction from the other end 30b of the second fiber-reinforced resin layer 130.

As described above, the fishing line guide 10B is mounted on the outer peripheral surface of the intermediate rod 5 via the foot 10a with the use of the first and second fiber-reinforced resin layers 120 and 130. FIG. 16 arranges the constituent components such that gaps are provided between the outer peripheral surface of the intermediate rod 5 and the first fiber-reinforced resin layer 120 and between the first fiber-reinforced resin layer 120 and the second fiber-reinforced resin layer 130 for the sake of intelligibility. In fact, however, the first fiber-reinforced resin layer 120 is in close contact with the outer peripheral surface of the intermediate rod 5, and the first and second fiber-reinforced resin layers 120 and 130 are also in close contact with each other.

The coating layer 40 is a coating film made of a resin provided on the outer side of the second fiber-reinforced resin layer 130 so as to cover the second fixing layer 30. As shown, the coating layer 40 may be provided to coat the entire second fixing layer 30. In FIG. 16, the coating layer 40 is not shown for convenience of description.

The coating layer 40 may be formed of various resin materials such as epoxy, urethane, acrylic, or UV-curable resins (e.g., urethane acrylate, acrylic resin acrylate, epoxy acrylate). The materials of the coating layer 40 are not limited to those named herein but are various. The coating layer 40 may be either transparent or colored.

The following describes, for example, a method of how to mount the fishing line guide 10B onto the intermediate rod 5. The process of mounting the fishing line guide 10B on the intermediate rod 5 begins with preparing the rod 5, the fishing line guide 10B, the first sheet 20s, and the second sheet 30s.

As described above, the rod 5 is made by heating and curing a prepreg sheet wound on a core.

The fishing line guide 10B may be any fixed guide. The fishing line guide 10B may be either a single-foot guide as shown or a double-foot guide.

The first sheet 20s is a prepreg sheet made from reinforcement fibers impregnated with a matrix resin. The reinforcement fibers contained in the first sheet 20s are example first reinforcement fibers, and the matrix resin contained in the first sheet 20s is an example first matrix resin.

The reinforcement fibers contained in the first sheet 20s are organic fibers. The organic fibers are, for example, fibers of one or more types selected from the group consisting of polyolefin, polyamide, polyacrylonitrile, and polyester. The matrix resin is, for example, a thermosetting resin. A thermosetting resin cures irreversibly by chemical reaction upon heating. Thermosetting resins that can be used as the matrix resin making the first sheet 20s include, for example, urea resins, melamine resins, phenolic resins, epoxy resins, unsaturated polyester resins, alkyd resins, and urethane resins. The first sheet 20s has a thickness of, for example, 20 μm to 300 μm. The first sheet 20s may be a commercially available sheet that can be used suitably.

The resin content of the matrix resin in the first sheet 20s is, for example, 40 wt % to 85 wt %, relative to 100 wt % of the total mass of the reinforcement fibers and matrix resin in the first sheet 20s.

The reinforcement fibers contained in the first sheet 20s may be arranged regularly at an angle with respect to the axial direction along the central axis A of the rod body 2. For example, the reinforcement fibers contained in the first sheet 20s may be arranged regularly at 45° with respect to the axial direction along the central axis A of the rod body 2. The reinforcement fibers contained in the first sheet 20s may be plain-woven. The reinforcement fibers contained in the first sheet 20s may be a non-woven fabric.

The second sheet 30s is, for example, a prepreg sheet made from reinforcement fibers impregnated with a matrix resin. The reinforcement fibers contained in the second sheet 30s are example second reinforcement fibers, and the matrix resin contained in the second sheet 30s is an example second matrix resin.

The reinforcement fibers contained in the second sheet 30s may include, for example, carbon or glass fibers. The matrix resin contained in the second sheet 30s includes, for example, urea resins, melamine resins, phenolic resins, epoxy resins, unsaturated polyester resins, alkyd resins, and urethane resins.

In one embodiment, the matrix resin contained in the second sheet 30s is more wettable with the reinforcement fibers in the first sheet 20s than with the reinforcement fibers in the second sheet 30s. Stated differently, the wettability of the reinforcement fibers contained in the first sheet 20s with the matrix resin contained in the second sheet 30s is higher than the wettability of the reinforcement fibers contained in the second sheet 30s with the matrix resin contained in the second sheet 30s. When the matrix resin contained in the second sheet 30s is an epoxy resin, the reinforcement fibers contained in the first sheet 20s are one or more types of organic fibers selected from the group consisting of polyolefin, polyamide, polyacrylonitrile, and polyester, and the reinforcement fibers contained in the second sheet 30s are carbon or glass fibers. In this way, higher wettability can be achieved between the organic fibers contained in the first sheet 20s and the epoxy resin than between the carbon or glass fibers contained in the second sheet 30s and the epoxy resin.

In an embodiment of the present invention, the matrix resin contained in the first sheet 20s may have a higher curing temperature than the matrix resin contained in the second sheet 30s. For example, when an epoxy resin that cures at 80° C. is used as the matrix resin contained in the second sheet 30s, an epoxy resin that cures at 120° C. may be used as the matrix resin in the first sheet 20s. The second sheet 30s may have a thickness of, for example, 20 μm to 300 μm. The second sheet 30s may be a commercially available sheet that can be used suitably.

The resin content of the matrix resin in the second sheet 30s is, for example, 20 wt % to 50 wt %, or 30 mass % to 40 mass %, relative to 100 wt % of the total mass of the reinforcement fibers and matrix resin in the second sheet 30s.

As described above, the resin content of the matrix resin in the first sheet 20s is higher than the resin content of the matrix resin in the second sheet 30s.

The reinforcement fibers contained in the second sheet 30s may be arranged regularly at an angle with respect to the axial direction along the central axis A of the rod body 2. For example, the reinforcement fibers contained in the second sheet 30s may be arranged regularly at 45° with respect to the axial direction along the central axis A of the rod body 2. The reinforcement fibers contained in the second sheet 30s may be plain-woven. The reinforcement fibers contained in the second sheet 30s may be a non-woven fabric.

The matrix resin contained in the first or second sheet 20s or 30s is a composition principally made of a thermosetting resin. This resin composition may contain a known additive. When the resin composition contains a thermosetting resin and an additive, the proportion of the mass of the thermosetting resin relative to 100% of the entire mass of the resin composition is, for example, 50% b or more, 60% or more, 70% or more, 80% or more, or 90% or more.

Next, a description is given of how the fishing line guide 10B is mounted on the rod 5. As shown in FIG. 15, the first step to mount the fishing line guide 10B on the rod 5 is to place the foot 10a of the fishing line guide 10B on the outer peripheral surface of the intermediate rod 5. Subsequently, one end of the first sheet 20s is placed on the outer peripheral surface of the intermediate rod 5 so that the first sheet 20s is wound in a predetermined number of plies so as to surround the outer peripheral surface of the intermediate rod 5. In one embodiment, the winding of the first sheet 20s starts at the position 90°+θ1a anti-clockwise from the center portion 11g and ends at the position 90°+θ1b away clockwise from the center portion 11g, as shown in FIG. 16. These winding start and end positions are varied as appropriate. Thus, the foot 10a is covered by the first sheet 20s along with the rod 5. Once the first sheet 20s is wound around the intermediate rod 5, a void space corresponding to the gap G1 is created on the left side of the foot 10a, and a void space corresponding to the gap G2 is created on the right side of the foot 10a.

Next, the second sheet 30s is wound externally on the first sheet 20S, which has been wound on the rod 5, so that a winding is obtained. The second sheet 30s is wound around the rod 5 in a predetermined number of plies so as to cover the first sheet 20s. As shown in FIG. 16, the winding of the second sheet 30s starts at the position 90°+θ1a anti-clockwise from the center portion 11g and ends at the position 90°+θ1b away clockwise from the center portion 11g.

The numbers of windings of the first and second sheets 20s and 30s are not limited to those expressly mentioned herein. The first sheet 20s and the second sheet 30s may be wound in any number of plies. For example, the first sheet 20s and the second sheet 30s may be each wound in two or more plies.

Next, the winding, where the first sheet 20s and the second sheet 30s are wound around the rod 5, is heated. As a result, the matrix resin contained in the first sheet 20s becomes flowable and then cures, so that the first fiber-reinforced resin layer 120 is formed, and the matrix resin contained in the second sheet 30s becomes flowable and then cures, so that the second fiber-reinforced resin layer 130 is formed. These first and second fiber-reinforced resin layers 120 and 130 fix the fishing line guide 10B to the rod 5.

After heated for a predetermined period of time, the winding is taken out of the heating furnace and cooled at a room temperature for a predetermined period of time. After the winding is cooled enough, a coating layer may be formed so as to cover the second fiber-reinforced resin layer 130 formed on the winding for the purposes of improving weather resistance or decorativeness.

The above step of heating the winding may be carried out with a known heating furnace. For example, the winding may be placed for a predetermined period of time in a heating furnace maintained at a predetermined temperature, so that the winding is heated enough to cure the matrix resins contained in the first and second sheets 20s and 30s. The temperature of the heating furnace is, for example, 70 to 170° C., 80 to 160° C., 85 to 150° C., or 90 to 120° C., but the heating can be carried out at a temperature other than these ranges in accordance with the curing temperatures of the matrix resins. The duration of the heating of the winding in the heating furnace is, for example, 5 minutes to 3 hours, 15 minutes to 2.5 hours, or 30 minutes to 2 hours, but the winding may be heated for a duration other than these ranges. During the heating of the winding, a securing tape may be wound around the winding so as to prevent movement of the first and second sheets 20s and 30s wound around the intermediate rod 5.

While the above winding is heated, the matrix resin contained in the first sheet 20s becomes flowable and flows into the gaps G1 to G4. As a result, the gaps G1 to G4 are at least partially filled with a reinforcement resin 21, which flows into the gaps G1 to G4 from the first sheet 20s. The reinforcement resin 21 filling the gaps G1 to G4 allows the fishing line guide 10B to be more rigidly fixed onto the intermediate rod 5 without the use of other members than the first and second fiber-reinforced resin layers 120 and 130. This means that the fishing line guide 10B can be fixed with an increased force without the need of increasing the weight.

As a result of the matrix resin flowing from the first sheet 20s into the gaps G1 to G4, partial regions of the first sheet 20s (specifically, the regions facing the gaps G1 to G4 in the circumferential direction around the central axis A) experience a reduction or depletion of the matrix resin. Since the second sheet 30s is provided on the outer side of the first sheet 20s, the matrix resin in the second sheet 30s flows into the regions of the first sheet 20s where the matrix resin is lost. In one embodiment described above, the wettability of the reinforcement fibers contained in the first sheet 20s with the matrix resin contained in the second sheet 30s is higher than the wettability of the reinforcement fibers contained in the second sheet 30s with the matrix resin contained in the second sheet 30s. Accordingly, the matrix resin in the second sheet 30s is likely to wet and spread along the reinforcement fibers in the first sheet 20s. For this reason, if the first sheet 20s has a region short of the matrix resin, the matrix resin in the second sheet 30s, which has become more flowable due to the heating, is likely to flow into the first sheet 20s, rather than flowing outside the second sheet 30s. As a result, although void spaces may be created in the first sheet 20s by the matrix resin flowing into the gaps G1 to G4, they are at least partially filled with the matrix resin flowing therein from the second sheet 30s. In this way, the matrix resin in the second sheet 30s can be prevented from flowing out to the regions in front of and behind the foot 10a of the fishing line guide 10B during the heating and, at the same time, pin holes and voids can be reduced that may contribute to degradation in appearance quality.

According to one embodiment, the first fiber-reinforced resin layer 120 has a thickness equal to two layers of the first sheet 20s in the regions facing the gaps G1 to G4 in the circumferential direction, as shown in FIG. 16. Similarly, the second fiber-reinforced resin layer 130 has a thickness equal to two layers of the second sheet 30s in the region facing the gaps G1 to G4 in the circumferential direction. This can reduce pin holes or voids, which may be created by the matrix resin flowing into the gaps G1 to G4 from the first sheet 20s.

Figure 17:
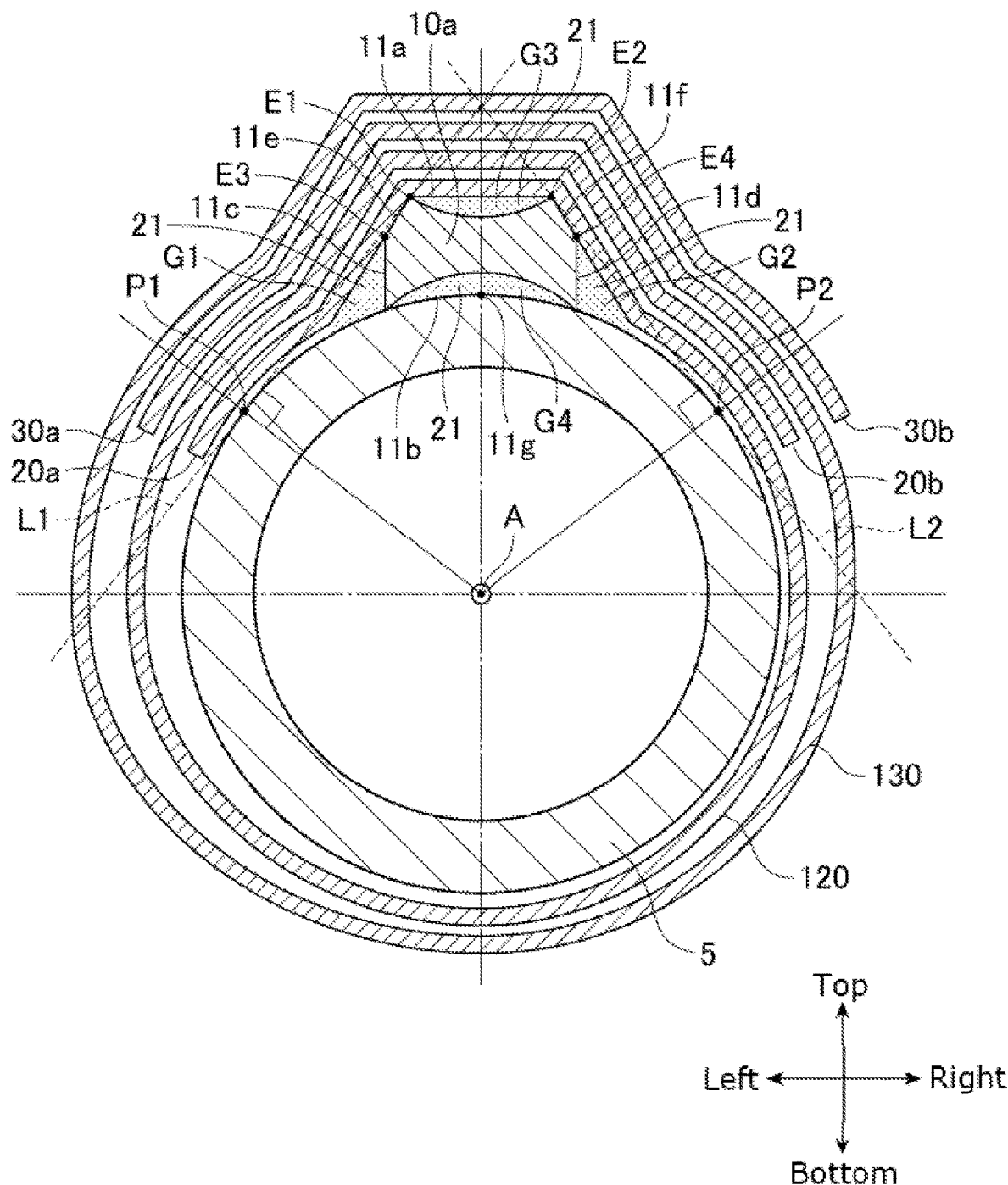
FIG. 17 is a sectional view illustrating a region near a line guide of a fishing rod according to a modification example of the third embodiment.

Next, with reference to FIG. 17, a description is given of a fishing rod according to a modification example of the third embodiment of the present invention. The embodiment shown in FIG. 17 is different from the embodiment shown in FIG. 16 in that the respective ends of the first and second fiber-reinforced resin layers 120 and 130 are differently positioned.

In the embodiment shown in FIG. 17, the first fiber-reinforced resin layer 120 is provided such that its one end 20a is, in the circumferential direction around the central axis A, on the other side of the foot 10a with respect to a point of tangency P1 between the outer peripheral surface of the intermediate rod 5 and a tangent line L1 drawn from the left edge E1 of the top surface 11a toward the outer peripheral surface of the intermediate rod 5. In the illustrated embodiment, the end 20a of the first fiber-reinforced resin layer 120 is rotated approximately 5° anti-clockwise in the circumferential direction around the central axis A from the point of tangency P1. The first fiber-reinforced resin layer 120 is provided such that its one end 20a is rotated anti-clockwise from the point of tangency P1 in the circumferential direction around the central axis A (as long as positioned less than 180° anti-clockwise from the center portion 11g of the fishing line guide 10B).

In one embodiment, the first fiber-reinforced resin layer 120 is provided such that its other end 20b is, in the circumferential direction around the central axis A, on the other side of the foot 10a with respect to a point of tangency P2 between the outer peripheral surface of the intermediate rod 5 and a tangent line L2 drawn from the right edge E2 of the top surface 11a toward the outer peripheral surface of the intermediate rod 5. In the illustrated embodiment, the other end 20b of the first fiber-reinforced resin layer 120 is rotated approximately 5° clockwise in the circumferential direction around the central axis A from the point of tangency P2. The first fiber-reinforced resin layer 120 is provided such that its other end 20b is rotated clockwise from the point of tangency P2 in the circumferential direction around the central axis A (as long as positioned less than 180° away clockwise from the center portion 11g of the fishing line guide 10B).

In the illustrated embodiment, the second fiber-reinforced resin layer 130 is provided such that its one end 30a and other end 30b are similarly positioned as the end 20a and other end 20b of the first fiber-reinforced resin layer 120, in the circumferential direction around the central axis A. The end 30a of the second fiber-reinforced resin layer 130 may be at the same or different position as/from the end 20a of the first fiber-reinforced resin layer 120 in the circumferential direction. The other end 30b of the second fiber-reinforced resin layer 130 may be at the same or different position as/from the other end 20b of the first fiber-reinforced resin layer 120 in the circumferential direction. In one embodiment, the second fiber-reinforced resin layer 130 is provided such that its one end 30a is rotated anti-clockwise from the point of tangency P1 in the circumferential direction around the central axis A (as long as positioned less than 180° anti-clockwise from the center portion 11g of the fishing line guide 10B). In one embodiment, the second fiber-reinforced resin layer 130 is provided such that its other end 30b is rotated clockwise from the point of tangency P2 in the circumferential direction around the central axis A (as long as positioned less than 180° clockwise from the center portion 11g of the fishing line guide 10B).

In the above-described embodiment, L1 may denote a tangent line drawn from the top edge E3 of the side surface 11c of the foot 10a toward the outer peripheral surface of the intermediate rod 5. Likewise, L2 may denote a tangent line drawn from the top edge E4 of the side surface 11d of the foot 10a toward the outer peripheral surface of the intermediate rod 5.

According to the embodiment shown in FIG. 17, the adhesive force between the outer peripheral surface of the intermediate rod 5 and a portion of the first fiber-reinforced resin layer 120 near the one end 20a (the portion in the region rotated anti-clockwise from the point of tangency P1 in the circumferential direction) and a portion near the other end 20b (the portion in the region rotated clockwise from the point of tangency P2 in the circumferential direction) can prevent the left and right edges of the bottom surface 11b of the foot 10a from moving away upward.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

In addition to the fishing line guides 10, the reel seat 9 can also be mounted on the associated rod in the same manner as described for the fishing line guides 10B. For example, the reel seat 9 can be mounted on the butt rod 3 via the first and second fiber-reinforced resin layers 120 and 130.

Fourth Embodiment

Next, a fourth embodiment of the present invention will be described. The fourth embodiment of the present invention is made in light of the following technical context and problems.

There have been known fishing rods having fittings such as line guides and a reel seat mounted on a rod body. The fittings are conventionally mounted on the rod body with a thread or a resin sheet.

Fishing rods having fittings mounted on a rod body with a resin sheet are disclosed in, e.g., the Japanese Utility Model Application Publication No. Hei 2-26474 (Patent Literature 1), International Publication No. WO2018/042856 (Patent Literature 2) and International Publication No. WO2018/061345 (Patent Literature 3). The resin sheet disclosed in these patent literatures is a prepreg sheet obtained by impregnating reinforcement fibers with a matrix resin containing a thermosetting resin. To mount the fittings, a prepreg sheet is wrapped around the rod body and mounting parts of the fittings and the matrix resin of the prepreg sheet wrapped around the rod body is cured. In this way, the fittings can be fixed onto the rod body. As noted, the fittings can be mounted on the rod body via the mounting parts with a fiber-reinforced resin layer, which is made by curing the prepreg sheet.

On the fiber-reinforced resin layer provided to mount the fittings, a coating layer made of a resin material is provided to improve decorativeness and weather resistance thereof. When the fishing rod is used, the rod body may place stress acting on the line guide and reel seat. The stress may concentrate in portions of the coating layer, and such portions may break.

According to the mounting structure disclosed in Patent Literature 1, a prepreg sheet cut in a shape of a trapezoid is wrapped around the rod body and the foot of the line guide and the prepreg sheet wrapped around the rod body is cured. In this way, the line guide is fixed onto the rod body. Patent Literature 1 discloses that a fiber-reinforced resin layer obtained by curing the trapezoidal-shaped prepreg sheet has a smooth curved surface on the circumference of the rod body and that this can prevent breakage to be caused by stress concentrations.

In the case of the curved fiber-reinforced resin layer made from the prepreg sheet in a shape of a trapezoid, the end of the windings of the fiber-reinforced resin layer is positioned at varying positions among different positions determined in the axial direction of the rod body. This means that the fiber-reinforced resin layer holds the mounting part of the fitting down to the rod body with varying levels of forces among the different positions determined in the axial direction of the rod body. Accordingly, the mounting structure disclosed in Patent Literature 1, where a prepreg sheet in a shape of a trapezoid is formed into a curved fiber-reinforced resin layer to reduce stress concentrations, can not stably support the fitting.

One of the objects of the fourth embodiment of the present invention is to provide a fishing rod having a fitting stably fixed onto a rod body using a fiber-reinforced resin layer and having a coating layer covering the fiber-reinforced resin layer, where the coating layer is less likely to be destroyed.

A fishing rod according to one embodiment includes a rod body extending along a central axis, a fitting having a mounting part, where the fitting being mounted on the rod body such that the mounting part is in contact with an outer peripheral surface of the rod body, and a fiber-reinforced resin layer surrounding the rod body so as to cover the mounting part. In this embodiment, one end and the other end of the fiber-reinforced resin layer are, in a circumferential direction around the central axis, symmetrically positioned with respect to the mounting part.

In the fishing rod according to one embodiment, the fiber-reinforced resin layer contains reinforcement fibers arranged at an angle of less than 90° with respect to the axial direction.

In the fishing rod according to one embodiment, the fiber-reinforced resin layer is wound in N1 plies at a first position determined in the axial direction along the central axis and overlapping the mounting part and wound in N2 plies less than the N1 plies at a second position determined in the axial direction along the central axis and not overlapping the mounting part. This means N2<N1.

In the fishing rod according to one embodiment, the fiber-reinforced resin layer is formed by curing a first prepreg sheet having a first length in the axial direction and a second prepreg sheet externally wrapped around the first prepreg sheet and having a second length greater than the first length in the axial direction.

In the fishing rod according to one embodiment, the fiber-reinforced resin layer is made by curing a prepreg sheet, and the prepreg sheet has: a first sheet portion having a first length in the axial direction and is wound around the rod body so as to cover the mounting part in the N1 plies; and a second sheet portion continuous from the first sheet portion in the axial direction and wound around the rod body in the N2 plies.

In the fishing rod according to one embodiment, the fiber-reinforced resin layer has a thickness of 0.75 mm or less at an end thereof opposite to the fitting in the axial direction.

In the fishing rod according to one embodiment, the one end of the fiber-reinforced resin layer is, in the circumferential direction, positioned no less than 90° and less than 180° anti-clockwise from the mounting part.

In the fishing rod according to one embodiment, the other end of the fiber-reinforced resin layer is, in the circumferential direction, positioned no less than 90° and less than 180° clockwise from the mounting part.

The fishing rod according to one embodiment further includes a coating layer coating the fiber-reinforced resin layer.

In one embodiment, the fitting is a fishing line guide. In one embodiment, the fitting is a reel seat.

The fourth embodiment of the present invention can provide a fishing rod having a fitting stably fixed onto a rod body using a fiber-reinforced resin layer and having a coating layer covering the fiber-reinforced resin layer, where the coating layer is less likely to be destroyed.

The fourth embodiment of the present invention will be hereinafter described with reference to the accompanying drawings. In the drawings, constituent elements common to different views are denoted by the same reference signs. It should be noted that, for convenience of explanation, the drawings are not necessarily drawn to scale.

Figure 18:
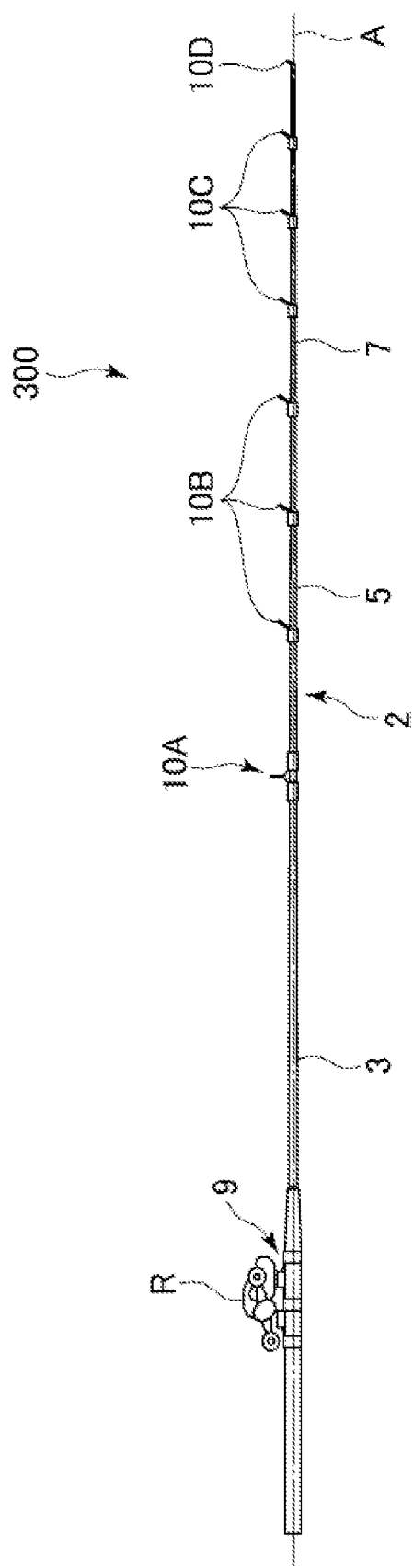
FIG. 18 shows a fishing rod according to a fourth embodiment of the present invention.

FIG. 18 shows the fishing rod according to the fourth embodiment of the present invention. As shown, a fishing rod 400 according to the fourth embodiment of the present invention includes an elongated rod body 2 extending along a central axis A, a reel R mounted on the rod body 2 via a reel seat 9, and fishing line guides 10 mounted on the rod body 2. In the embodiment shown, the reel seat 9 and the fishing line guides 10 are fittings mounted on the outer peripheral surface of the rod body.

The rod body 2 is made up of, for example, a butt rod 3, an intermediate rod 5, and a tip rod 7 connected together. For example, these rods are jointed together by ordinary jointing. The butt rod 3, the intermediate rod 5, and the tip rod 7 may also be jointed together by telescopic jointing, inverse ordinary jointing, spigot jointing, or any other known jointing methods. Alternatively, the rod body 2 may be made of a single rod.

The butt rod 3, the intermediate rod 5, and the tip rod 7 are formed of, for example, a tube made of a fiber reinforced resin. The tube made of a fiber reinforced resin can be formed by preparing a fiber reinforced resin prepreg (a prepreg sheet) made of reinforcement fibers impregnated with a matrix resin, winding the prepreg sheet on a core, and heating and curing the prepreg sheet. The reinforcement fibers included in the prepreg sheet may be, for example, carbon fibers, glass fibers, or any other known reinforcement fibers. The matrix resin included in the prepreg sheet may be a thermosetting resin such as epoxy resin. After the prepreg sheet is cured, the core is removed. The outer surface of the tube may be polished as necessary. Each of the rods may be formed solid.

In the embodiment shown, the butt rod 3, the intermediate rod 5, and the tip rod 7 are provided with a plurality of fishing line guides 10 (the fishing line guides 10A to 10D) for guiding a fishing line released from the reel R mounted to the reel seat 9. More specifically, the butt rod 3 is provided with a single fishing line guide 10A, the intermediate rod 5 is provided with three fishing line guides 10B, and the tip rod 7 is provided with three fishing line guides 10C. The top guide 10D is provided at a distal end of the tip rod 7. The rod body 2 may have any number of fishing line guides 10 mounted thereon. In the illustrated example, the rod body 2 has eight fishing line guides including the top guide 10D mounted thereon, but the rod body 2 may have nine or more, or seven or less fishing line guides mounted thereon.

In the embodiment shown, the reel seat 9 is mounted on the outer peripheral surface of the butt rod 3. The reel seat 9 is any reel seat as long as it allows the reel R to be mounted thereto.

Figure 19:
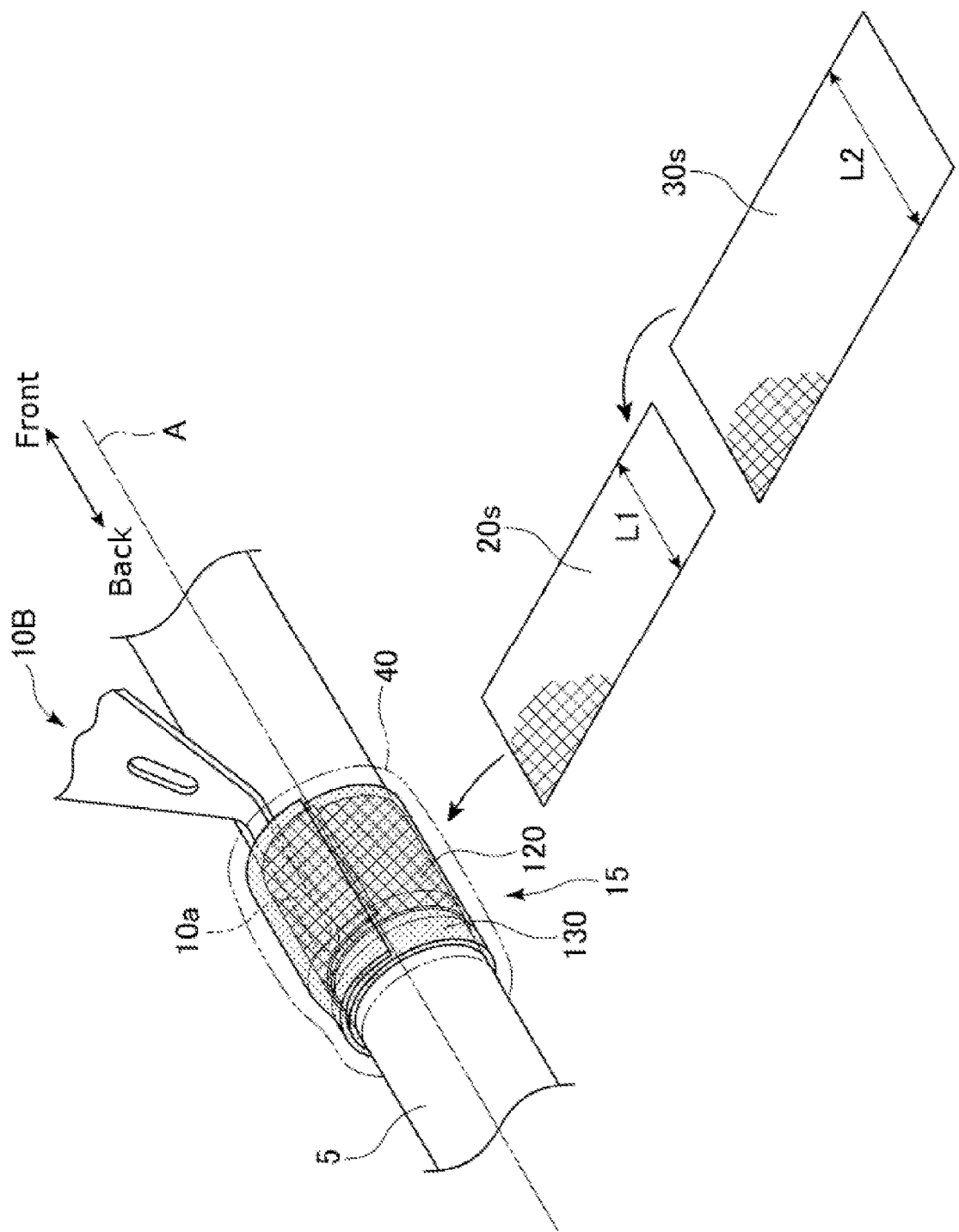
FIG. 19 is an enlarged perspective view schematically illustrating a region near a fishing line guide of the fishing rod shown in FIG. 18.
Figure 20:
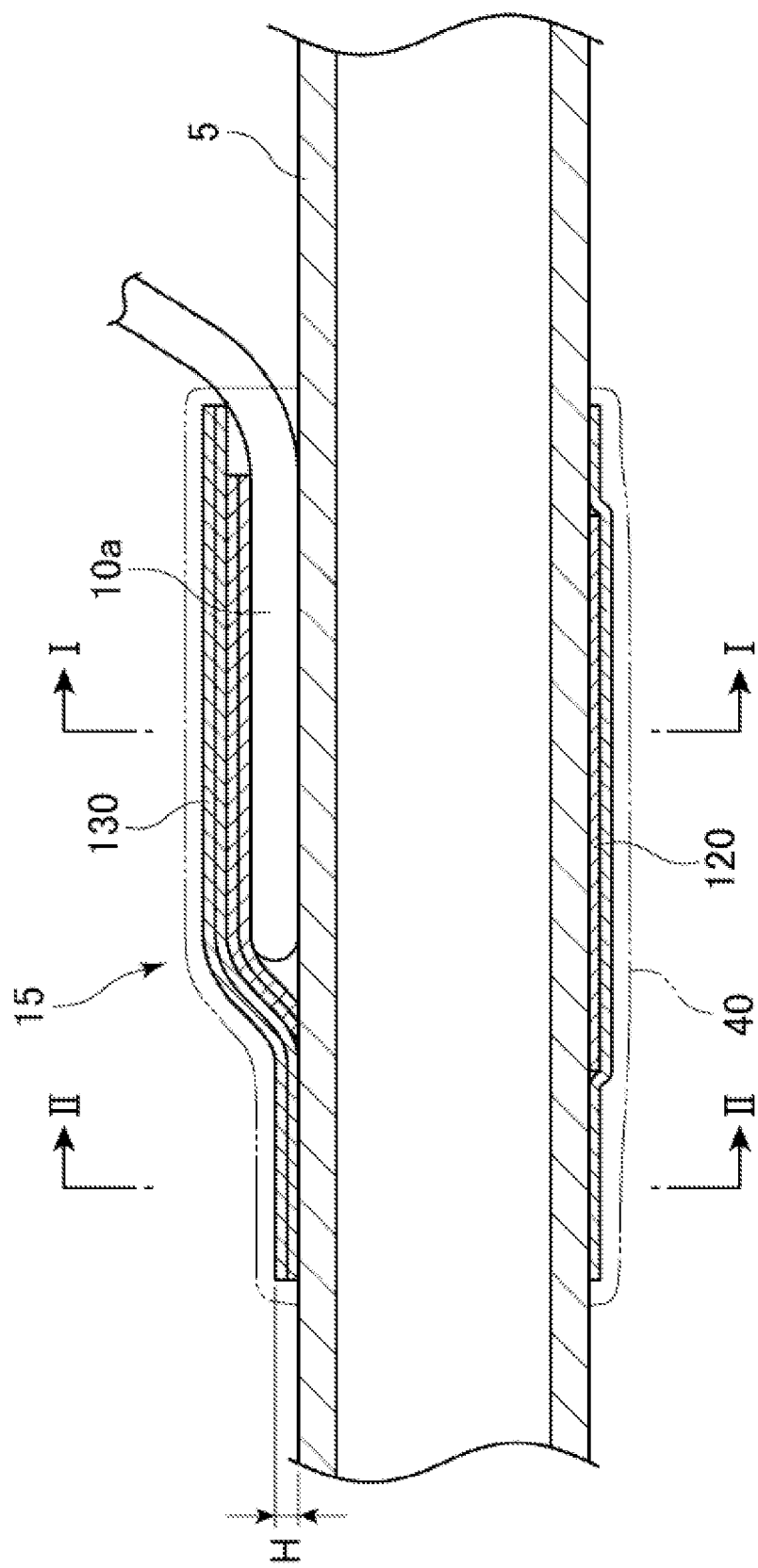
FIG. 20 is a sectional view illustrating a section obtained by cutting the region near the fishing line guide of the fishing rod shown in FIG. 18 along the central axis of the rod body.
Figure 21:
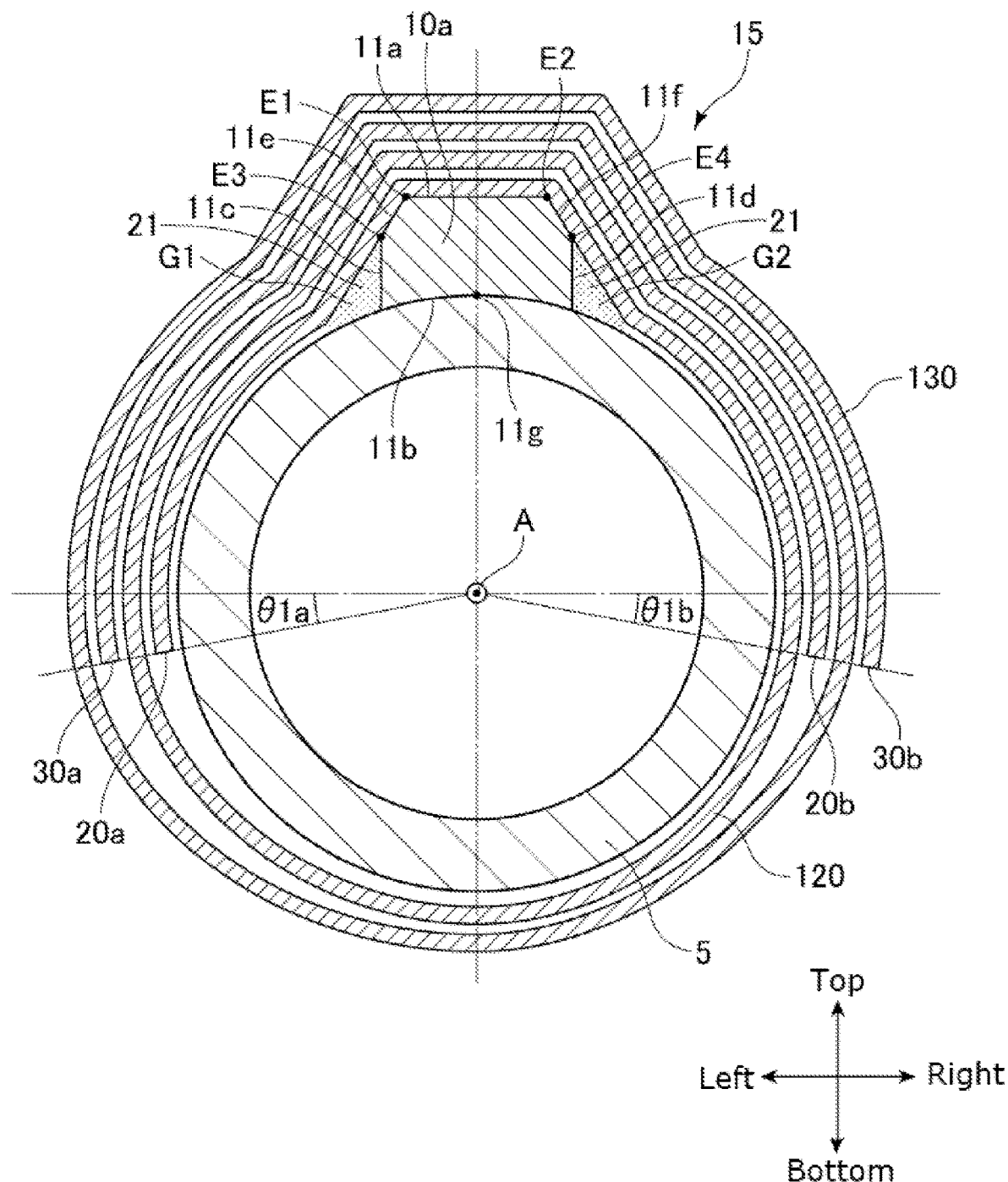
FIG. 21 is a sectional view obtained along a line I-I in FIG. 20.
Figure 22:
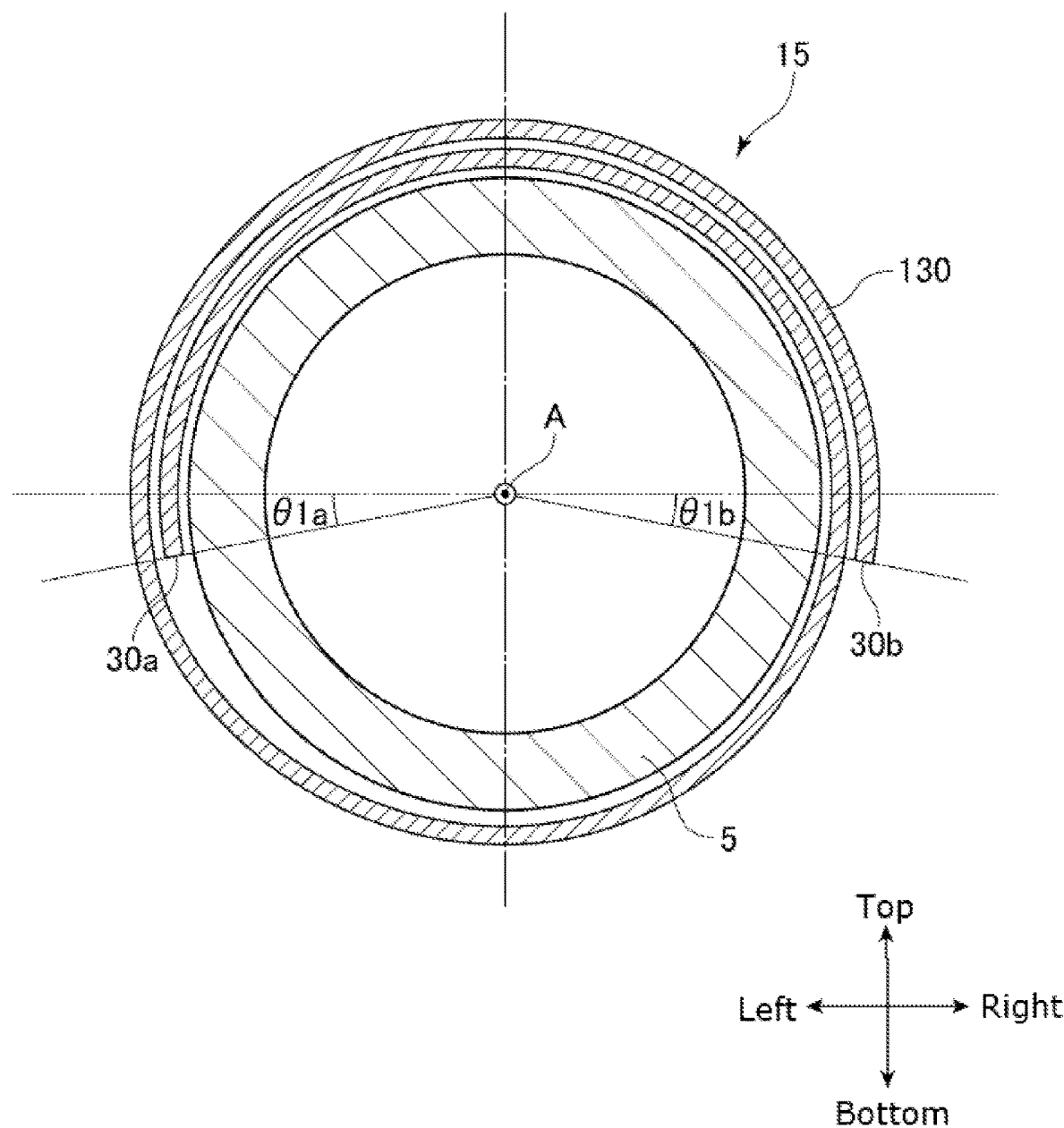
FIG. 22 is a sectional view obtained along a line II-II in FIG. 20.

Next, with further reference to FIGS. 19 and 22, a description is given of the structure and manner of mounting of the fishing line guide 10B onto the intermediate rod 5. FIG. 19 is a perspective view to illustrate the manner of how to mount the fishing line guide 10B onto the intermediate rod 5, FIG. 20 is a schematic cross-sectional view along the central axis A in FIG. 19, FIG. 21 is a schematic cross-sectional view along the line I-I in FIG. 20, and FIG. 22 is a schematic cross-sectional view along the line II-II in FIG. 20. The top-and-bottom and left-and-right directions of the rod 5 and the fishing line guide 10B respectively refer to the top-and-bottom and left-and-right directions in FIGS. 21 and 22.

As shown in these drawings, the fishing line guide 10B has a foot 10a extending in the axial direction along the central axis A of the intermediate rod 5 and is mounted on the outer peripheral surface of the intermediate rod 5 via the foot 10a. The foot 10a of the fishing line guide 10B is an example of the mounting part of the fitting. When seen in the cross-section, the foot 10a of the fishing line guide 10B has a top surface 11a, a bottom surface 11b opposing the top surface 11a, and side surfaces 11c and 11d connecting together the top and bottom surfaces 11a and 11b. The fishing line guide 10B is mounted on the intermediate rod 5 such that the bottom surface 11b of the foot 10a is in contact with the outer peripheral surface of the intermediate rod 5. The bottom surface 11b of the foot 10a is partially or entirely in contact with the outer peripheral surface of the intermediate rod 5. In the illustrated embodiment, since the curvature of the bottom surface 11b is substantially equal to the curvature of the outer peripheral surface of the intermediate rod 5, the bottom surface 11b is almost entirely in contact with the outer peripheral surface of the intermediate rod 5. If the curvature of the bottom surface 11b is different from the curvature of the outer peripheral surface of the intermediate rod 5, the bottom surface 11b is only partially in contact with the outer peripheral surface of the intermediate rod 5. Since the bottom surface 11b of the foot 10a is in contact with the outer peripheral surface of the intermediate rod 5, a filling member, such as disclosed in, for example, Japanese Utility Model Application Publication No. Hei 2-026474 is not provided between the foot 10a and the intermediate rod 5. If the curvature of the bottom surface 11b is different from the curvature of the outer peripheral surface of the intermediate rod 5, however, a resin may be interposed between the bottom surface 11b and the outer peripheral surface of the intermediate rod 5 due to the resin flowing from a prepreg sheet, described below.

The foot 10a is beveled at the portion where the top surface 11a is connected to the side surface 11c and at the portion where the top surface 11a is connected to the side surface 11c. In the illustrated embodiment, beveled surfaces 11e and 11f are formed at the left and right edges of the top surface 11a of the foot 10a. The beveled surface 11e is the surface connecting together the top and side surfaces 11a and 11c. The beveled surface 11f is the surface connecting together the top and side surfaces 11a and 11d. The top surface 11a is connected at the left edge E1 thereof to the beveled surface 11e and at the right edge E2 thereof to the beveled surface 11f. As illustrated in FIG. 20, the left edge E1 of the top surface 11a is one of the edges of the top surface 11a opposing each other in the circumferential direction around the central axis A, and the right edge E2 of the top surface 11a is the other of the edges of the top surface 11a opposing each other in the circumferential direction. The left edge E1 of the top surface 11a is an example of a first edge, and the right edge E2 of the top surface 11a is an example of a second edge. The side surface 11c is connected at the top edge E3 thereof to the beveled surface 11e and the side surface 11d is connected at the top edge E4 thereof to the beveled surface 11e.

In one aspect, at least one of the beveled surfaces 11e and 11f may form a part of the top surface 11a. Stated differently, the top surface 11a may refer to the region including the beveled surfaces 11e and 11f. In this case, the top edge E3 of the side surface 11c is treated as the left edge (first edge) of the top surface 11a, and the top edge E4 of the side surface 11d is treated as the right edge (second edge) of the top surface 11a.

On the outer side of the foot 10a of the fishing line guide 10B, there are provided a fiber-reinforced resin layer 15 and a coating layer 40. As used herein, the terms "outer side" and "inner side" refer to "the outer side" and "the inner side" in the radial direction of the intermediate rod 5, respectively, unless otherwise construed from the context. The coating layer 40 is provided to coat the fiber-reinforced resin layer 15. The fiber-reinforced resin layer 15 includes a first fiber-reinforced resin layer 120 and a second fiber-reinforced resin layer 130.

The first fiber-reinforced resin layer 120 surrounds the intermediate rod 5 such that the first fiber-reinforced resin layer 120 covers the foot 10a. In one embodiment, the first fiber-reinforced resin layer 120 is wound around the foot 10a and the outer peripheral surface of the intermediate rod 5. In one embodiment, the number of windings of the first fiber-reinforced resin layer 120 is designed to be one or more plies for reliably fixing the fishing line guide 10B and less than two plies for reducing the weight. On the outer side of the first fiber-reinforced resin layer 120, the second fiber-reinforced resin layer 130 is wound. In one embodiment, the number of windings of the second fiber-reinforced resin layer 130 is designed to be no less than one ply and less than two plies. In the illustrated embodiment, the first fiber-reinforced resin layer 120 and the second fiber-reinforced resin layer 130 are both wound in approximately 1.6 plies.

In one embodiment, the first fiber-reinforced resin layer 120 is provided such that its one end 20a is positioned no less than 90° and less than 180° anti-clockwise from the fishing line guide 10B in the circumferential direction around the central axis A as shown in FIG. 21. In the illustrated embodiment, the end 20a of the first fiber-reinforced resin layer 120 is positioned 90°+θ1a (0≤θ1a<90°) anti-clockwise in the circumferential direction from the center portion 11g. When the present specification refers to the angle relative to the fishing line guide 10B or the foot 10a thereof and describes how a constituent is arranged relative to the fishing line guide 10B, the angle or arrangement can be determined relative to the center portion 11g of the foot 10a of the fishing line guide 10B, which is the center of the foot 10a in the circumferential direction. For example, when the present specification says that the one end 20a of the first fiber-reinforced resin layer 120 is positioned no less than 90° and less than 180° anti-clockwise from the fishing line guide 10B in the circumferential direction around the central axis A, this angle denotes the angle formed between the one end 20a and the center portion 11g.

In one embodiment, the other end 20b of the first fiber-reinforced resin layer 120 is on the other side of the end 20a with respect to the center portion 11g of the fishing line guide 10B in the circumferential direction around the central axis A. In one embodiment, the other end 20b of the first fiber-reinforced resin layer 120 is positioned no less than 90° and less than 180° away clockwise from the center portion 11g of the fishing line guide 10B. In the illustrated embodiment, the other end 20b of the first fiber-reinforced resin layer 120 is positioned 90°+θ1b (0≤θ1b<90°) clockwise in the circumferential direction from the center portion 11g.

In one embodiment, the one end 20a and the other end 20b of the first fiber-reinforced resin layer 120 are symmetrically positioned with respect to the foot 10a of the fishing line guide 10B in the circumferential direction around the central axis A. In other words, the first fiber-reinforced resin layer 120 may be provided such that its one end 20a and other end 20b are positioned with the relation of θ1a=θ1b being satisfied.

As described above, the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g. With such arrangements, the number of windings of the first fiber-reinforced resin layer 120 can be 1.5 plies or more and less than 2.0 plies.

When the fishing rod 400 is used, the fishing line applies, to the fishing line guide 10B, a force that is directed to swing the fishing line guide 10B around the central axis A of the rod body. This force results in the left and right edges of the bottom surface 11b of the foot 10a moving upward away from the outer peripheral surface of the intermediate rod 5. If the end 20a of the first fiber-reinforced resin layer 120 is positioned 90°+θ1a anti-clockwise from the center portion 11g of the fishing line guide 10B, and the other end 20b is positioned 90°+θ1b away clockwise from the center portion 11g, the portions of the first fiber-reinforced resin layer 120 near the ends 20a and 20b function as hooks when the force applied by the fishing line causes the foot 10a to move away upward, so that the left and right edges of the foot 10a can be prevented from moving away upward.

In one embodiment, the second fiber-reinforced resin layer 130 is provided on the outer side of the first fiber-reinforced resin layer 120 such that the end 30a is positioned 90°+θ1a (0≤θ1a<90°) anti-clockwise in the circumferential direction from the center portion 11g and the other end 30b is positioned 90°+θ1b clockwise from the center portion 11g. As described above, in the circumferential direction around the central axis A, the end 20a of the first fiber-reinforced resin layer 120 is at the same position as the end 30a of the second fiber-reinforced resin layer 130 in the illustrated embodiment, but the end 20a of the first fiber-reinforced resin layer 120 may be differently positioned from the end 30a of the second fiber-reinforced resin layer 130. Likewise, the other end 20b of the first fiber-reinforced resin layer 120 is at the same position as the other end 30b of the second fiber-reinforced resin layer 130 in the illustrated embodiment, but the other end 20b of the first fiber-reinforced resin layer 120 may be differently positioned in the circumferential direction from the other end 30b of the second fiber-reinforced resin layer 130.

In one embodiment, the one end 30a and the other end 30b of the second fiber-reinforced resin layer 130 are symmetrically positioned with respect to the foot 10a of the fishing line guide 10B in the circumferential direction around the central axis A. In other words, the second fiber-reinforced resin layer 130 may be provided such that its one end 30a and other end 30b are positioned with the relation of θ1a=θ1b being satisfied.

In one embodiment, the fiber-reinforced resin layer 15 is wound in N1 plies at a first position determined in the axial direction along the central axis A and overlapping the foot 10a of the fishing line guide 10B and wound in N2 plies less than the N1 plies at a second position determined in the axial direction along the central axis A and not overlapping the foot 10a of the fishing line guide 10B. Here, N1 is any natural number and N2 is any natural number smaller than N1. For example, in FIG. 20, the line I-I passes through the axially determined first position and the line II-II passes through the axially determined second position. Accordingly, FIG. 21 shows a cross-section of the fishing rod 400 at the first position, and FIG. 22 shows a cross-section of the fishing rod 400 at the second position. When the present specification refers to the number of plies of the fiber-reinforced resin layer 15, the number of plies can mean the total of the numbers of plies of the first and second fiber-reinforced resin layers 120 and 130, which together constitute the fiber-reinforced resin layer 15. In the embodiment shown in FIGS. 21 and 22, the fiber-reinforced resin layer 15 is wound in 3.2 plies (the first fiber-reinforced resin layer 120 is wound in 1.6 plies and the second fiber-reinforced resin layer 130 is wound in 1.6 plies) at the first position. At the second position, on the other hand, as far as the fiber-reinforced resin layer is concerned, the first fiber-reinforced resin layer 120 is not provided and only the second fiber-reinforced resin layer 130 is provided. Accordingly, the fiber-reinforced resin layer 15 is wound in 1.6 plies, in which the second fiber-reinforced resin layer 130 is wound. As clearly understood from the description in this paragraph, the first position denotes an axially determined position where both the first and second fiber-reinforced resin layers 120 and 130 are wound, and the second position denotes an axially determined position where only the second fiber-reinforced resin layer 130 is wound as far as the fiber-reinforced resin layer is concerned.

As described above, the fishing line guide 10B is mounted on the outer peripheral surface of the intermediate rod 5 via the foot 10a with the use of the first and second fiber-reinforced resin layers 120 and 130. FIGS. 21 and 22 arrange the components such that gaps are provided between the outer peripheral surface of the intermediate rod 5 and the first fiber-reinforced resin layer 120 and between the first fiber-reinforced resin layer 120 and the second fiber-reinforced resin layer 130 for the sake of intelligibility. In fact, however, the first fiber-reinforced resin layer 120 is in close contact with the outer peripheral surface of the intermediate rod 5, and the first and second fiber-reinforced resin layers 120 and 130 are also in close contact with each other.

The coating layer 40 is a coating film made of a resin provided on the outer side of the fiber-reinforced resin layer 15 so as to cover the second fixing layer 30. As shown, the coating layer 40 may be provided to coat the entire second fixing layer 30. In FIGS. 21 and 22, the coating layer 40 is not shown for convenience of description.

The coating layer 40 may be formed of various resin materials such as epoxy, urethane, acrylic, or UV-curable resins (e.g., urethane acrylate, acrylic resin acrylate, epoxy acrylate). The materials of the coating layer 40 are not limited to those named herein but are various. The coating layer 40 may be either transparent or colored.

As shown in FIGS. 21 and 22, the side surface 11c of the foot 10a, the outer peripheral surface of the intermediate rod 5 and the inner peripheral surface of the first fiber-reinforced resin layer 120 bound a gap G1. Similarly, the side surface 11d of the foot 10a, the outer peripheral surface of the intermediate rod 5 and the inner peripheral surface of the first fiber-reinforced resin layer 120 bound a gap G2. When a first sheet 20s, described below, is heated, the matrix resin contained in the first sheet 20s becomes flowable and flows into the gaps G1 and G2. Accordingly, the gaps G1 and G2 are at least partially filled with a resin 21, originating from the matrix resin contained in the first sheet 20s.

The following describes, for example, a method of how to mount the fishing line guide 10B onto the intermediate rod 5. The process of mounting the fishing line guide 10B on the intermediate rod 5 begins with preparing the rod 5, the fishing line guide 10B, the first sheet 20s, and the second sheet 30s.

As described above, the rod 5 is made by heating and curing a prepreg sheet wound on a core.

The fishing line guide 10B may be any fixed guide. The fishing line guide 10B may be either a single-foot guide as shown or a double-foot guide.

The first sheet 20s is a prepreg sheet made from reinforcement fibers impregnated with a matrix resin. The first sheet 20s is an example first prepreg sheet, the reinforcement fibers contained in the first sheet 20s are example first reinforcement fibers, and the matrix resin contained in the first sheet 20s is an example first matrix resin.

The reinforcement fibers contained in the first sheet 20s are, for example, carbon fibers, glass fibers, or organic fibers. The organic fibers are, for example, fibers of one or more types selected from the group consisting of polyolefin, polyamide, polyacrylonitrile, and polyester. In the embodiment, the first sheet 20s is configured such that, when the first sheet 20s is wound around the intermediate rod 5, the reinforcement fibers therein extend at an angle greater than 0° and less than 90° with respect to the axial direction of the central axis A. The angle is, for example, determined to fall within the range from 20° to 70°. In an embodiment, the angle is 45°. The reinforcement fibers contained in the first sheet 20s may be fibers arranged to extend in a unilateral direction at the determined angle to form a uniaxial sheet. The first sheet 20s may be a plain-woven sheet in which the warp and weft are plain woven. When the first sheet 20s is a plain-woven sheet, the first sheet 20s is wound around the intermediate rod 5 such that its warp and weft form the above-mentioned angle with respect to the axial direction.

The matrix resin contained in the first sheet 20s is, for example, a thermosetting resin. A thermosetting resin cures irreversibly by chemical reaction upon heating. Thermosetting resins that can be used as the matrix resin making the first sheet 20s include, for example, urea resins, melamine resins, phenolic resins, epoxy resins, unsaturated polyester resins, alkyd resins, and urethane resins.

The first sheet 20s has a thickness of, for example, 20 μm to 300 μm. The first sheet 20s may be a commercially available sheet that can be used suitably.

The resin content of the matrix resin in the first sheet 20s is, for example, 20 wt % to 40 wt %, relative to 100 wt % of the total mass of the reinforcement fibers and matrix resin in the first sheet 20s.

The second sheet 30s is, for example, a prepreg sheet made from reinforcement fibers impregnated with a matrix resin. The second sheet 30s is an example second prepreg sheet, the reinforcement fibers contained in the second sheet 30s are example second reinforcement fibers, and the matrix resin contained in the second sheet 30s is an example second matrix resin.

The reinforcement fibers contained in the second sheet 30s are, for example, carbon fibers, glass fibers, or organic fibers. The second sheet 30s is configured such that, when the second sheet 30s is wound around the intermediate rod 5, the reinforcement fibers therein extend at an angle greater than 0° and less than 90° with respect to the axial direction along the central axis A. The angle is, for example, determined to fall within the range from 20° to 70°. In an embodiment, the angle is 45°. The reinforcement fibers contained in the second sheet 30s may be fibers arranged to extend in a unilateral direction at the determined angle to form a uniaxial sheet. The second sheet 30s may be a plain-woven sheet in which the warp and weft are plain woven. When the second sheet 30s is a plain-woven sheet, the second sheet 30s is wound around the intermediate rod 5 such that its warp and weft form the above-mentioned angle with respect to the axial direction. The matrix resin contained in the second sheet 30s includes, for example, urea resins, melamine resins, phenolic resins, epoxy resins, unsaturated polyester resins, alkyd resins, and urethane resins.

In an embodiment of the present invention, the matrix resin contained in the first sheet 20s may have a higher curing temperature than the matrix resin contained in the second sheet 30s. For example, when an epoxy resin that cures at 80° C. is used as the matrix resin contained in the second sheet 30s, an epoxy resin that cures at 120° C. may be used as the matrix resin in the first sheet 20s.

The second sheet 30s may have a thickness of, for example, 20 μm to 300 μm. The second sheet 30s may be a commercially available sheet that can be used suitably.

The resin content of the matrix resin in the second sheet 30s is, for example, 20 wt % to 40 wt %, relative to 100 wt % of the total mass of the reinforcement fibers and matrix resin in the second sheet 30s.

The matrix resin contained in the first or second sheet 20s or 30s is a composition principally made of a thermosetting resin. This resin composition may contain a known additive. When the resin composition contains a thermosetting resin and an additive, the proportion of the mass of the thermosetting resin relative to 100% of the entire mass of the resin composition is, for example, 50% b or more, 60% or more, 70% or more, 80% or more, or 90% or more.

As shown in FIG. 19, to mount the fishing line guide 10B on the rod 5, the foot 10a of the fishing line guide 10B is placed on the outer peripheral surface of the intermediate rod 5. Subsequently, one end of the first sheet 20s is placed on the outer peripheral surface of the intermediate rod 5 so that the first sheet 20s is wound in a predetermined number of plies so as to surround the outer peripheral surface of the intermediate rod 5. The first sheet 20s is cut such that it has a length L1 in the axial direction along the central axis A. In one embodiment, the winding of the first sheet 20s starts at the position 90°+θ1a anti-clockwise from the center portion 11g and ends at the position 90°+θ1b clockwise from the center portion 11g, as shown in FIG. 21. These winding start and end positions are varied as appropriate. Thus, the foot 10a is covered by the first sheet 20s along with the rod 5. Once the first sheet 20s is wound around the intermediate rod 5, a void space corresponding to the gap G1 is created on the left side of the foot 10a, and a void space corresponding to the gap G2 is created on the right side of the foot 10a.

Next, the second sheet 30s is wound on the outer side of the first sheet 20s, which has been wound on the rod 5, so that a winding is obtained. The second sheet 30s is cut such that it has a length L2 in the axial direction along the central axis A. Since the length L2 is greater than the length L1, the second sheet 30s is arranged such that it extends beyond the back end of the first sheet 20s toward the back along the central axis. The second sheet 30s is wound around the rod 5 in a predetermined number of plies so as to cover the first sheet 20s. As shown in FIG. 20, the winding of the second sheet 30s starts at the position 90°+θ1a anti-clockwise from the center portion 11g and ends at the position 90°+θ1b away clockwise from the center portion 11g.

The numbers of windings of the first and second sheets 20s and 30s are not limited to those expressly mentioned herein. The first sheet 20s and the second sheet 30s are wound in any number of plies. For example, the first sheet 20s and the second sheet 30s may be each wound in two or more plies.

Next, the winding, where the first sheet 20s and the second sheet 30s are wound around the rod 5, is heated. As a result, the matrix resin contained in the first sheet 20s becomes flowable and then cures, so that the first fiber-reinforced resin layer 120 is formed, and the matrix resin contained in the second sheet 30s becomes flowable and then cures, so that the second fiber-reinforced resin layer 130 is formed. These first and second fiber-reinforced resin layers 120 and 130 fix the fishing line guide 10B to the rod 5.

After heated for a predetermined period of time, the winding is taken out of the heating furnace and cooled at a room temperature for a predetermined period of time. After the winding is cooled enough, a coating layer may be formed so as to cover the second fiber-reinforced resin layer 130 formed on the winding for the purposes of improving weather resistance or decorativeness.

The above step of heating the winding may be carried out with a known heating furnace. For example, the winding may be placed for a predetermined period of time in a heating furnace maintained at a predetermined temperature, so that the winding is heated enough to cure the matrix resins contained in the first and second sheets 20s and 30s. The temperature of the heating furnace is, for example, 70 to 170° C., 80 to 160° C., 85 to 150° C., or 90 to 120° C., but the heating can be carried out at a temperature other than these ranges in accordance with the curing temperatures of the matrix resins. The duration of the heating of the winding in the heating furnace is, for example, 5 minutes to 3 hours, 15 minutes to 2.5 hours, or 30 minutes to 2 hours, but the winding may be heated for a duration other than these ranges. During the heating of the winding, a securing tape may be wound around the winding so as to prevent movement of the first and second sheets 20s and 30s wound around the intermediate rod 5.

When the curing temperature of the matrix resin contained in the first sheet 30s is lower than that of the matrix resin contained in the second sheet 30s, the matrix resin of the first sheet 20s on the inner side is cured first, and then the matrix resin of the second sheet 30s on the outer side, which has the higher curing temperature, is cured. Following this, an epoxy resin is applied to cover the fiber-reinforced resin layer made up of the cured first and second sheets 20s and 30s and dried to form the coating layer 40. In the above-described manner, the fishing line guide 10B can be mounted on the intermediate rod 5.

Figure 23:
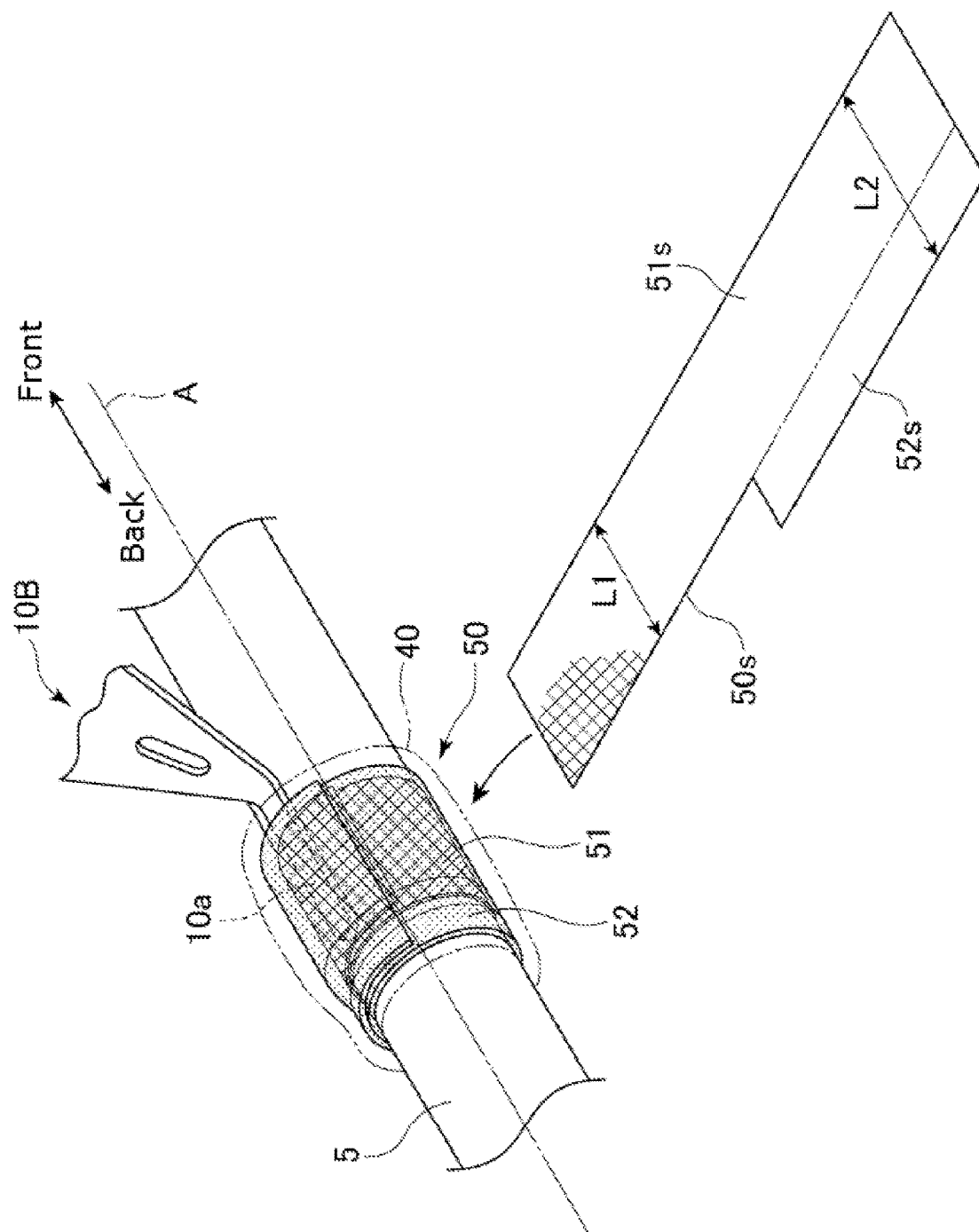
FIG. 23 is a sectional view illustrating a region near a fishing line guide of a fishing rod according to a modification example of the fourth embodiment.

Next, with reference to FIG. 23, a description is given of a fishing rod according to a modification example of the fourth embodiment of the present invention. In the embodiment illustrated in FIG. 23, the fiber-reinforced resin layer 15 is replaced with a fiber-reinforced resin layer 50. The fiber-reinforced resin layer 50 is formed by winding a third sheet 50s, which is a prepreg sheet, around the foot 10a of the fishing line guide 10B and intermediate rod 5 and curing the wound third sheet 50s.

The third sheet 50s is a prepreg sheet made from reinforcement fibers impregnated with a matrix resin. The reinforcement fibers contained in the third sheet 50s are, for example, carbon fibers, glass fibers, or organic fibers. The third sheet 50s is configured such that, when the third sheet 50s is wound around the intermediate rod 5, the reinforcement fibers therein extend at an angle greater than 0° and less than 90° with respect to the axial direction around the central axis A. The angle is, for example, determined to fall within the range from 20° to 70°. In an embodiment, the angle is 45°. The reinforcement fibers contained in the third sheet 50s may be fibers arranged to extend in a unilateral direction at the determined angle to form a uniaxial sheet. The third sheet 50s may be a plain-woven sheet in which the warp and weft are plain woven. When the third sheet 50s is a plain-woven sheet, the third sheet 50s is wound around the intermediate rod 5 such that its warp and weft form the above-mentioned angle with respect to the axial direction.

The fiber-reinforced resin layer 50 has a first portion 51 wound around the intermediate rod 5 to cover the foot 10a of the fishing line guide 10B and a second portion extending from the first portion 51 backward in the axial direction. The fiber-reinforced resin layer 50 is configured such that the first portion 51 is wound around the intermediate rod 5 in N1 plies and the second portion 52 is wound around the intermediate rod 5 in N2 plies.

Next, a description is given of how the fishing line guide 10B is mounted on the intermediate rod 5 using the third sheet 50s. As shown in FIG. 23, the first step to mount the fishing line guide 10B on the rod 5 is to place the foot 10a of the fishing line guide 10B on the outer peripheral surface of the intermediate rod 5. Subsequently, one end of the third sheet 50s is placed on the outer peripheral surface of the intermediate rod 5 so that the third sheet 50s is wound in a predetermined number of plies so as to surround the outer peripheral surface of the intermediate rod 5. The third sheet 50s has a first sheet portion 51s having a rectangular shape and a length L1 in the axial direction along the central axis A and a second sheet portion 52s having a rectangular shape and continuous from the first sheet portion 51s in the axial direction. FIG. 23 uses an imaginary line of alternate short and long dashed lines to identify the boundary between the first sheet portion 51s and the second sheet portion 52s. The third sheet 50s is cut such that the first sheet portion 51s has a width sufficient to allow the first sheet portion 51s to be wound around the intermediate rod 5 in N1 plies and the second sheet portion 52s has a width sufficient to allow the second sheet portion 52s to be wound around the intermediate rod 5 in N2 plies.

Following this, a winding, where the third sheet 50s is wound around the rod 5, is heated. This causes the matrix resin contained in the third sheet 50s to become cured, so that the fiber-reinforced resin layer 50 is formed. The first and second sheet portions 51s and 52s of the third sheet 50s are respectively formed into the first and second portions 51 and 52. This fiber-reinforced resin layer 50 fixes the fishing line guide 10B to the rod 5.

Advantageous effects of the above embodiments will now be described. The ends of the fiber-reinforced resin layer 15 are, in the circumferential direction around the central axis A, symmetrically positioned with respect to the foot 10a of the fishing line guide 10B. Specifically, the one end 20a and the other end 20b of the first fiber-reinforced resin layer 120, which forms the fiber-reinforced resin layer 15, are symmetrically positioned with respect to the foot 10a of the fishing line guide 10B in the circumferential direction around the central axis A. Additionally or alternatively, the one end 30a and the other end 30b of the second fiber-reinforced resin layer 130, which forms the fiber-reinforced resin layer 15, are symmetrically positioned with respect to the foot 10a of the fishing line guide 10B in the circumferential direction around the central axis A. This can contribute to stably supporting the fishing line guide 10B on the rod 5. When the fishing rod 400 is used, for example, the fishing line applies, to the fishing line guide 10B, a force that is directed to swing the fishing line guide 10B around the central axis A of the rod body. As described above, since the ends of the fiber-reinforced resin layer 15 are symmetrically arranged with respect to the foot 10a of the fishing line guide 10B, the fiber-reinforced resin layer 15 can keep holding the foot 10a of the fishing line guide 10B down onto the surface of the intermediate rod 5 even if a force is applied to swing the fishing line guide 10B around the central axis. If the fiber-reinforced resin layer is asymmetrically arranged in the circumferential direction with respect to the foot 10a of the fishing line guide 10B, only an insufficient force may be disadvantageously applied to hold down the foot 10a on the smaller number of windings side. According to the embodiment described above, since the ends of the fiber-reinforced resin layer 15 are symmetrically arranged with respect to the foot 10a of the fishing line guide 10B, the fiber-reinforced resin layer 15 can stably hold the fishing line guide 10B against the forces applied to the fishing line guide 10B from either direction in the circumferential direction. This can prevent the foot 10a of the fishing line guide 10B from moving upward away from the outer peripheral surface of the intermediate rod 5, thereby preventing the coating layer 40 from being destroyed.

In one embodiment described above, the fiber-reinforced resin layer 15 is wound in N1 plies at the first position determined in the axial direction along the central axis A and overlapping the foot 10a of the fishing line guide 10B and wound in N2 plies less than the N1 plies at the second position determined in the axial direction along the central axis A and not overlapping the foot 10a of the fishing line guide 10B. As noted, the fiber-reinforced resin layer 15 is wound in a smaller number of windings at the second position, which does not overlap the foot 10a (for example, the position behind the back end of the foot 10a in the axial direction), and correspondingly has a smaller thickness. In the embodiment shown in FIG. 20, the fiber-reinforced resin layer 15 is designed and arranged such that the fiber-reinforced resin layer 15 has, at the back end thereof (the second position), a thickness equal to two layers of the second sheet 30s on the top side and has a thickness equal to a single layer of the second sheet 30s on the bottom side. In one embodiment, the fiber-reinforced resin layer 15 has a thickness H of 0.75 mm or less at the back end thereof. On the other hand, the fiber-reinforced resin layer 15 is designed such that the fiber-reinforced resin layer 15 has, at the position overlapping the foot 10a (the first position), a thickness equal to the sum of two layers of the first sheet 20s and two layers of the second sheet 30s on the top side and a thickness equal to the sum of a single layer of the first sheet 20s and a single layer of the second sheet 30s on the bottom side. If the intermediate rod 5 is bended during the usage of the fishing rod 400, the stress resulting from the bending is concentrated at the boundary, determined in the axial direction of the intermediate rod 5, between the region where the fiber-reinforced resin layer 15 is provided and the region where the fiber-reinforced resin layer 15 is not provided (i.e., the back end of the fiber-reinforced resin layer 15). According to one embodiment described above, at the back end of the fiber-reinforced resin layer 15, only the second fiber-reinforced resin layer 130 is provided and the first fiber-reinforced resin layer 120 is not provided. Therefore, the fiber-reinforced resin layer 15 has a smaller thickness at the back end thereof than in the portion thereof determined in the axial direction and overlapping the foot 10a. Accordingly, one embodiment described above can alleviate the stress concentrations at the back end of the fiber-reinforced resin layer 15 and can resultantly prevent the coating layer 40 from being destroyed at the back end of the fiber-reinforced resin layer 15.

According to one embodiment described above, the matrix resin contained in the first sheet 20s becomes flowable and flows into the gaps G1 and G2. As a result, the gaps G1 and G2 are at least partially filled with the resin 21, flowing therein from the first sheet 20s. The resin 21 filling the gaps G1 and G2 allows the fishing line guide 10B to be more rigidly fixed onto the intermediate rod 5.

According to one embodiment described above, if the curing temperature of the matrix resin contained in the first sheet 20s is higher than that of the matrix resin contained in the second sheet 30s, the matrix resin of the first sheet 20s has not yet become flowable when the matrix resin of the second sheet 30s melts and becomes flowable. Therefore, the matrix resin contained in the second sheet 30s moves on to curing without flowing into the gaps G1 and G2. After this, the matrix resin contained in the first sheet 20s having the higher curing temperature melts and the melted resin flows into the gaps G1 and G2. As described above, if the curing temperature of the matrix resin contained in the first sheet 20s is higher than that of the second sheet 30s, the matrix resin of the first sheet 20s having the higher curing temperature has not yet become flowable when the matrix resin of the second sheet 30s becomes flowable. Accordingly, the matrix resin of the second sheet 30s is unlikely to flow into the void spaces in the first sheet 20s, which can reduce degradation of appearance quality.

According to one embodiment, the first fiber-reinforced resin layer 120 has a thickness equal to two layers of the first sheet 20s in the regions facing the gaps G1 and G2 in the circumferential direction, as shown in FIG. 21. Similarly, the second fiber-reinforced resin layer 130 has a thickness equal to two layers of the second sheet 30s in the regions facing the gaps G1 and G2 in the circumferential direction. This can reduce pin holes or voids, which may be created by the matrix resin flowing into the gaps G1 and G2 from the first sheet 20s.

According to the embodiment described above, when the one end 20a and the other end 20b of the first fiber-reinforced resin layer 120 are symmetrically arranged with respect to the center portion 11g of the fishing line guide 10B in the circumferential direction around the central axis A, the center of gravity of the intermediate rod 5 can avoid being shifted to the left or right off the central axis A.

According to the embodiment described above, the adhesive force between the outer peripheral surface of the intermediate rod 5 and a portion of the first fiber-reinforced resin layer 120 near the one end 20a (the portion in the region rotated anti-clockwise from the point of tangency P1 in the circumferential direction) and a portion near the other end 20b (the portion in the region rotated clockwise from the point of tangency P2 in the circumferential direction) can prevent the left and right edges of the bottom surface 11b of the foot 10a from moving away upward.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the embodiments described, and it is also possible to omit some of the constituent elements described for the embodiments.

In addition to the fishing line guides 10, the reel seat 9 can also be mounted on the associated rod in the same manner as described for the fishing line guides 10B. For example, the reel seat 9 can be mounted on the butt rod 3 via the first and second fiber-reinforced resin layers 120 and 130, or via the fiber-reinforced resin layer 50.

LIST OF REFERENCE NUMBERS 1, 100, 200, 300 fishing rod
2 rod body
3 butt rod
5 intermediate rod
7 tip rod
9 reel seat
10 fishing line guide
15, 20, 50 fiber-reinforced resin layer
20s first sheet
30s second sheet
40 coating layer
50s third sheet
21, 121 first portion
22, 122 second portion
120 first fiber-reinforced resin layer
130 second fiber-reinforced resin layer
20s, 120s, 130s prepreg sheet

What is claimed is:

1. A fishing rod comprising:
an elongated rod body extending along a central axis;
a fitting having a mounting part, the fitting being mounted on the rod body such that the mounting part is in contact with an outer peripheral surface of the rod body;
a first fiber-reinforced resin layer surrounding the rod body so as to cover the mounting part; and
a second fiber-reinforced resin layer provided on an outer side of the first fiber-reinforced resin layer,
wherein the first fiber-reinforced resin layer is formed of a first prepreg sheet containing an uncured first matrix resin and first reinforcement fibers impregnated with the uncured first matrix resin,
wherein the second fiber-reinforced resin layer is formed of a second prepreg sheet containing an uncured second matrix resin and second reinforcement fibers impregnated with the uncured second matrix resin, and
wherein wettability of the first reinforcement fibers with the uncured second matrix resin is higher than wettability of the second reinforcement fibers with the uncured second matrix resin.

2. The fishing rod of claim 1, wherein the first reinforcement fibers are organic fibers.

3. The fishing rod of claim 2, wherein the first reinforcement fibers are one selected from the group consisting of polyester fibers, aramid fibers, and aromatic polyamide fibers.

4. The fishing rod of claim 3, wherein the second reinforcement fibers are carbon or glass fibers.

5. The fishing rod of claim 1, wherein the second reinforcement fibers are carbon or glass fibers.

6. The fishing rod of claim 1, wherein a main component of the first matrix resin is an epoxy resin.

7. The fishing rod of claim 1, wherein a main component of the second matrix resin is an epoxy resin.

8. The fishing rod of claim 1,
wherein the mounting part has a bottom surface in contact with the outer peripheral surface of the rod body and a top surface opposing the bottom surface,
wherein the top surface of the mounting part has a first edge, which is one of edges facing each other in a circumferential direction around the central axis, and
wherein one end of the first fiber-reinforced resin layer is positioned, in the circumferential direction, on an opposing side of the mounting part with respect to a point of tangency between the outer peripheral surface of the rod body and a tangent line drawn toward the outer peripheral surface of the rod body from the first edge.

9. The fishing rod of claim 8, wherein the one end of the first fiber-reinforced resin layer is positioned, in the circumferential direction, no less than 90° and less than 180° anti-clockwise from the mounting part.

10. The fishing rod of claim 9,
wherein the top surface of the mounting part has a second edge, which is opposite to the first edge in the circumferential direction, and
wherein a second end opposing the one end of the first fiber-reinforced resin layer is positioned, in the circumferential direction, on an opposing side of the mounting part with respect to a point of tangency between the outer peripheral surface of the rod body and a tangent line drawn toward the outer peripheral surface of the rod body from the second edge.

11. The fishing rod of claim 10, wherein the second end of the first fiber-reinforced resin layer is, in the circumferential direction, positioned no less than 90° and less than 180° clockwise from the mounting part.

12. The fishing rod of claim 8,
wherein the top surface of the mounting part has a second edge, which is opposite to the first edge in the circumferential direction, and
wherein a second end opposing the one end of the first fiber-reinforced resin layer is positioned, in the circumferential direction, on an opposing side of the mounting part with respect to a point of tangency between the outer peripheral surface of the rod body and a tangent line drawn toward the outer peripheral surface of the rod body from the second edge.

13. The fishing rod of claim 12, wherein the second end of the first fiber-reinforced resin layer is, in the circumferential direction, positioned no less than 90° and less than 180° clockwise from the mounting part.

14. The fishing rod of claim 12, wherein the first fiber-reinforced resin layer is wound in one or more plies around the rod body.

15. The fishing rod of claim 1, wherein the fitting is a fishing line guide.

16. The fishing rod of claim 1, wherein the fitting is a reel seat.

* * * * *